US011237036B2

(12) United States Patent
Gurumohan et al.

(10) Patent No.: US 11,237,036 B2
(45) Date of Patent: Feb. 1, 2022

(54) BASE STATION AND ADVERTISING PACKETS OF SENSORS DETECTING CONTENT LEVEL

(71) Applicant: Nectar, Inc., Palo Alto, CA (US)

(72) Inventors: Prabhanjan C. Gurumohan, Mountain View, CA (US); Aayush Phumbhra, Palo Alto, CA (US); Anshul Gulati, San Jose, CA (US)

(73) Assignee: NECTAR, INC., Palo Alto, CA (US)

( * ) Notice: Subject to any disclaimer, the term of this patent is extended or adjusted under 35 U.S.C. 154(b) by 442 days.

(21) Appl. No.: 15/976,776

(22) Filed: May 10, 2018

(65) Prior Publication Data

US 2018/0330315 A1     Nov. 15, 2018

Related U.S. Application Data

(60) Provisional application No. 62/505,053, filed on May 11, 2017, provisional application No. 62/505,054, filed on May 11, 2017, provisional application No. 62/505,055, filed on May 11, 2017.

(51) Int. Cl.
| | |
|---|---|
| *G01F 23/296* | (2006.01) |
| *H04W 4/80* | (2018.01) |
| *G01F 22/00* | (2006.01) |
| *H04L 29/08* | (2006.01) |
| *H04W 76/14* | (2018.01) |

(Continued)

(52) U.S. Cl.
CPC ....... *G01F 23/2962* (2013.01); *B67D 3/0093* (2013.01); *G01F 22/00* (2013.01); *G01F 23/296* (2013.01); *G06F 17/15* (2013.01); *G06Q 10/087* (2013.01); *G06Q 20/203* (2013.01); *H04L 67/12* (2013.01); *H04L 69/22* (2013.01); *H04W 4/80* (2018.02); *H04W 76/14* (2018.02);

(Continued)

(58) Field of Classification Search
CPC ........ G01F 23/26; G01F 23/296; A47G 23/16
See application file for complete search history.

(56) References Cited

U.S. PATENT DOCUMENTS

| 2,804,103 A | 8/1957 | Wall |
| 4,386,409 A | 5/1983 | Petroff |

(Continued)

FOREIGN PATENT DOCUMENTS

| CN | 101726343 A | 6/2010 |
| CN | 103815675 A | 5/2014 |
| WO | 2016037612 | 3/2016 |

OTHER PUBLICATIONS

Ren, Yili, "Liquid Sensing using WIfi Signals" ARXIV Article Jun. 18, 2021 (Year: 2021).*

(Continued)

*Primary Examiner* — Oluseye Iwarere
(74) *Attorney, Agent, or Firm* — Dana Legal Services; Jubin Dana

(57) ABSTRACT

A network connection is established with a server. A broadcasted advertising packet of a wireless communication protocol is received from a remote device. The remote device repeatedly broadcasts content of the advertising packet based at least in part a total number of remote devices specified to broadcast to the system. Payload content from the advertising packet is extracted. At least a portion of the extracted payload content is sent via the network connection to the server.

18 Claims, 29 Drawing Sheets

(51) Int. Cl.
  *G06Q 10/08* (2012.01)
  *H04L 29/06* (2006.01)
  *B67D 3/00* (2006.01)
  *G06F 17/15* (2006.01)
  *G06Q 20/20* (2012.01)
  *G01F 17/00* (2006.01)
  *G01F 23/00* (2006.01)

(52) U.S. Cl.
  CPC .... *B67D 2210/00091* (2013.01); *G01F 17/00* (2013.01); *G01F 23/0069* (2013.01)

(56) References Cited

U.S. PATENT DOCUMENTS

| | | |
|---|---|---|
| 4,697,200 A | 9/1987 | Miyatake |
| 4,698,541 A | 10/1987 | Bar-Cohen |
| 4,723,305 A | 2/1988 | Phillips |
| 4,782,451 A | 11/1988 | Mazzarella |
| 4,823,600 A | 4/1989 | Biegel |
| 4,934,191 A | 6/1990 | Kroening |
| 4,961,456 A | 10/1990 | Stembridge |
| 5,042,698 A | 8/1991 | Fessell |
| 5,085,077 A | 2/1992 | Stapleton |
| 5,150,334 A | 9/1992 | Crosby |
| 5,303,585 A | 4/1994 | Lichte |
| 5,389,848 A | 2/1995 | Trzaskos |
| 5,471,872 A | 12/1995 | Cummings |
| 5,603,430 A | 2/1997 | Loehrke |
| 5,793,705 A | 8/1998 | Gazis |
| 5,866,815 A | 2/1999 | Schwald |
| 5,880,364 A | 3/1999 | Dam |
| 6,272,921 B1 | 8/2001 | Ivanovich |
| 6,545,946 B1 | 4/2003 | Huss |
| 6,856,247 B1 | 2/2005 | Wallace |
| 7,068,805 B2 | 6/2006 | Geddes |
| 7,088,258 B2 | 8/2006 | Morrison |
| 7,109,863 B2 | 9/2006 | Morrison |
| 7,190,278 B2 | 3/2007 | Morrison |
| 7,495,558 B2 | 2/2009 | Pope |
| 7,573,395 B2 | 8/2009 | Morrison |
| 7,598,883 B2 | 10/2009 | Morrison |
| 8,061,198 B2 | 11/2011 | Yinko |
| 8,151,596 B2 | 4/2012 | Richmond |
| 8,284,068 B2 | 10/2012 | Johnson |
| 8,453,878 B2 | 6/2013 | Palmquist |
| 8,851,740 B1 | 10/2014 | Mills |
| 8,981,793 B2 | 3/2015 | Mukherjee |
| 9,506,798 B2 * | 11/2016 | Saltzgiver ............ G01F 23/263 |
| 9,508,484 B2 | 11/2016 | Scholz |
| 9,576,267 B2 | 2/2017 | Kundra |
| 9,911,290 B1 * | 3/2018 | Zalewski ........... G06Q 30/0633 |
| 9,927,281 B1 | 3/2018 | Anand |
| 10,078,003 B2 | 9/2018 | Gurumohan |
| 10,127,520 B2 | 11/2018 | Kundra |
| 10,161,782 B2 * | 12/2018 | Saltzgiver ............ G01F 23/263 |
| 10,219,641 B2 | 3/2019 | Liao |
| 10,267,667 B2 | 4/2019 | Gurumohan |
| 10,324,075 B2 | 6/2019 | Gurumohan |
| 10,670,444 B2 | 6/2020 | Gurumohan |
| 10,800,644 B2 | 10/2020 | Hikem |
| 2002/0059828 A1 | 5/2002 | Muller |
| 2002/0070861 A1 | 6/2002 | Teller |
| 2003/0037613 A1 | 2/2003 | Mulrooney |
| 2004/0169600 A1 | 9/2004 | Haynes |
| 2005/0033532 A1 | 2/2005 | Mogadam |
| 2005/0072226 A1 | 4/2005 | Pappas |
| 2005/0087255 A1 * | 4/2005 | Humphrey ............ A47G 21/182 141/94 |
| 2005/0090743 A1 | 4/2005 | Kawashima |
| 2005/0268715 A1 | 12/2005 | Sabatino |
| 2006/0154642 A1 * | 7/2006 | Scannell, Jr. .......... G16H 10/60 455/404.1 |
| 2006/0201245 A1 | 9/2006 | Huber |
| 2006/0231109 A1 | 10/2006 | Howell |
| 2006/0270421 A1 | 11/2006 | Phillips |
| 2007/0008212 A1 | 1/2007 | Serban |
| 2007/0125162 A1 * | 6/2007 | Ghazi ................... G01F 23/292 73/149 |
| 2007/0191983 A1 | 8/2007 | Griffits |
| 2007/0261487 A1 | 11/2007 | Sintes |
| 2008/0004957 A1 * | 1/2008 | Hildreth ................ G06Q 30/02 705/14.64 |
| 2008/0036615 A1 | 2/2008 | Lyall, III |
| 2008/0147211 A1 | 6/2008 | Teller |
| 2008/0154522 A1 | 6/2008 | Welle |
| 2008/0250869 A1 | 10/2008 | Breed |
| 2008/0297403 A1 | 12/2008 | Aakerstroem |
| 2008/0314807 A1 | 12/2008 | Junghanns |
| 2009/0093983 A1 | 4/2009 | Trafford |
| 2009/0105969 A1 | 4/2009 | Saylor |
| 2009/0134183 A1 | 5/2009 | Odishoo |
| 2009/0289835 A1 | 11/2009 | Edvardsson |
| 2010/0070208 A1 | 3/2010 | Sai |
| 2010/0101317 A1 | 4/2010 | Ashrafzadeh |
| 2010/0108635 A1 | 5/2010 | Horstman |
| 2010/0200593 A1 | 8/2010 | Lazar |
| 2010/0270257 A1 | 10/2010 | Wachman |
| 2011/0042408 A1 | 2/2011 | Giordano |
| 2011/0166699 A1 | 7/2011 | Palmquist |
| 2011/0169635 A1 | 7/2011 | Johnson |
| 2012/0052802 A1 | 3/2012 | Kasslin |
| 2012/0206155 A1 | 8/2012 | Wang |
| 2013/0002443 A1 | 1/2013 | Breed |
| 2013/0073218 A1 | 3/2013 | Haas |
| 2013/0122817 A1 | 5/2013 | Pivaudran |
| 2013/0222135 A1 | 8/2013 | Stein |
| 2013/0313204 A1 | 11/2013 | Shalon |
| 2014/0149265 A1 | 5/2014 | Kundra |
| 2014/0208845 A1 | 7/2014 | Zlotnick |
| 2014/0251850 A1 | 9/2014 | Huang |
| 2014/0324585 A1 | 10/2014 | Mederos |
| 2014/0360270 A1 | 12/2014 | Koenig |
| 2015/0101405 A1 | 4/2015 | Gorenflo |
| 2015/0285775 A1 * | 10/2015 | Gurumohan ......... G06Q 10/087 702/187 |
| 2015/0334079 A1 | 11/2015 | Laidlaw |
| 2015/0355012 A1 * | 12/2015 | Gurumohan ............. H04Q 9/00 702/55 |
| 2016/0025545 A1 * | 1/2016 | Saltzgiver ............ G01F 23/2962 73/304 C |
| 2016/0137483 A1 | 5/2016 | Pfeiffer |
| 2016/0146659 A1 * | 5/2016 | Saltzgiver ............... A47G 23/16 206/459.1 |
| 2016/0178426 A1 | 6/2016 | Gurumohan |
| 2016/0194190 A1 | 7/2016 | Fogg |
| 2016/0198246 A1 * | 7/2016 | Gurumohan ............. H04Q 9/00 340/870.02 |
| 2016/0264394 A1 * | 9/2016 | Hershberger ........ B67D 1/0801 |
| 2017/0027229 A1 | 2/2017 | Cameron |
| 2017/0161676 A1 * | 6/2017 | Aji ....................... G06Q 10/087 |
| 2017/0292870 A1 | 10/2017 | Carter |
| 2017/0332813 A1 | 11/2017 | Liao |
| 2017/0337496 A1 * | 11/2017 | Jones ................... B67D 1/0848 |
| 2017/0337535 A1 * | 11/2017 | Jones ................... G06Q 20/145 |
| 2017/0340147 A1 * | 11/2017 | Hambrock ............ G01F 23/263 |
| 2017/0341830 A1 | 11/2017 | Nishizawa |
| 2018/0164143 A1 | 6/2018 | Gurumohan |
| 2018/0202853 A1 | 7/2018 | Boström |
| 2018/0328776 A1 | 11/2018 | Gurumohan |
| 2019/0242816 A1 | 8/2019 | Conner |
| 2019/0274456 A1 | 9/2019 | Hambrock |
| 2020/0033179 A1 | 1/2020 | Gurumohan |
| 2020/0056919 A1 * | 2/2020 | Jones ................... G01F 15/061 |
| 2020/0172387 A1 * | 6/2020 | Hershberger ........ B67D 1/0801 |

OTHER PUBLICATIONS

Kreutzer et al., "Radio Frequency Identification Based Detection of Filling Levels for Automated Monitoring of Fluid Intake", Dec. 5, 2014, Proceedings of the 2014 IEEE International Conference on Robotics and Biomimetics, pp. 2049-2054.

(56) References Cited

OTHER PUBLICATIONS

Matthew Tait, "Smart Drink Bottle", Sep. 10, 2018, ip.com, IPCOM000255205D, pp. 1-23.

Sing et al., "A Microcontroller-based System for Liquid Level Detection Using Infrared Sensing", 2015, 2015 IEEE Student Conference on Research and Development (SCOReD), pp. 294-299.

Amanda Macmillan. It's the Water Bottle of the Future-and You can Pre-Order It Now! Fitness (Flash/Fitness-Blog/) Oct. 7, 2013. http://www.self.com/flash/fitness-blog/2013/10/fitness-water-bottle-of-the-future/.

Jonah Comstock. Slideshow: 8 Pillboxes that Connect to Your Phone. Mobihealth News. Mar. 13, 2013. http://mobihealthnews.com/20795/slideshow-8-pillboxes-that-connect-to-your-phone/2/.

\* cited by examiner

1406

BASE STATION AND ADVERTISING PACKETS OF SENSORS DETECTING CONTENT LEVEL

CROSS REFERENCE TO OTHER APPLICATIONS

This application claims priority to U.S. Provisional Patent Application No. 62/505,053 entitled BASE STATION FOR SENSORS DETECTING CONTENT LEVEL filed May 11, 2017, and claims priority to U.S. Provisional Patent Application No. 62/505,054 entitled ULTRASONIC BEAM FOCUSER filed May 11, 2017 and claims priority to U.S. Provisional Patent Application No. 62/505,055 entitled ANALYSIS OF SALE OF CONSUMPTION AND PHYSICAL CONSUMPTION filed May 11, 2017, all of which are incorporated herein by reference for all purposes.

BACKGROUND OF THE INVENTION

Certain items such as food and beverages are often sold and stored in product containers. In many instances, a consumer periodically performs a visual check to inventory contents remaining in food and beverage containers. In another example, bar and restaurant operators periodically inventory the amount of content left in bottles to determine the amount sold and identify quantity and type of products to be purchased/replenished. The inventory of content remaining in product containers has been traditionally determined manually. This manual process is often laborious, imprecise, and error prone. For example, it is often difficult for a person to visually determine an amount of liquid beverage remaining in a bottle with precision in a reliable manner. In commercial settings, the amount of time spent by an employee to manually inventory the remaining content represents a real employment cost realized by the employer.

BRIEF DESCRIPTION OF THE DRAWINGS

Various embodiments of the invention are disclosed in the following detailed description and the accompanying drawings.

DETAILED DESCRIPTION

Figure 1:
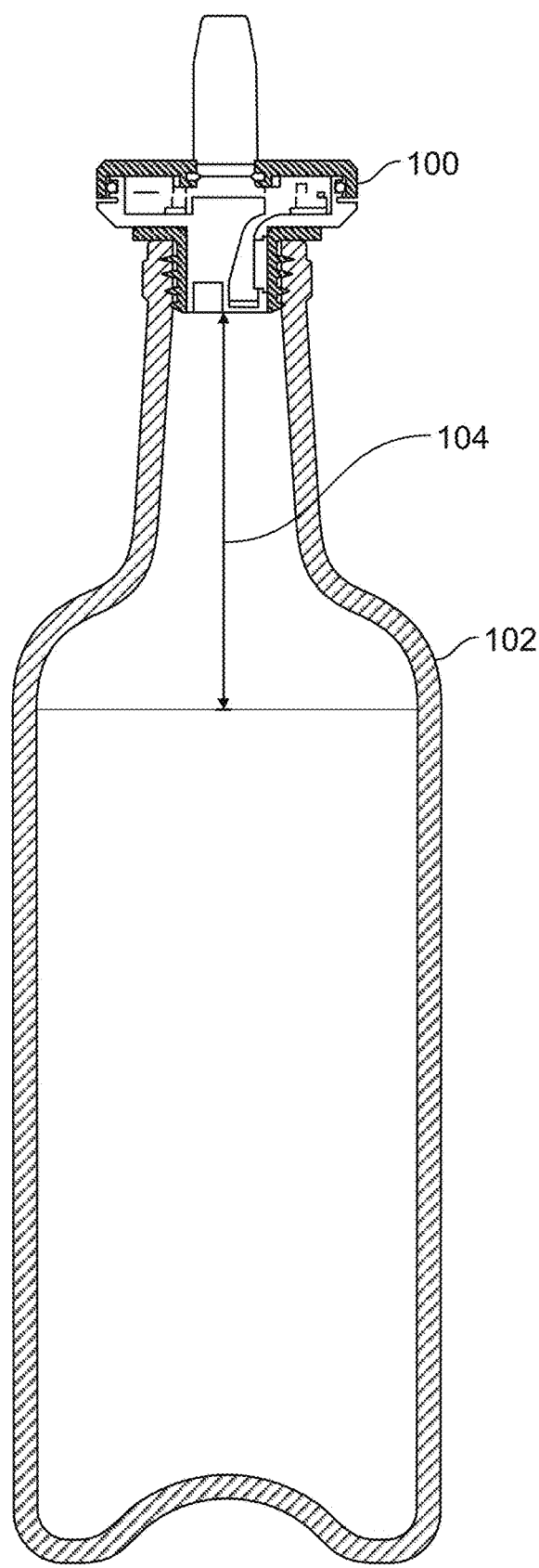
FIG. 1 is a diagram illustrating an embodiment of a fill level sensor device engaged in a container.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A sensor device is disclosed. For example, the sensor device is a container cover (e.g., sensor device also functions as a bottle cap) that electronically measures an amount of liquid remaining in a container (e.g., beverage bottle) engaged the container cover. In some embodiments, the sensor device includes a content level sensor. For example, the sensor transmits an ultrasonic signal and measures the amount of time it takes for the signal to bounce off a liquid content remaining in the container and return back to the sensor to determine the liquid level remaining in the container. The sensor device includes a transmitter that transmits an interrogation signal. For example, a speaker transmits an ultrasonic signal. The sensor device also includes a receiver that receives the interrogation signal that has been reflected within a container. For example, the received interrogation signal is processed to determine a fill level of the container.

In some embodiments, the transmitter and receiver are configured to be located within an interior of the container when the container cover engages the container. Because the transmitter and receiver may be adversely damaged/affected by contents of the container while inside the container, the transmitter and receiver may be required to be protected from the contents of the container. For example, alcohol or acidic beverages may damage the receiver/transmitter if it comes in direct contact. In some embodiments, a protective material (e.g., barrier film) covers at least the transmitter and/or the receiver. The protective material may protect the transmitter from direct exposure to contents of the container. However, the protective material may adversely affect the quality of the transmitted signal required to accurately detect the fill level of the container. In order to be able to effectively transmit the interrogation signal through the protective material, the transmitter and the protective material are positioned to create an engineered gap of a preset distance to allow the protective material to effectively transmit the interrogation signal. For example, effective vibration of the protective material may be achieved at a certain distance between the transmitter and the protective material without directly attaching the transmitter to the protective material. In some embodiments, the protective material (e.g., barrier film) covers the receiver and the receiver receives through the protective material the transmitted signal that has been reflected by contents of the container.

In some embodiments, the sensor device includes a sensor that detects that the device has been triggered. For example, an accelerometer/motion sensor included in the sensor device detects that the device has been moved. This movement may correspond to consuming contents from the container that is engaged with the sensor device (e.g., bottle cap with sensor removed from bottle to pour contents out of the bottle, bottle tipped over to pour contents out of a spout on the sensor device that also functions as a pourer, etc.) and the trigger initiates a measurement of a fill level of contents in the container. Because it is power intensive to perform the measurement, using the triggering condition to initiate the measurement allows power to be conserved from not having to perform measurements when the triggering condition is not met.

When the transmitter of the sensor device transmits an ultrasonic signal, the amount of time it takes for the signal to bounce off content remaining in the container and return back to the sensor is measured to determine the amount of content remaining in the container. However, not only does the reflected signal reflect off the content remaining in the container in a direct path, the transmitted signal reflects off walls of the container as well as the contents of the container in non-direct paths. Because multiple reflections are received by a receiver of the sensor device, any reflection that does not indicate the current fill level of the container needs to be minimized. In some embodiments, a propagation chamber is placed over the transmitter and/or the receiver such that a signal transmitted by the transmitter is propagated via the propagation chamber and/or a signal received by the receiver is received via the propagation chamber. For example, when the signal is emitted by the transmitter, the signal spreads out from the transmitter with a certain beam width. The propagation chamber helps narrow the beam width of the emitted signal by bouncing the signal that hits the walls of the propagation chamber to be redirected in a desired direction towards the contents of the container.

Despite efforts to reduce the unwanted reflections within the container, unwanted reflections off walls of the container as well as the contents of the container in non-direct paths will be detected by the signal receiver. Because multiple reflections are received by a receiver of the sensor device, the actual direct reflection that indicates the current fill level of the container needs to be identified among various detected reflections. For example, each reflection corresponds to different distances traveled by the interrogation signal and consequently corresponds to different potential container fill levels. The received signal is digitally analyzed and one of the reflections is selected as the selected reflection that corresponds to a selected container fill level. This selected container fill level is utilized to provide the current detected container fill level.

In some embodiments, the detected container fill level is correlated with transaction data (e.g., sale of an item that utilizes the content dispensed from the container as its ingredient). This allows automatic inventory management and tracking that are correlated with specific sales. For example, specific product sales data (e.g., cocktail drinks sales data) is received from a point of sales system. The amounts of content dispensed from the containers using the sensor devices that are tracked are correlated with this sales data to attribute specific dispensed container content to a specific transaction/product sale. This correlation may be performed by matching the amount of content dispensed from a container with at least one of the ingredient contents known to be required for the transaction/product sale.

In some embodiments, the sensor device wirelessly provides measurement data to a base station device that relays the received measurement data to a network cloud server. However, because a large number of sensor devices may exist in a deployment environment, transmissions to the base station from different sensor devices may collide with one another. Additionally, it may be too power intensive for the sensor device to communicate using an established two-way communication channel that ensures delivery of the measurement data. Thus, rather than using a two-way communication channel, the sensor device may broadcast the measurement data in an advertisement packet (e.g., using an advertising packet of a BLUETOOTH Low Energy protocol). Because advertising packets are not guaranteed to be received by the base station, the advertising packets that includes the same measurement data is repeatedly broadcasted by the sensor device based at least in part a likelihood of the advertising packet colliding with other advertising packets from other sensor devices. For example, the number of repeated broadcast of the advertising packet is based on a total number of sensor devices configured to communicate with the base station (e.g., total number of sensor devices in the deployment environment). This allows an increase in the repetition of an advertisement packet with an increase in chances of collisions due to an increase in the number of sensor devices. Once an advertisement packet is received by the base station, it may extract payload content from the advertisement packet and provide at least a portion of the payload content to the server.

FIG. 1 is a diagram illustrating an embodiment of a fill level sensor device engaged in a container. Container 102 is filled with a liquid. In the example shown, fill level sensor device 100 is configured as a container cover (e.g., a bottle cap pourer with a spout). The liquid fill level of container 102 may be determined by measuring the distance between sensor device 100 and the liquid surface of container 102. As shown by line 104, a transmitter of sensor device 100 sends out a signal (e.g., ultrasonic signal) that gets reflected by the surface of the liquid. The reflected signal is detected by a receiver of sensor device 100.

By measuring the amount of time it took to receive the reflected signal, the distance traveled by the signal before being reflected (e.g., distance between sensor device 100 and liquid surface is half of the total distance traveled by the signal) may be determined by multiplying the amount of time by the speed of the signal (e.g., speed of sound).

In some embodiments, to determine the amount of time it took to receive the reflected signal, the received reflected signal is filtered to isolate the desired signal (e.g., band-pass filter the received signal), amplified, and analyzed to detect peaks that correspond to when the reflected signal was received. A predetermined beginning portion (e.g., predetermined amount of time in the beginning of the signal) of the received signal may be ignored when analyzing the signal to ignore signals that were detected due to coupling between the transmitter and receiver of sensor device 100. For example, when the transmitter transmits the signal, the signal may be received by the receiver of sensor device 100 (e.g., conducted through sensor device 100, due to undesired reflection, etc.) before the signal is reflected by the contents of the container, and the undesired received signals received in the beginning portion of the received signal are ignored when identifying the desired received reflected signal.

If the total distance between the bottom of container 102 and sensor device 100 is known, the fill height of container 102 can be determined (e.g., total distance between bottom and sensor device 100 minus distance between sensor device 100 and liquid surface). If the shape and volume of the bottle are known, the volume of liquid contained in container 102 may be determined. For example, a table/database/data structure that maps fill level (e.g., fill height, height between liquid surface and sensor device 100, etc.) to liquid volume of the container is utilized to determine liquid volume corresponding to the determined fill level. Different tables/databases/data structures may exist for different types of containers.

Figure 2A:
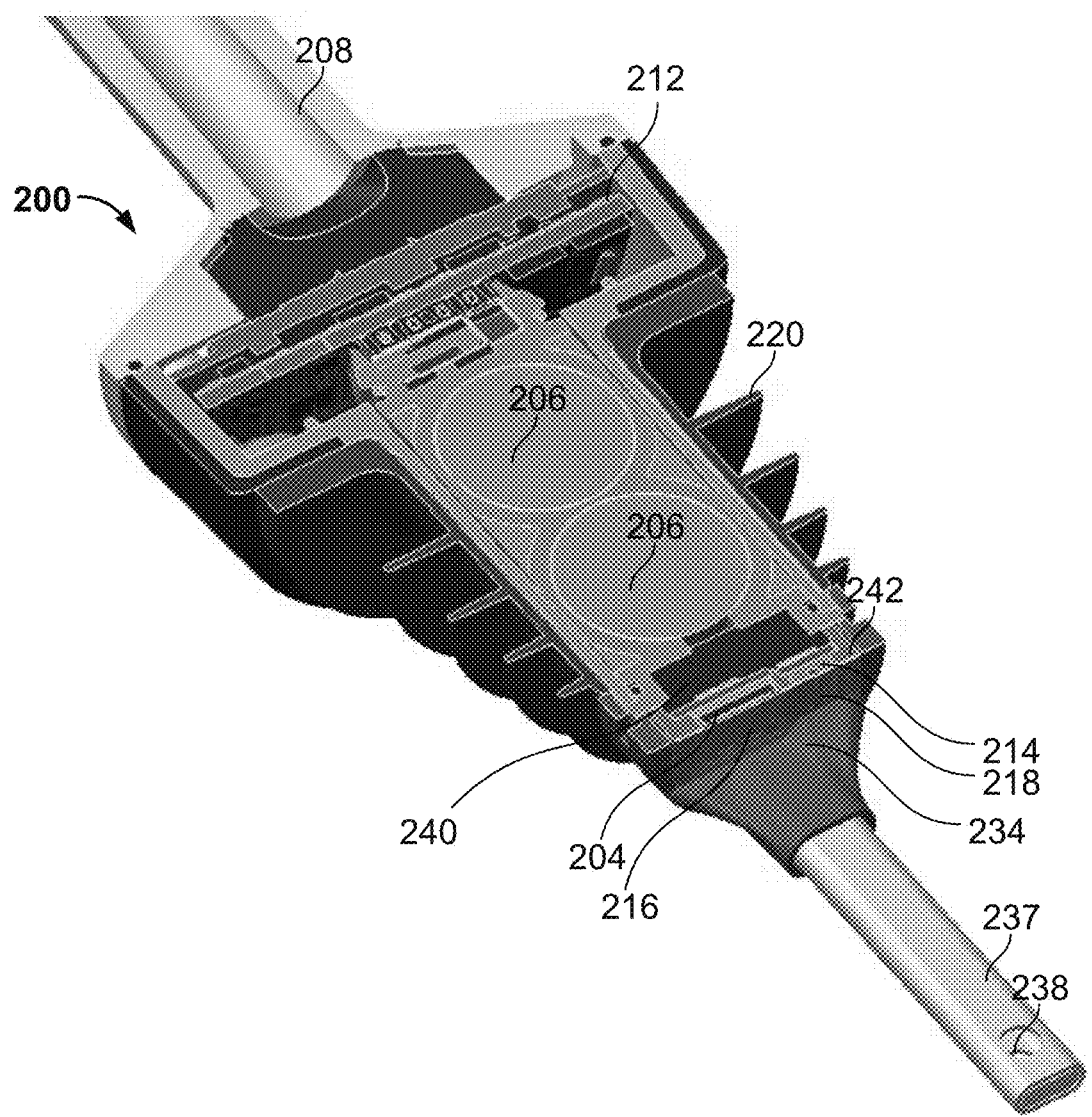
FIG. 2A is an example profile cross-sectional diagram illustrating an embodiment of a fill level sensor device.
Figure 2B:
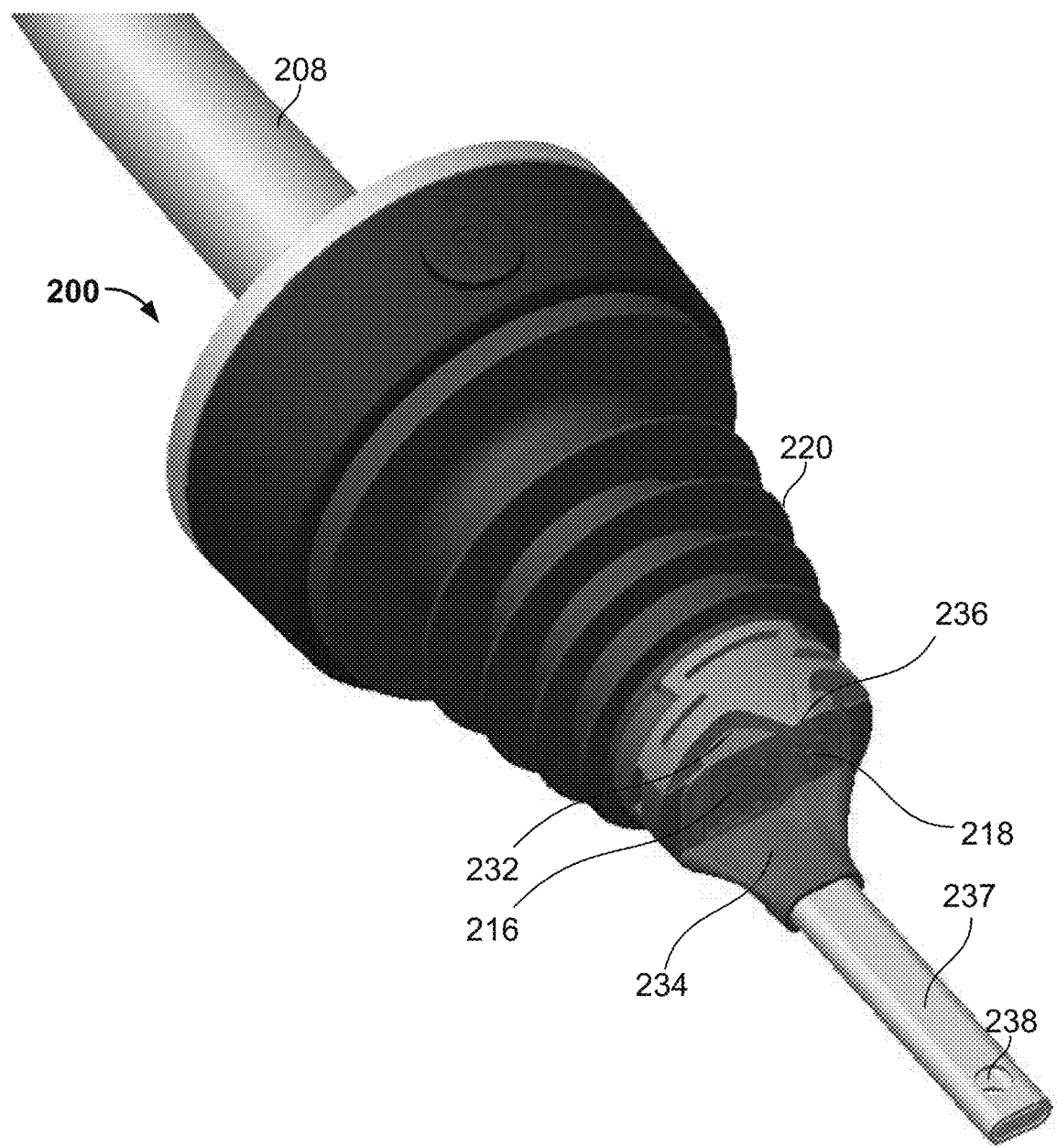
FIG. 2B is an example side cross-sectional diagram illustrating the sensor device of FIG. 2A.
Figure 2C:
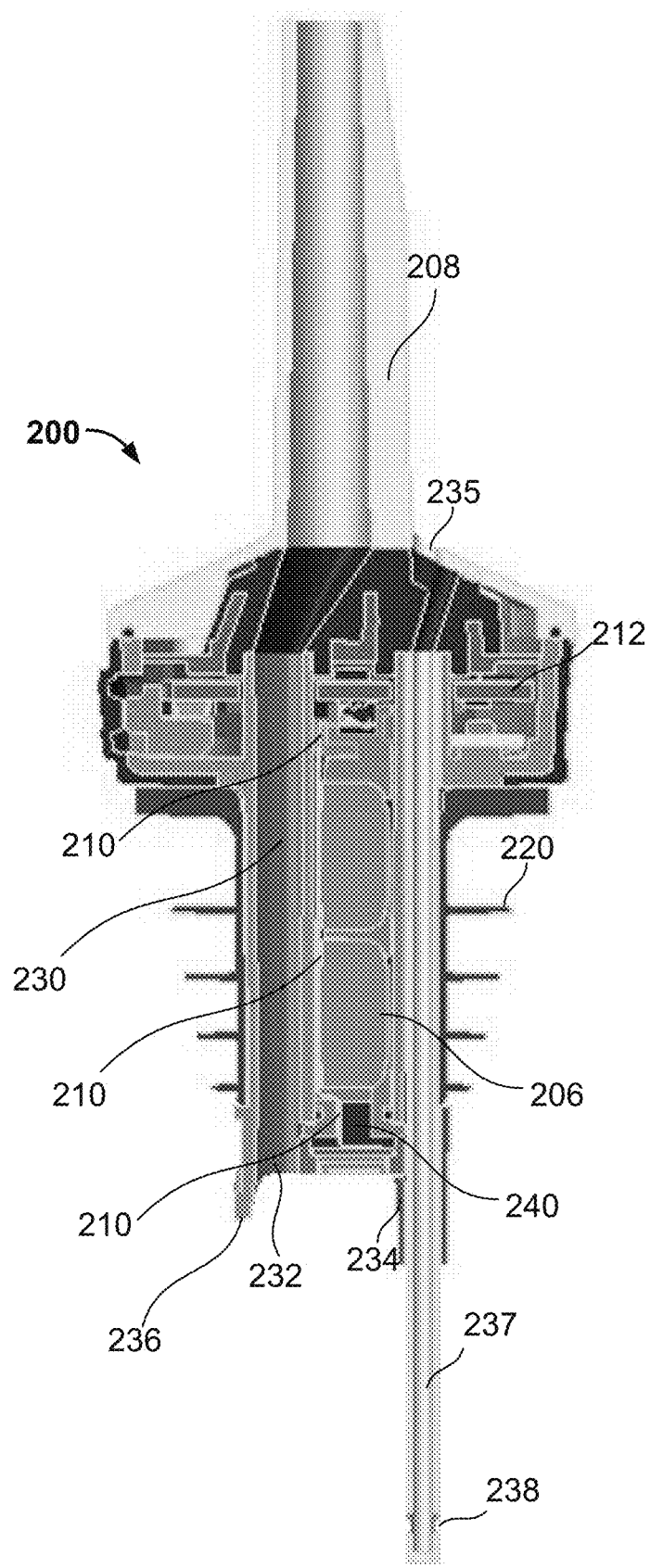
FIG. 2C is an example diagram of an external profile view of the sensor device of FIG. 2A.
Figure 2D:
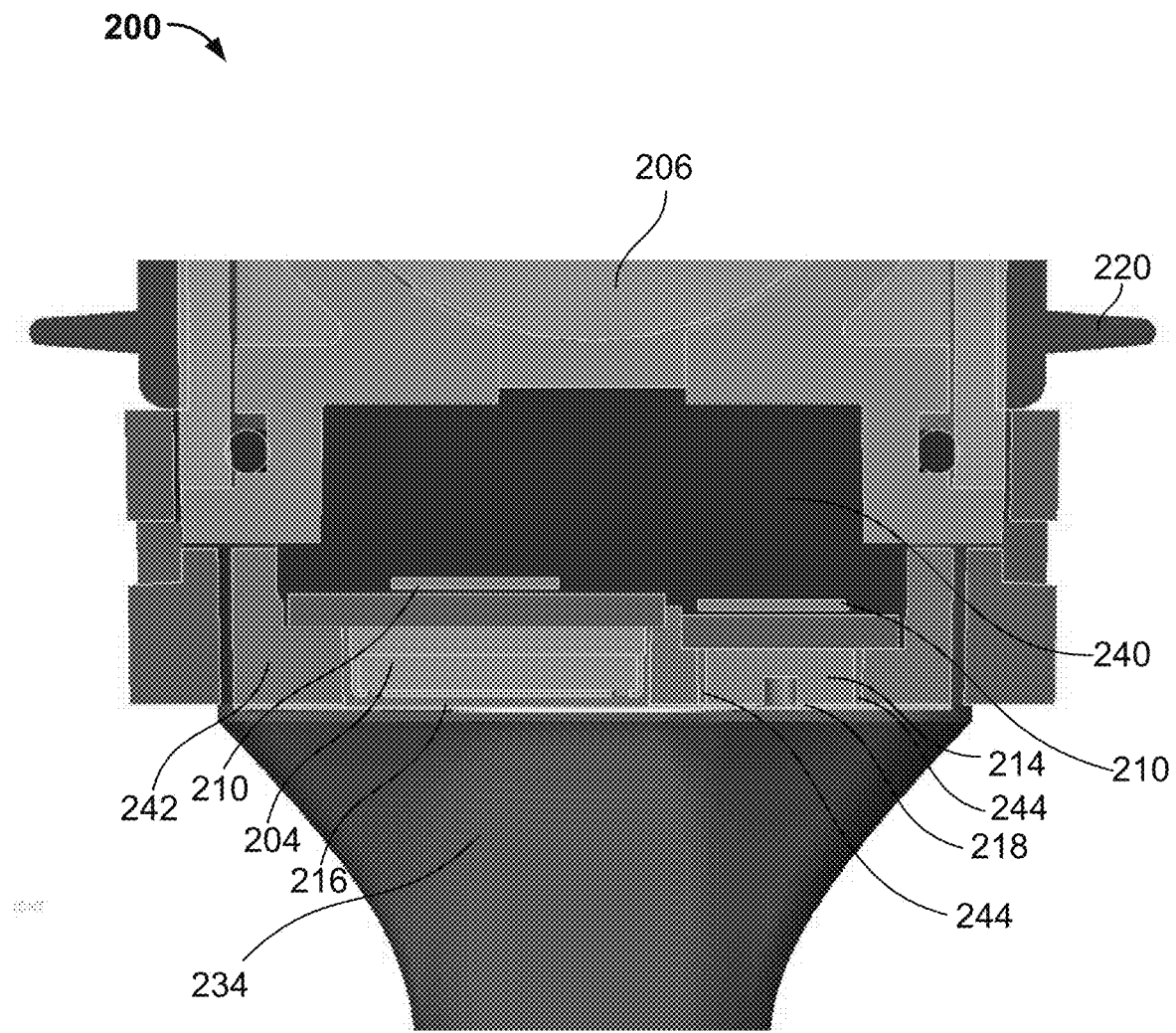
FIG. 2D is an example diagram of a bottom region close up view of the sensor device of FIG. 2A.

FIG. 2A is an example profile cross-sectional diagram illustrating an embodiment of a fill level sensor device. FIG. 2B is an example side cross-sectional diagram illustrating the sensor device of FIG. 2A. FIG. 2C is a diagram illustrating an example external profile view of the sensor device of FIG. 2A. FIG. 2D is a diagram illustrating an example bottom region close up view of the sensor device of FIG. 2A.

In some embodiments, sensor device 200 is sensor device 100 of FIG. 1. In the examples shown, sensor device 200 is configured to function as a bottle stopper with a spout. Sensor device 200 includes flexible container coupling ridges 220 (e.g., elastomer/rubber rings) that allow sensor device 200 to be coupled to and seal an opening of a container. However, in other embodiments, sensor device 200 may be configured as a different cover of a container. For example, the components of sensor device 200 may be included in a screw-on cap or any other cap that engages a container.

Sensor device 200 includes circuit board 212. For example circuit board 212 is a printed circuit board. Circuit board 212 may connect together one or more of the following included in sensor device 200: a processor, a memory, a data storage, a connector, an integrated chip, a transmitter, a receiver, an accelerometer, a tilt sensor, an orientation sensor, a solar panel, a display, a gyroscope, a wireless data communication signal transmitter (e.g., a component able to communicate using Bluetooth, Wi-Fi, other wireless protocol, etc.), and other electrical components. For example, a processor connected to circuit board 212 provides a command to transmit an acoustic signal using a transmitter and processes a received signal to determine a fill level indicator. The fill level indicator may be transmitted wirelessly to another device such as a mobile device, a computer, a display device, or any other computing or display device using a wireless data communication transmitter. Circuit board 212 is connected to batteries 206. Battery 206 provides power to the circuit of circuit board 212. Battery 206 may be rechargeable and/or replaceable. In the embodiment shown, at least a portion of the batteries are in the neck of sensor device 200. For example, when sensor device 200 is engaged with a container, at least a portion of the batteries are positioned inside the container. By placing the batteries inside the neck of sensor device 200 that is configured to be placed inside the container, space within the neck of sensor device 200 that is otherwise required for ridges 220 to engage with the container is efficiently utilized. As shown in the example, a plurality of batteries may be used and positioned next to each other lengthwise in the neck of sensor device 200. The housing of sensor device 200 may be composed of one or more materials. Examples of the materials include a food grade polymer, elastomer, plastic, rubber (e.g., synthetic or otherwise), stainless steel, and other metals.

Sensor device 200 includes spout 208. Spout 208 is a part of a passage channel (e.g., hollow tube) that allows container contents (e.g., liquid) to pass through to the tip opening of spout 208 from a bottom of sensor device 200. This passage channel is shown as channel 230 and channel 232 in the figures. For example, a liquid contained in a container that is capped by sensor device 200 is able to pass through sensor device 200 and exit the opening of spout 208 when the container capped by sensor device 200 is tipped over. In some embodiments, circuit board 212 includes an opening hole that accommodates the passage channel that allows container contents (e.g., liquid) to pass through the circuit board. In other embodiments, spout 208 may not exist in sensor device 200. In some embodiments, sensor device 200 includes a vent tube that allows air to enter a container capped by sensor device 200 as content of the container is poured out through spout 208. In some embodiments, sensor device 200 includes a motor (not shown) that pumps out contents of the container capped by sensor device 200. Air vent 235 allows air to enter the container when container contents are poured out of spout 208. Air vent 235 allows air to flow to the bottom of sensor device 200 (e.g., into container) via the channel of vent tube 237. The length of vent tube 237 has been specifically selected to achieve a desired flow rate out of spout 208. In various embodiments, the length of vent tube 237 is between 3-12 centimeters. For example, vent tube 237 is substantially 7 centimeters in length. Vent tube 237 is sealed/blocked at the end of the vent tube. Instead of allowing air to flow via this blocked end, vent tube 237 includes side holes 238 where air from air vent 235 may pass. By forcing air through side holes 238, the rate of air flow from air vent 235 may be controlled (e.g., rate of flow reduced as compared to having a simple hollow tube with an open end as the vent tube). For example, the contents remaining inside channel 230 from pouring contents out of spout 208 may be forced out of spout 208 from pressure differential created from turning the container upright and the controlled air flow may reduce this from happening. In some embodiments, by sealing/blocking the end of vent tube 237, a likelihood that contents of a container would be forced into vent tube 237 when the container is tipped is reduced.

Circuit board 212 is electrically connected to transmitter 204. In some embodiments, transmitter 204 is an acoustic transmitter (e.g., ultrasonic signal transmitter). For example, transmitter 204 is a speaker. In some embodiments, transmitter 204 is a piezoelectric speaker. In some embodiments, transmitter 204 is configured to transmit a signal within the ultrasonic frequencies. In some embodiments, transmitter 204 is configured to transmit a signal between 1 kHz and 400 kHz, inclusive (e.g., transmit at 300 kHz). In some embodiments, transmitter 204 is configured to transmit a 29 kHz to 40 kHz signal. In some embodiments, transmitter 204 is an acoustic impulse generator. Receiver 214 is electrically connected to circuit board 212. In some embodiments, receiver 214 is an acoustic receiver (e.g., ultrasonic signal receiver). In some embodiments, receiver 214 is a microphone. In some embodiments, receiver 214 is a Micro Electro Mechanical Systems (MEMS) microphone. For example, receiver 214 is 2 millimeter×3 millimeter in size. Receiver 214 and transmitter 204 are connected to circuit board 212 via connector 210. As shown in FIG. 2C, connector 210 is routed from bottom of device 200 via the neck of device 200 to circuit board 212. Examples of connector 210 include a wire, a bus, a flexible printed circuit board, and any other connector able to transmit a signal. For example, connector 210 connects to the rear of receiver 214 and transmitter 204 via one or more connectors mounted on receiver 214 and transmitter 204.

In some embodiments, because debris, liquid, and other materials may affect the performance and durability of transmitter 204 and receiver 214 (e.g., when using spout 208 to pour out contents of the container), transmitter 204 and receiver 214 are placed in protected compartments. In some embodiments, a protective layer material covers transmitter 204 and receiver 214. Ideally the protective material must not allow undesired material through while at the same time allowing signals (e.g., acoustic signals) to pass through. Protective material 216 covers transmitter 204 and is attached to edges surrounding the assembly forming the compartment that houses transmitter 204. Protective material 216 covers receiver 214 and is attached to edges surrounding the assembly forming the compartment that houses receiver 214. In some embodiments, protective material 216 and protective material 218 are the same continuous material. For example, a single connected sheet includes both protective material 216 and protective material 218. In some embodiments, protective material 216 and protective material 218 are not continuous materials. For example, in order to maximize decoupling of the transmitted signal of transmitter 204 and the received signal of receiver 214, protective material 216 and protective material 218 are not made of the same continuous material. In some embodiments, protective material 216 and protective material 218 are different materials. Examples of protective material 216 and protective material 218 include one or more of the following: Mylar sheet, waterproof mesh, acoustic sheet, Teflon, Gortek, polytetrafluoroethylene (PTFE), polyethylene terephthalate (PET), polyethylene terephthalate glycol-modified (PETG), polycarbonate, and any other appropriate mesh or membrane that may be porous or non-porous. For example, a Mylar sheet covering does not allow liquid to pass through while acting like a drum to allow acoustic signals to pass through. In some embodiments, protective material 216 and/or protective material 218 are acoustically transmissive liquid blocking materials. In some embodiments, protective material 216 and/or protective material 218 is optional. In some embodiments, protective material 216 and 218 are attached to device 200 via a food-safe adhesive.

A gap distance has been engineered to be between transmitter 204 and protective material 216. For example, transmitter 204 is mounted in a manner that ensures a predetermined gap between transmitter 204 and protective material 216. In various embodiments the gap between transmitter 204 and protective material 216 is approximately 0.2 millimeters. For example, in order to be able to effectively transmit the interrogation signal through the protective material, the transmitter and the protective material are positioned to create an engineered gap of a preset distance to allow protective material to effectively transmit the interrogation signal. Effective vibration of the protective material may be achieved at a certain distance (e.g., resonance distance) between the transmitter and the protective material without directly attaching the transmitter to the protective material. In some embodiments, the gap is an air gap between transmitter 204 and protective material 216. In various embodiments the gap may include other gases, liquids and/or solids placed between transmitter 204 and protective material 216 to achieve desired signal transmission properties via the gap and the protective material.

In some embodiments, receiver 214 is in direct contact with protective material 218. For example, receiver 214 is mounted in a manner that ensures that receiver 214 contacts protective material 218. For example, in order to be able to effectively receive the reflected interrogation signal through the protective material, the receiver is in contact with the protective material. In some embodiments, receiver 214 is attached to protective material 218 via adhesive (e.g., pressure sensitive adhesive). For example, a surface of receiver 214 is coated with the adhesive and allowed to be attached to protective material 218.

Transmitter 204 and receiver 214 are sealed and attached to assembly 242 of device 200 using a potting material. For example, a cavity behind transmitter 204 and receiver 214 within an assembly of device 200 is filled with the potting material to secure the transmitter and the receiver from movement as well as minimize/isolate direct signal transmission (e.g., minimize signal directly reaching from transmitter to receiver via the housing of device 200). As shown in the figures, potting material 240 fills the cavity behind transmitter 204 and receiver 214. For example, the potting material has been injected into the cavity via an opening in the assembly of device 200. Potting material 240 may be a solid or gelatinous compound. For example, plastics, silicone, elastomer, epoxy, and/or rubber (e.g., synthetic or otherwise) may be utilized as potting material 240.

In some embodiments, in order to dampen the signal/vibration/noise reaching receiver 214 (e.g., conducted at least through assembly 242 from transmitter 204), at least a portion of receiver 214 is placed in contact with (e.g., coupled to) a dampening material. For example, at least a portion of one or more sides and/or front of receiver 214 contacts the dampening material (e.g., placed between assembly 242 and receiver 214). Examples of the dampening material include foam, elastomer, rubber (e.g., synthetic or otherwise), silicone, and/or polymer. In some embodiments, the dampening material is included in at least a portion of region 244 between assembly 242 and receiver 214 (e.g., receiver 214 is seated in the dampening material that is placed within assembly 242 and the dampening material contacts both receiver 214 and assembly 242).

Device 200 includes drip collectors 234 and 236. Because the bottom of device 200 is exposed to the content of the container when device 200 is engaged with the container, liquid or other content of the container may bead on and attach to device 200 (e.g., when the sensor is tipped over to pour out contents via the spout or when the contents splash in the container during movement and transport). Beading of contents on device 200 may interfere with signal transmission and detection required to detect fill levels of the container. For example, when liquid beads form on protective material 216 and/or protective material 218, it may interfere with signal transmission of transmitter 204 and/or signal receipt of receiver 214. In order to reduce the chances of content remaining on the surfaces of protective material 216 and/or protective material 218, drip collectors 234 and 236 have to be shaped to pull away content remaining on the bottom of device 200. For example, when device 200 is placed upright, the slope of the drip collectors aids the gravitational pull of any beaded content away from the drip collectors to back down into the container. When beaded content on the drip collector is pulled down along the slope of the drip collectors by gravitational forces, beaded content remaining on protective materials 216 and 218 may also be pulled along the slope of the drip collectors back down into the container. In some embodiments, drip collectors 234 and 236 aids in the breaking of the surface tension of content deposited on protective materials 216 and/or 218 by wicking away the content with the aid of the slope of the drip collectors 234 and 236 that leverages the gravitational pull down the slope the drip collectors.

As shown in the figures, drip collector 234 is adjacent to protective materials 216 and 218 and forms a slope connecting a horizontal surface of protective materials 216 and 218 to a perpendicular vertical surface. Drip collector 234 is adjacent to the opening of channel 232 and aids in the removal of content beading/forming on the lip of channel 232 and protective materials 216 and 218. The tip (e.g., narrowing surface) formed by the shape of drip collectors 234 and 236 allows concentration of content as the content flows down the drip collectors to allow concentration of content that aids to increase gravitational pull and reduce surface tension. In some embodiments, channel 232 does not exist (e.g., bottle stopper sensor device) and drip collector 236 is shaped to form a slope from the plane of protective materials 216 and 218 to the vertical tip of drip collector 236. The surface of drip collectors 234 and 236 have been formed and/or coated to be substantially smooth (e.g., to further reduce friction/tension).

In an alternative embodiment, rather than utilizing a separate transmitter and a separate receiver, a transceiver that acts as both a receiver and transmitter is utilized. For example, receiver 214 is not utilized and transmitter 204 is a transceiver (e.g., piezoelectric transceiver).

Figure 3A:
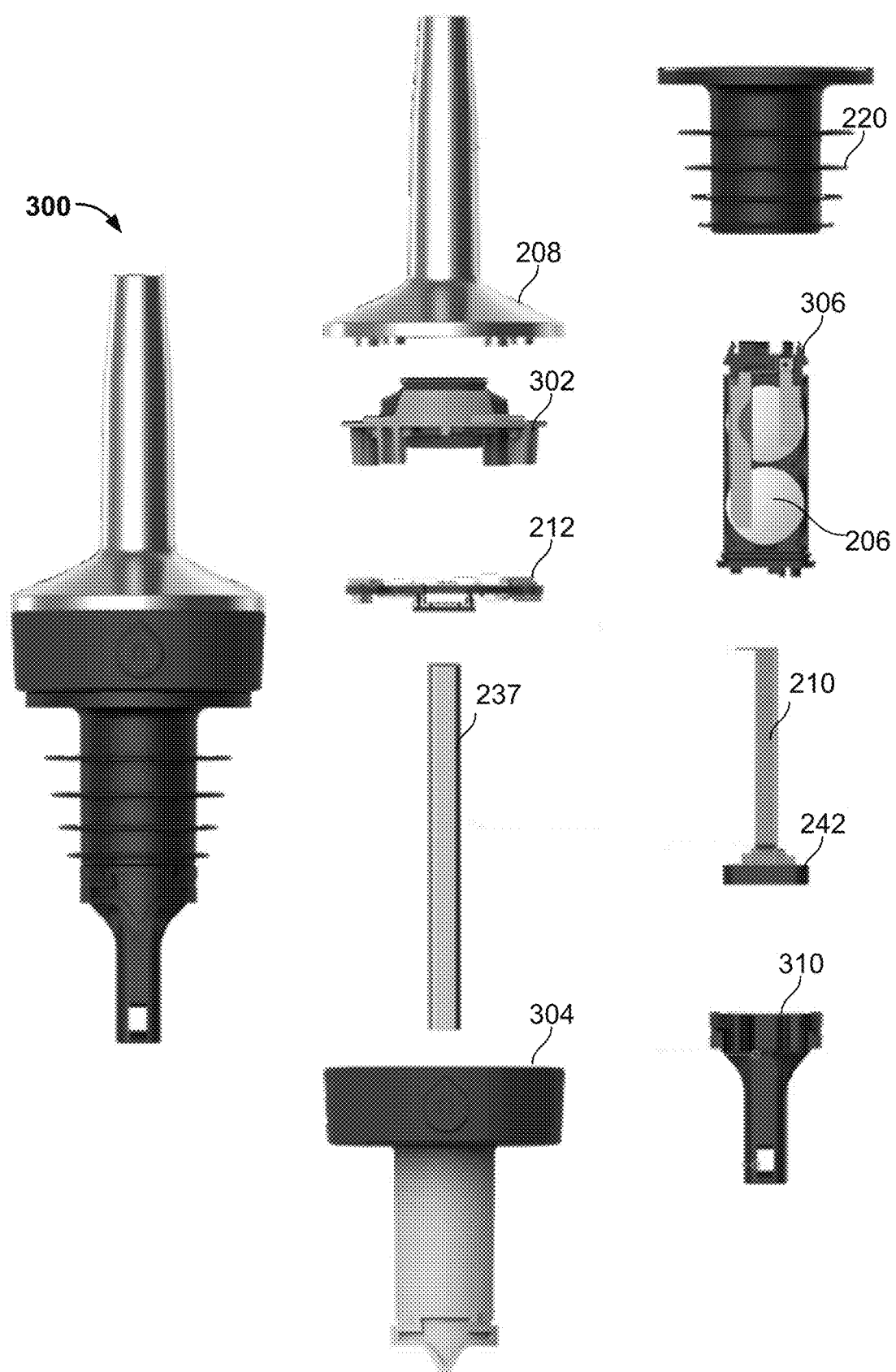
FIG. 3A is a diagram showing components of a pourer fill level sensor.

FIG. 3A is a diagram showing example components of a pourer fill level sensor. FIG. 3A shows components of fill level sensor device 300. Fill level sensor device 300 is an example of a fill level sensor device 200 with a pouring spout shown in FIGS. 2A-2D.

Pour spout 208 is made of metal and coated with metal (e.g., chrome). This may aid in the durability and pour flow rate. Sealing spacer 302 seals the content pour channel as the air vent channel between components and also functions as a spacer for assisting the alignment of circuit board 212 during assembly. Circuit board 212 includes one or more holes to accommodate the pour channel and the air vent channel. Vent tube 237 includes metal components and extends from a vent hole on pour spout 208 through sealing spacer 302 and circuit board 212 and through drip collector 310 that includes drip collector 234.

Housing 304 includes plastic and elastomer components. Elastomer rings 220 fit over the neck portion of housing 304. Battery holder 306 includes batteries 206 and is inserted inside the neck of housing 304. Battery holder 306 allows connector 210 to be routed from one end of the battery holder 306 near the transmitter and receiver to the other end of battery holder 306 to allow connector 210 to connect the transmitter and receiver to circuit board 212. Sensor holder assembly 242 includes a frame to position a transmitter and a receiver in assembly 242. Holder assembly 242 includes a raised edged surface where a protective material (e.g., materials 216 and 218) is attached to cover the transmitter and receiver. Holder assembly 242 is configured to be coupled to an end of battery holder 306 such that backsides of the transmitter and receiver face battery holder 306. After battery holder 306 and holder assembly 242 are coupled together, a potting material may be injected into a cavity between them to attach battery holder 306 and holder assembly 242 together as well as seal the transmitter and receiver within the holder assembly 242 (e.g., backsides of the transmitter and receiver are exposed and attached to the potting material).

In some embodiments, a sealing material seals edges of protective material attached to holder assembly 242 and the external exposed surface of the potting material (e.g., potting material exposed from a hole used to inject the potting material between battery holder 306 and holder assembly 242) to protect them from being damaged by contents (e.g., alcohol, acidic beverage, etc.) of a container.

Figure 3B:
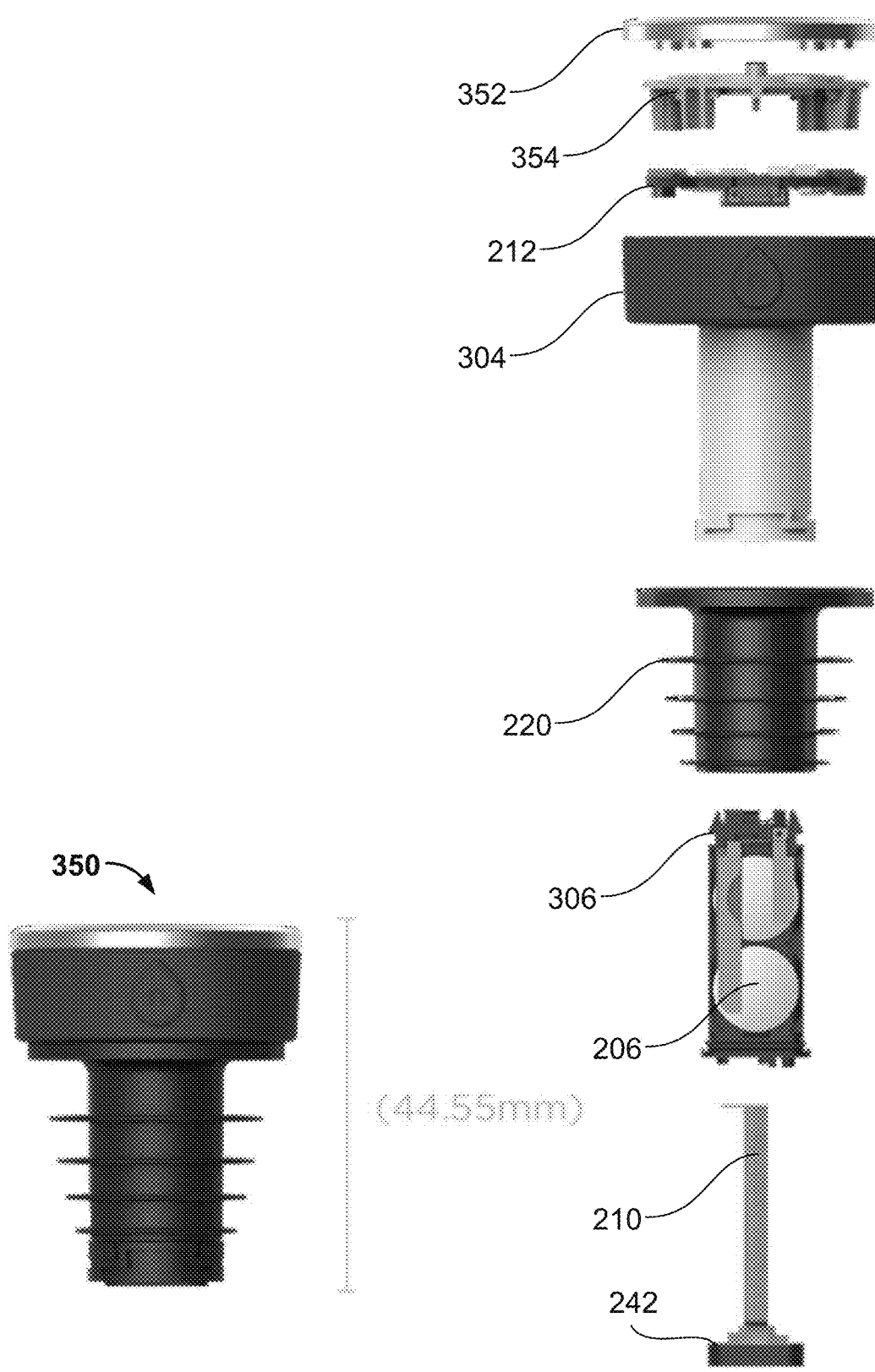
FIG. 3B is a diagram showing components of a stopper fill level sensor.

FIG. 3B is a diagram showing example components of a stopper fill level sensor. FIG. 3B shows components of fill level sensor device 350. Fill level sensor device 350 is an example of fill level sensor device 200 without a pouring spout and utilizes many of the same components of fill level sensor 200 shown in FIGS. 2A-2D.

Top cap 352 is made of metal. Spacer 354 assists in the alignment of circuit board 212 during assembly. Housing 304 includes plastic and elastomer components. Elastomer rings 220 fit over the neck portion of housing 304. Battery holder 306 includes batteries 206 and is inserted inside the neck of housing 304. Battery holder 306 allows connector 210 to be routed from one end of the battery holder 306 near the transmitter and receiver to the other end of battery holder 306 to allow connector 210 to connect the transmitter and receiver to circuit board 212. Sensor holder assembly 242 includes a frame to position a transmitter and a receiver in assembly 242. Holder assembly 242 includes a raised edged surface where a protective material layer (e.g., materials 216 and 218) is attached to cover the transmitter and receiver. Holder assembly 242 is configured to be coupled to an end of battery holder 306 such that backsides of the transmitter and receiver face battery holder 306. After battery holder 306 and holder assembly 242 are coupled together, a potting material may be injected into a cavity between them to attach battery holder 306 and holder assembly 242 together as well as seal the transmitter and receiver within the holder assembly 242 (e.g., backsides of the transmitter and receiver are exposed and attached to the potting material). In some embodiments, a sealing material seals edges of protective material attached to holder assembly 242 and the external exposed surface of the potting material (e.g., potting material exposed from a hole used to inject the potting material between battery holder 306 and holder assembly 242) to protect them from being damaged by contents (e.g., alcohol, acidic beverage, etc.) of a container.

Figure 3C:
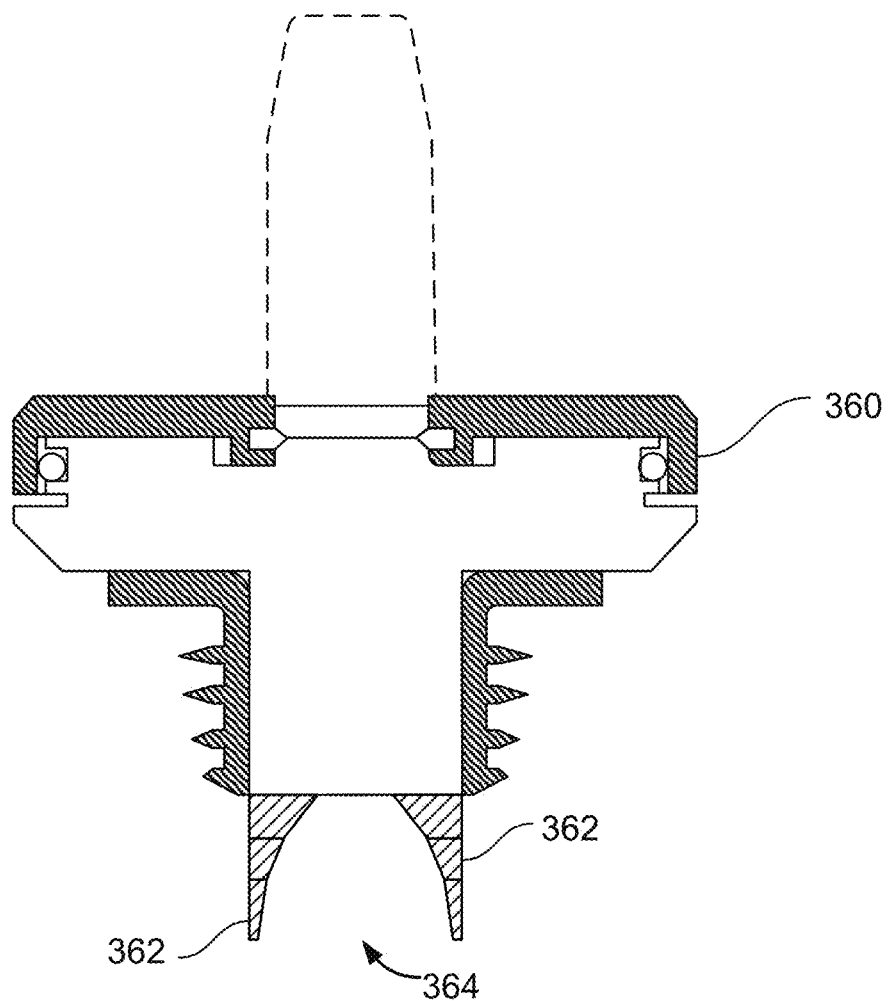
FIGS. 3C and 3D are diagrams showing cut-away profile views of a propagation chamber coupled to a sensor device.
Figure 3D:
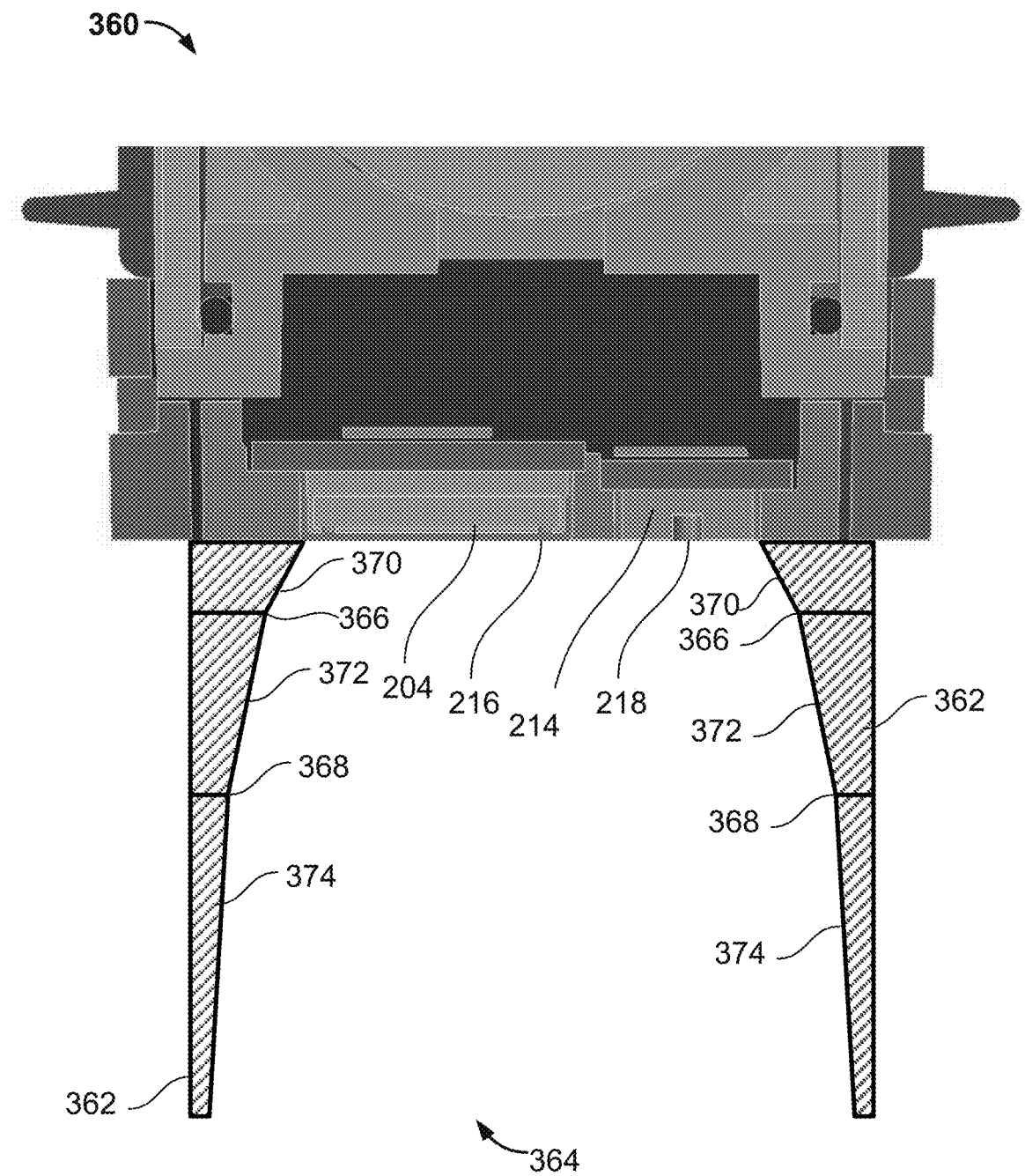
Figure 3E:
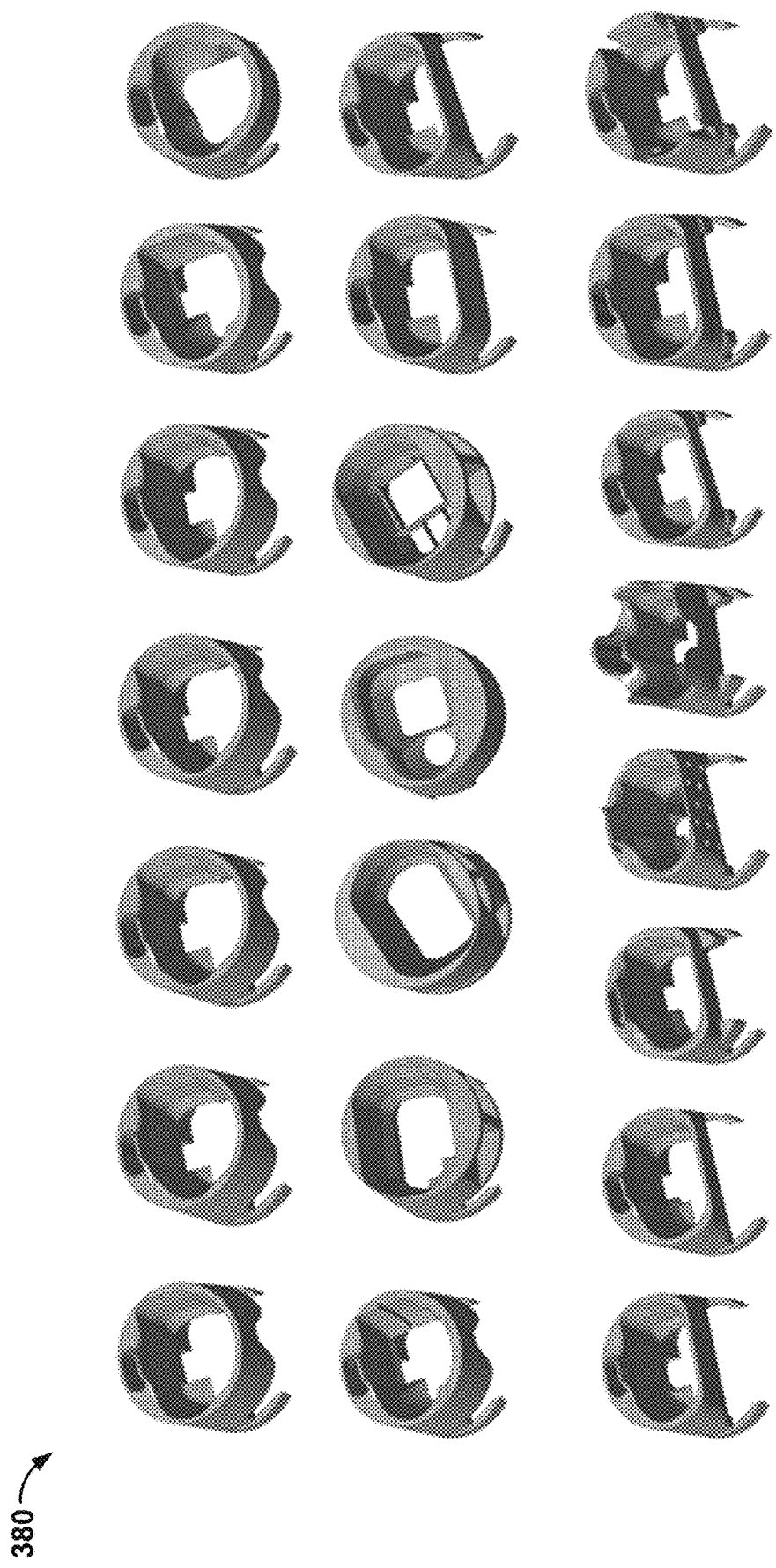
FIG. 3E is a diagram showing various different embodiments of propagation chamber components.

FIGS. 3C and 3D are diagrams showing cut-away profile views of a propagation chamber coupled to a sensor device. Sensor device 360 is a schematic example of fill level sensor device 200 shown in FIGS. 2A-2D with a propagation chamber. In some embodiments, sensor device 360 is an example of sensor device 300 of FIG. 3A with a propagation chamber. In some embodiments, sensor device 360 is an example of sensor device 350 of FIG. 3B with a propagation chamber. Sensor device 360 includes and/or is coupled to propagation chamber component 362. Propagation chamber component 362 forms a surrounding wall of a propagation chamber that extends from an end of sensor device 360 where a signal is to be emitted and/or received. FIG. 3E is a diagram showing various different embodiments of propagation chamber components. In some embodiments, the shown propagation chamber components 380 are examples of propagation chamber components 362 of FIGS. 3C and 3D. The propagation chamber components 380 are shown in FIG. 3E in a view looking up into the propagation chamber from its bottom opening (e.g., where a transmitter transmitted signal exits the propagation chamber and a reflected signal enters the propagation chamber) to the top opening (e.g., where a transmitter transmitted signal enters the propagation chamber and a reflected signal exits the propagation chamber). The various propagation chamber components 380 are various different examples of propagation chamber components that can be coupled to fill level sensor device 200 shown in FIGS. 2A-2D, sensor device 300 of FIG. 3A, and/or sensor device 350 of FIG. 3B to form a sensor with a propagation chamber (e.g., shown in FIGS. 3C and 3D).

Sensor device 360 includes transmitter 204 and receiver 214 that are covered by protective material 216 and protective material 218. In an alternative embodiment, protective material 216 and/or protective material 218 are not utilized. When transmitter 204 transmits an interrogation signal, the signal passes through protective material 216 and into propagation chamber 364. The bounced back interrogation signal is also received by receiver 214 when the signal enters propagation chamber 364 to reach receiver 214 through protective material 218.

Although the embodiment shown in FIG. 3D shows both the transmitter and receiver transmitting/receiving via the same propagation chamber, in other embodiments, the transmitter and receiver may utilize different propagation chambers or either may not utilize a propagation chamber. In an alternative embodiment, rather than utilizing a separate transmitter and a separate receiver, a transceiver that acts as both a receiver and transmitter is utilized. Propagation chamber component 362 coupled to the end of sensor device 360 replaces and functions as a drip collector. For example, drip collectors 234 and 236 shown in other figures are at least in part replaced by propagation chamber component 362 that forms a tube where signal being transmitted/received passed through. The sensor device 360 shown in FIGS. 3C and 3D has been simplified to highlight aspects of the embodiment. Other components not shown in the example may exist. For example, any component of sensor device 200, 300 and/or 350 may be included in sensor device 360.

Propagation chamber component 362 forms the walls of propagation chamber 364 that extends away from transmitter 204 and receiver 214. For example, propagation chamber component 362 forms a hollow chamber (e.g., tube) that guides and propagates an acoustic signal emitted by transmitter 204 from a top end of the propagation chamber to the other bottom end of the propagation chamber. Signal emitted by transmitter 204 enters propagation chamber 364 at the top end of the hollow chamber and exits out its output bottom end of the hollow chamber (e.g., distal end). In some embodiments, propagation chamber component 362 aids in directing an acoustic signal (e.g., ultrasonic signal, acoustic impulse) emitted by transmitter 204 towards the direction of the distance to be measured (e.g., towards bottom of sensor 360 that will be facing contents of a container capped by sensor 360).

In some embodiments, it is desirable to reduce and/or attempt to eliminate any signal reflections within propagation chamber 364 as the signal is guided from one end to the other end of propagation chamber 364. For example, any undesired reflection may mask and hinder detection of the signal reflected by container contents desired to be detected. In some embodiments, the interior wall of the hollow propagation chamber of propagation chamber component 362 is substantially smooth (e.g., to prevent impedance mismatches). In some embodiments, a shape and/or size of a horizontal cross section area of hollow propagation chamber 364 formed by propagation chamber component 362 increases over its vertical distance between the signal input end closest to transmitter 204 to the other signal output end (e.g., distal end). In some embodiments, a shape of the opening of one end of the hollow chamber is different from a shape of the opening of the other end of the hollow chamber. For example, a shape of an opening of the transmitter may be different than a desired shape of the signal output end of propagation chamber component 362 (e.g., desired shape to improve directionality of the signal in the container). In one example, the signal input end of the chamber of propagation chamber component 362 is shaped in a first shape (e.g., elliptical shape) and the output opening end of the other end of the chamber of propagation chamber component 362 is shaped in a second shape (e.g., circular shape). The change in horizontal cross-sectional shape of the hollow signal propagation chamber may at least in part gradually morph from the first shape to the second shape across the vertical length of propagation chamber component 362.

In some embodiments, the horizontal cross-sectional area of the hollow chamber of propagation chamber component 362 varies along it vertical length (e.g., is only greater or equal to a previous horizontal cross-sectional area of the hollow chamber from the input opening to the output opening of propagation chamber component 362). For example, the circular cross-sectional area of the chamber of propagation chamber component 362 never decreases as the acoustic signal outputted by the transmitter is traveling down the chamber of propagation chamber component 362. In some embodiments, the horizontal cross-sectional area of the chamber of propagation chamber component 362 is generally increasing as the signal emitted by transmitter 204 travels down propagation chamber component 362 towards the distal end of propagation chamber component 362.

In some embodiments, the horizontal cross-sectional area of the hollow propagation chamber of propagation chamber component 362 has one or more transitions where a rate of change in the horizontal cross-sectional area of the hollow chamber transitions from one rate to another rate (e.g., transitions where a slope of the interior wall of the hollow propagation chamber changes from one slope to another slope). For example, the horizontal cross-sectional area of the chamber of propagation chamber component 362 increases at a constant first rate along a first portion down the chamber then the horizontal cross-sectional area of the chamber increases a different constant second rate along a second portion down the chamber and then increases a different constant third rate along a third portion down the chamber. This results in the slope of the interior wall of the chamber changing from a first slope to a second slope to a third slope. In the example shown in FIG. 3D, two transitions 366 and 368 are shown where the slopes of interior chamber wall portions 370, 372 and 374 change. The rate of change of the corresponding horizontal cross-sectional area of chamber 364 would also change down the chamber at transitions 366 and 368 (e.g., rate of change in horizontal cross-sectional area becomes smaller to correspond with increase in interior wall slope).

In some embodiments, the slope of the interior walls of chamber 364 of component 362 redirects a signal emitted by transmitter 204 down towards contents of a container to be measured by reflecting the signal towards the desired direction. For example, when the transmitted interrogation signal has a large beamwidth and the sensor device is engaged with a container with a narrow neck and dramatic variations in shape, the reflection coming back from the contents in the container will include other aliases as a result of multiple path reflections and impedance changes. By reducing the effective beamwidth of the signal using chamber 364, undesired signal reflections may be mitigated. In some embodiments, a smallest beam width is highly desirable. For example, in order to measure distances such as 10 cms to 100 cms in air using sound lower frequencies within the range of ultrasonic frequencies may be preferred (e.g., 40 kHz). Small container openings often limit the diameter to be no greater than 30 mm in diameter. Larger surface may be able to generate higher frequencies but they typically don't fit the desired application. For example, a smaller surface is needed to generate higher frequencies (e.g., N=2 fr). The interrogation signal generator voltage is proportional to the frequency. Additionally with the receiver, a smaller surface as compared to a larger one is not as sensitive in detecting reflected signals. Hence these conflicting requirements and possible solutions severely constrain building a sensor or source of signal that can have a narrow beamwidth.

The sloping angles of the interior walls of chamber 364 help focus the signal beam such that energy is collimated to travel in a desired direction down towards contents of the container. In some embodiments, the interior walls of chamber 364 formed by component 362 include internal sidewalls with varying slopes (e.g., flat facets with different slope angles that vary, one or more curved facets with different slope angles, etc.) and when the transmitted signal contacts the internal sidewalls, the signal bounces off at angles that direct the signal toward the desired signal direction. The shown chamber component 362 surrounds a portion of the transmitter (e.g., acting as a waveguide) and forms sloping walls of at least a portion of an open cavity where the ultrasonic signal originates. In some embodiments, an end of the propagation chamber component 362 surrounds at least a transmitting surface interface of an ultrasonic transmitter (e.g., protective material/film in front of the transmitter). The different slopes/facets of the interior walls of chamber 364 allow different signal portions that radiate from the transmitter at different angles to be redirected towards the same desired direction.

In some embodiments, a height of chamber 364 of propagation chamber component 362 (e.g., distance between the input and output openings) is approximately 8 millimeters. In some embodiments, a height of chamber 364 of propagation chamber component 362 (e.g., distance between the input and output openings) is approximately less than or equal to 20 millimeters (e.g., between 10-20 millimeters). In some embodiments, a width of chamber 364 of propagation chamber component 362 is less than an opening size of a container (e.g., less than 30 millimeters). In various embodiments, the shape, length, and width of propagation chamber component 362 and chamber 364 may be any combination of shape, length and width configurations and sizes.

In some embodiments, propagation chamber component 362 functions as a drip collector. Because the bottom of device 360 is exposed to the content of the container when device 360 is engaged with the container, liquid or other content of the container may bead on and attach to device 360 (e.g., when the sensor is tipped over to pour out contents via the spout, due to condensation, or when the contents splash in the container during movement and transport). Beading of contents on device 360 (e.g., on the transmitter, receiver, or protective film over transmitter receiver) may interfere with signal transmission and detection required to detect fill levels of the container. For example, when liquid beads form on protective material 216 and/or protective material 218, it may interfere with signal transmission of transmitter 204 and/or signal receipt of receiver 214. In order to reduce the chances of content remaining on the surfaces of protective material 216 and/or protective material 218, the interior walls of chamber 364 of propagation chamber component 362 have to be shaped to pull away content remaining on protective material 216 and/or protective material 218. For example, when device 360 is placed upright, the slope of the interior side walls of chamber 364 aids the gravitational pull of any beaded content on protective materials of the transmitter/receiver and/or walls of chamber 364 back down into the container. When beaded content on the interior chamber wall is pulled down along the slope of the interior walls of chamber 364 by gravitational forces, beaded content remaining on protective materials 216 and 218 may also be pulled along the slope of the drip collectors back down into the container. In some embodiments, the chamber walls functioning as drip collectors aid in the breaking of the surface tension of content deposited on protective materials 216 and/or 218 by wicking away the content with the aid of the slope of the interior walls of chamber 364 that leverages the gravitational pull down the slope of the drip collectors. In some embodiments, the surfaces of the interior walls of chamber 364 formed by component 362 have been formed and/or coated to be substantially smooth (e.g., to further reduce friction/tension as moisture is wicked away).

Examples of the composition material of propagation chamber component 362 include a food grade polymer, polycarbonate, polyethylene terephthalate (PETE), polytetrafluoroethylene (PTFE), plastic, rubber, stainless steel, and other metals. In some embodiments, the interior hollow chamber of propagation chamber component 362 is coated with a dampening material. For example, an acoustic signal dampening material (e.g., rubber like material) coats plastic walls of the hollow chamber and the coating may assist in reducing the amount of signal that bounces off the walls of the chamber.

Figure 4:
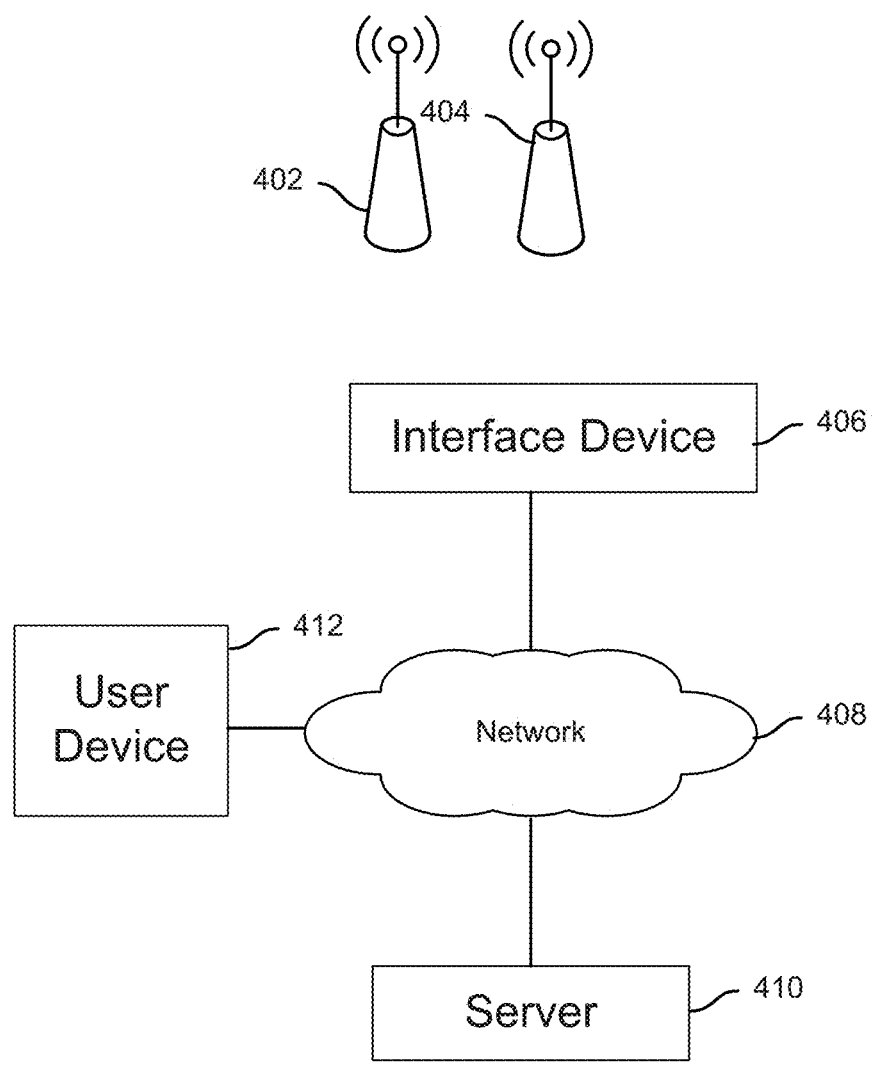
FIG. 4 is a block diagram illustrating an embodiment of a system for an automated container content management environment.

FIG. 4 is a block diagram illustrating an embodiment of a system for an automated container content management environment.

Sensor devices 402 and 404 each include a sensor for automatically determining the amount of content remaining in a container covered by the sensor device. In some embodiments, sensor devices 402 and 404 each include sensor device 100, 200, 300, 350 and/or 360 of FIGS. 1-3D. Although only two sensor devices have been shown in FIG. 4, any number of sensor devices may exist in various embodiments. Examples of sensor devices 402 and 404 include a bottle cap, a bottle cap with a spout, a container lid, and any other container cover configured to cover at least a portion of an opening of a container.

In some embodiments, the sensor devices utilize one or more of the following to detect remaining content amount/level of content in a container and/or a volume of flow outputted from the container: ultrasound, sonar, inductive, capacitive, IR, line, video sensors, etc.

In various embodiments, sensor device 402 and/or sensor device 404 includes one or more of the following features:
- a threading or another portion utilized as an inductive sensor.
- a detection of content expiration by sensing the chemical composition and nutrient value using humidity, barometry, light, pH, and/or odor sensors.
- an input mechanism to receive an identification of a classification of a food type (e.g., tequila, rum, 5% ale, etc.).
- a temperature sensor and notification mechanism to notify a user if the temperature is not optimal.
- a click wheel input mechanism based on mechanical and/or electrical components (e.g., capacitive sensor).
- a display configured to display quantity, expiration date, type of product, nutrient information, temperature, last used information, etc.
- a wireless radio to identify and connect to a wireless network (e.g., Bluetooth, WiFi, etc.).
- an ability to detect motion using an accelerometer to allow automatic power on/off on an as needed basis to optimize power consumption (e.g., an optimal power management algorithm to store, manage, and transmit the information to minimize power usage).
- a touch sensitive screen that provides an interface for placing an order.
- impellers, flow restrictive mechanisms, or any conduit utilized in pouring content out of a container
- a mechanical fixture that allows quantity measurement while enclosed in a casing that insulates and protects the electrical system from all forms of liquids (e.g., hermetically sealed).
- a module that is corrosion resistant and can operate in temperatures from −40 F to 115 F.
- an ability to store and transmit only when the network connectivity is available.
- an ability to associate information with unique bar identity.
- a touch sensitive screen based on but not limited to a resistor or capacitive sensor.
- a mechanism which allows for one touch reordering (e.g., a screen associated with the sensor device or an independent of the sensor device as an independent screen or button).
- a sensor module, pourer, and spout could be combined into a single unit or the pourer and spout could be independent of the sensors and processor module.
- impellers, flow restrictive mechanisms, and any additional conduits that attach to the sensor device can also be attached with a sensor.
- a hollow wedge configured to be resizable to fit a neck size of a container bottle.
- an electronic or physical label to allow differentiation of different sensor devices (e.g., based on the type of beverage, content, brand, etc.).
- a mechanical motor or other mechanism that can be utilized to clean a tip of a spout (e.g., cleaned using suction or air pressure).
- a mechanical or MEMS motor which could be attached to the sensor device so as to create a suctioning of air from within the bottle.
- once air is evacuated from a container, an ability to seal and block oxygen from entering the bottle.
- a replaceable and/or rechargeable battery (e.g., battery may be recharged using inductive charging (e.g., Qi) and/or resonance wireless charging).

Interface device 406 receives data from one or more sensor devices. For example, sensor device 404 broadcasts an identifier of an amount of content remaining in a container covered by sensor device 404 and interface device 406 receives the identifier for storage and processing. In some embodiments, sensor devices 402 and 404 each need to be configured for a specific type of container to allow each sensor device to be able to more accurately measure the amount of content remaining in a container engaged by the sensor device. For example, the waveform of the ultrasonic signal emitted by a sensor of the container cover is to be specifically configured for the shape/size of the container. In some embodiments, interface device 406 pairs with a sensor device (e.g., via a wireless Bluetooth connection) to transmit configuration data specific to the type of container associated with the sensor device. In some embodiments, a user utilizes interface device 406 to specify the type of container to be associated with a specific sensor device. In some embodiments, a user utilizes interface device 406 to view, manage, and/or configure one or more associated sensor devices. For example, a user utilizes an application of interface device 406 to configure sensor devices, view an inventory of remaining content measured by sensor devices, and automate ordering of low inventory content. Examples of interface device 406 include a mobile device, a smartphone, a smart watch, a wearable computer, a laptop computer, a desktop computer, and any other type of computer. In some embodiments, the interface device is also a charging station for one or more sensor devices. In some embodiments, a charging station includes a mechanism to sanitize a sensor device (e.g., via a suction cleaning, heating, blow drying, etc. mechanism).

In some embodiments, interface device 406 (e.g., base station) acts as a central communication hub for all sensor devices of a user within a certain proximity. In some embodiments, interface device 406 is associated with a specific user. Multiple interface devices may be utilized to manage the same set of sensor devices. For example, multiple interface devices may communicate with one another and/or with a backend server to synchronize data. In some embodiments, interface device 406 includes BLUETOOTH, BLUETOOTH Low Energy, and/or wireless (402.x) protocol-based wireless chipsets. In some embodiments, interface device 406 includes a display to display sensor device status, beverage quantity, recipes, order reminders, etc. In some embodiments, interface device 406 communicates with a Point of Sales (POS) system to correlate sales data with measured content utilization/consumption/depletion. In various embodiments, interface device 406 (e.g., base station) includes one or more of the following:

- a display to inform a user about sensor device status, beverage quantity, recipes, reminders, etc.
- a touch sensor or flashing LED-based communicator to pair the sensor devices.
- a data storage to store data from thousands of sensor devices for at least a few days to a month.
- an ability to communicate with a Point of Sales system.
- an ability to communicate with the cap sensor devices to collect the beverage volumes on demand.
- an ability to communicate with the cap sensor devices to re-pair itself to a new container and provide new configuration parameters.
- an ability to communicate with the sensor devices to evacuate oxygen out of the bottles.

Interface device 406 is connected to server 410 (e.g., backend server) by network 408. In some embodiments, server 410 remotely stores and/or processes measurement data received from sensor devices. For example, measurement data periodically broadcasted by sensor devices 402 and 404 is received by interface device 406 and interface device 406 provides the received data to server 410 for storage and/or backend server processing. In some embodiments, interface device 406 and/or server 410 utilizes measurement data of a sensor device to calculate an amount of content remaining in a container engaged by the sensor device. For example, a round trip signal reflection time measured by a sensor device is utilized to calculate a percentage fill amount of content remaining in a container. In some embodiments, server 410 processes current and/or historical content measurements to provide analytics (e.g., consumption patterns, determine inventory, analyze cost of goods sold, identify popularity trends, etc.) and inventory management solutions (e.g., inventory forecasting, inventory planning, automated inventory ordering, etc.). In various embodiments, server 410 provides one or more of the following functionalities:

- a storage of beverage related data that offers a view into beverage consumption patterns by service owners: beverage name, types of liquid, brand, UPC or a bar code, quantity, price, distributor, date and time of purchase, servings per use, time of servings consumed, location, expiration, chemical composition, odor, color, temperature, humidity, ingredients used, and various nutrient amounts (e.g., Sulfites, ethyl, carbohydrates, proteins, fats, sugars, etc.).
- a mechanism to uniquely associate various devices that help collect beverage data with each user and their inventory.
- an ability to listen, collect, and store millions of devices at any given point in time.
- an ability to notify the user to reorder the necessary beverages or automatically reorder and replenish from distributors.
- an algorithm that analyzes, learns, and predicts amount of beverage/food needed by a user and consumable state of the item (e.g., expiration dates).
- an ability to set beverage threshold levels that trigger a notification to reorder.
- an ability to provide a notification when the beverage temperature is not ideal and the beverage needs more appropriate storage.
- an ability to provide a notification when the oxygen level in the bottles is beyond a threshold of permitted aeration levels.
- an ability to set thresholds for inventory based on category, brands, type of beverage, and recipes.
- an ability to provide real time notifications when the inventory levels fall below threshold levels.

User device 412 is utilized by a user to setup, configure, view and/or otherwise interact with one or more of the components shown in FIG. 4. For example, a user utilizes user device 412 to setup and/or configure one or more of sensor devices 402. In another example, a user utilizes user device 412 to configure, view and/or interact with data and configuration managed, tracked and/or analyzed by server 410. Examples of interface device 406 include a mobile device, a smartphone, a smart watch, a wearable computer, a laptop computer, a desktop computer, and any other type of computer. User device 412 is optional. For example, interface device 406 may include a touchscreen that can be used to perform one or more functions of user device 412. User device 412 is connected network 408 and may communicate with any of the other components shown in FIG. 4 via network 408. User device 412 may also directly communicate directly with one or more of the other components shown in FIG. 4. For example, user device 412 may communicate directly with interface device 406 and/or one or more of sensor devices 402 via a BLUETOOTH connection.

In some embodiments, the system shown in FIG. 4 is utilized in a bar/restaurant environment to automatically track and manage inventory of liquor remaining in liquor bottles. Each liquor bottle is capped using a sensor device that is configured to be a cap for the liquor bottle. In some embodiments, the sensor devices detect the quantity of liquid/beverage remaining in each bottle and broadcast the detected quantity to interface device 406. The interface device reports the received quantity information to server 410. In some embodiments, server 410 provides an online interface to manage container content (e.g., beverage) inventory. For example, a bar/restaurant user entity may access server 410 via an application of interface device 406, user device 412, and/or a webpage interface provided by server 410 to view and manage inventory of one or more tracked beverage products. Inventory information (e.g., including inventory remaining in open containers measured by sensor devices and full bottle inventory on hand in storage) may be updated automatically and viewed and exported in real time. The inventory of products may be classified by brands, drink type (tequila, whiskey, etc.), recipe (e.g., amount of each mixed drink able to be made using remaining inventory), and/or popularity. In various embodiments, the system provides one or more following functions:

- a mechanism to export or import the entire inventory of beverages classified by brands, drink type (e.g., tequila, whiskey etc.), recipe, and popularity.
- a manual or automated process/technique of marking sensor devices (physically or through software identifiers) for tracking which sensor device corresponds to each of the beverages listed in the tracked inventory.
- an ability to register and identify the base station for a particular user account.

In some embodiments, for a specific user account associated with one or more sensor devices, server 410 learns the consumption pattern, nutrients, and preferences in various types of beverages, flavors, taste, and brands. In some embodiments, using interface device 406 and/or user device 412, a user is able to access information about consumption quantity, humidity, oxygen content, inventory, drink recipes, and seasonal recommendations associated with current inventory detected using one or more sensor devices. In some embodiments, using interface device 406 and/or user device 412, a user may access a marketplace to order beverages from various distributors and delivery services. In some embodiments, a user is notified via interface device 406 and/or user device 412 of a need to replenish an inventory of beverages and may also directly notify one or more distributors to place one or more appropriate orders. In some embodiments, interface device 406 and/or user device 412 provides recommendations for various drink recipes based on existing inventory detected using one or more sensor devices. In some embodiments, consumption data obtained across a plurality of different user entities may allow trend analysis and manufacturing forecasting across user entities.

In some embodiments, the sensor device includes a mechanism to control and limit an amount of beverage poured via a spout of the sensor device. In some embodiments, the sensor device includes a mechanism to evacuate oxygen out of a container and reseal the container. For example, in order to preserve the freshness of wine, the sensor includes an electronic air pump that pumps air out of a container. In some embodiments, the sensor device includes or has more sensors to detect temperature, humidity, acidity and/or nutrient value of content included in a container. The detected sensor information may be transmitted to an interface device and/or a server (e.g., interface device 406 and/or server 410). In some embodiments, a user is provided a notification when a detected content temperature and/or oxygen level is outside a recommended range.

One or more of the following may be included in network 408: a direct or indirect physical communication connection, mobile communication network, Internet, intranet, Local Area Network, Wide Area Network, Storage Area Network, a wireless network, a cellular network, and any other form of connecting two or more systems, components, or storage devices together. Additional instances of any of the components shown in FIG. 4 may exist. For example, server 410 may be a distributed server and/or may be connected to a plurality of interface devices. In another example, a plurality of interface devices may be utilized to manage and/or utilize the same or different container covers. In some embodiments, components not shown in FIG. 4 may also exist.

Figure 5:
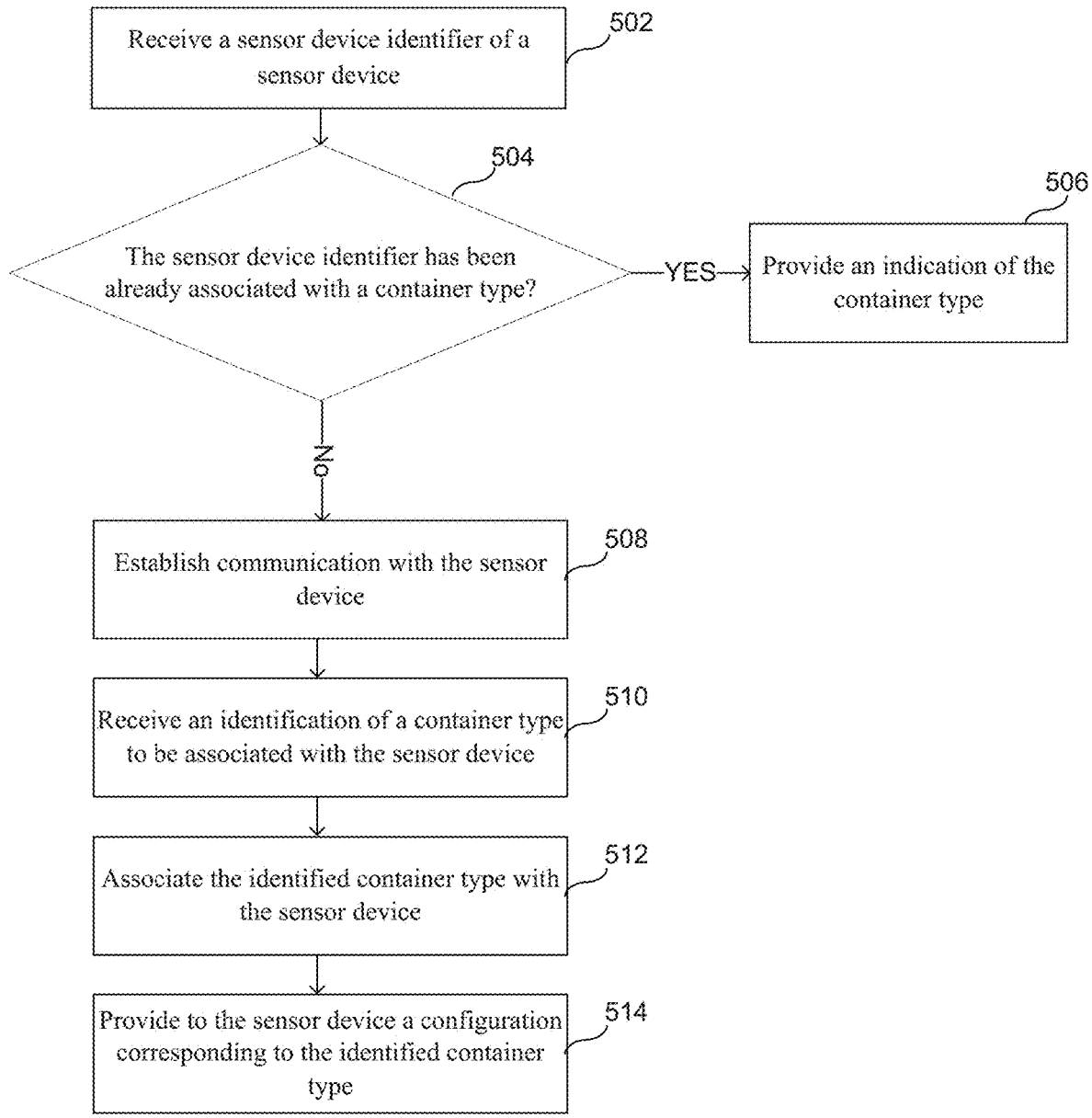
FIG. 5 is a flowchart illustrating an embodiment of a process for providing a configuration for a sensor device.

FIG. 5 is a flowchart illustrating an embodiment of a process for providing a configuration for a sensor device. The process of FIG. 5 may be at least in part implemented on interface device 406 and/or user device 412 of FIG. 4. In some embodiments, the sensor device measures an amount of content included in a container (e.g., sensor device is a bottle cap that measures amount of liquid remaining in a bottle capped by the sensor device) and the sensor device must be configured for a specific container type of the container for the sensor device to be able to more accurately measure the amount of content in the container. For example, various types of containers are shaped differently and the best waveform of the signal utilized to measure the amount of content included in a container may depend on the shape of the container. In some embodiments, in order to achieve consistent and accurate measurements, gain at various depths is varied to help increase the received signal strength. Gain can be varied by changing the frequency and the number of pulses. For example, higher frequency and lower number of pulses may lead to better resolution at the top of the bottle/container while lower frequency and higher number of pulses may lead to better resolution towards the bottom of the bottle/container (e.g., the act of changing the pulses and frequency is akin to organ pipe tuning). Bottles and containers may have dead zones where no measurements can be obtained due to standing waves. By continuing to pulse or use large number of pulses at the same frequency, the dead zones may be overcome. In some embodiments, a depth measurement provided by the sensor device is translated to a volume and/or percentage measurement value using a shape/volume profile of the container type associated with the sensor device. In some embodiments, the process of FIG. 5 is initiated when a user initiates a sensor device configuration process using an interface device.

At 502, a sensor device identifier of a sensor device is received. In some embodiments, the sensor device is sensor device 100, 200, 300, 350 and/or 360 of FIGS. 1-3D. In some embodiments, the sensor device is sensor device 402 or 404 of FIG. 4. In some embodiments, the sensor device identifier has been wirelessly transmitted by the sensor device. For example, the sensor device broadcasts a unique identifier of the sensor device using a BLUETOOTH (e.g., BLUETOOTH low energy), WiFi, and/or other local or short range wireless communication protocol/signal. In some embodiments, receiving the sensor device identifier includes listening for a signal from a desired type of device (e.g., listen for a signal that is identified as sent by a sensor device). In some embodiments, the sensor device identifier is received via a wired connection. In some embodiments, the sensor device identifier has been transmitted by the sensor device in response to a user indication to the sensor device. For example, when a button on the sensor device is pressed for at least a threshold period of time, the sensor device transmits the sensor device identifier.

At 504, it is determined whether the sensor device identifier has been already associated with a container type. For example, the sensor device has been previously configured for a specific container type at 514 of FIG. 5. In some embodiments, a user desires to know which container type has been already associated with the sensor device. For example, a user may have a plurality of sensor devices that have been each already configured for and capped on a specific type of container. The user may need to remove all of the sensor devices from their associated containers to wash the sensor devices. For example, certain food service health codes may require restaurants/bars to periodically wash bottle cap spouts and sensor devices are configured as bottle cap spouts. However, because each sensor device has been configured for a specific container, once the sensor devices have been washed, the sensor devices may need to be returned back to the correct specific type of container associated with each sensor device. Although one alternative is reconfiguring each sensor device after being washed, the process of reconfiguring each sensor device may be inefficient and cumbersome to perform after each wash as compared to simply returning each sensor device back to the correct specific type of container.

In some embodiments, determining whether the sensor device identifier has been already associated with a container type includes determining whether a storage structure (e.g., table, database, list, etc. stored locally at an interface device and/or remotely at a backend server) includes an entry associating the sensor device identifier with the container type. In some embodiments, determining whether the sensor device identifier has been already associated with a container type includes analyzing information received from the sensor device. For example, the sensor device provides data indicating that the sensor device has been already associated with a container type and configured for the container type.

If at 504 it is determined that the sensor device identifier has been already associated with a container type, at 506, an indication of the container type is provided. For example, an identifier of the container type is displayed on a screen of an interface device to allow a user to return the sensor device back to a container that is of the displayed type. In some embodiments, an indication of the last determined remaining content amount/level determined using the sensor device is provided. For example, there may exist a plurality of containers of the same type and using the content amount/level information, the user is able to return the sensor device back to the identified container type with the identified content level. In some embodiments, an indication is received from a user to reconfigure the sensor device and the process proceeds to 508 (not shown). For example, although the sensor device has been already associated with a container type, a user desires to associate the sensor device with a different container type and the user presses a button on the sensor device to reconfigure the sensor device.

If at 504 it is determined that the identifier has not been already associated with a container type, at 508, communication is established with the sensor device. For example, a wireless communication channel is established. In some embodiments, a BLUETOOTH connection is established. For example, the sensor device is paired with an interface device and the sensor device enters into a paired communication mode.

At 510, an identification of a container type to be associated with the sensor device is received. In some embodiments, the container type identifies a type of container to be covered/capped/engaged by the sensor device. For example, an identification of the specific beverage bottle type to be capped by the sensor device is received.

In some embodiments, the container type identification is received via a user indication. For example, a user selects the container type from a list of container types. In some embodiments, receiving the container type includes receiving an identification of a product and/or packaging to be engaged with the sensor device. For example, a user indicates a product (e.g., liquor product in a specified packaging) to be engaged with the sensor device. In some embodiments, there exists a database of container types for various types of commercially sold beverage packages and the database is utilized to determine a corresponding container type to a user identification of a product.

In some embodiments, receiving the identification of the container type includes receiving a camera image. For example, using a camera of an interface device, a user captures an image of at least a portion of the container to be associated with the sensor device and the image (e.g., an image of a label on a product packaging) is analyzed to automatically determine the container type of the container.

In some embodiments, receiving the identification of the container type includes receiving a barcode/product identifier associated with the container type. For example, using an interface device, a user captures an image of a barcode (e.g., UPC barcode) on the product container to be associated with the sensor device and the image is analyzed to read the barcode identifier of the container. In some embodiments, a container type corresponding to the barcode identifier is identified. For example, the barcode identifier is utilized to search a database that includes entries that associate barcode identifiers with corresponding container types. In some embodiments, the barcode identifier is provided to a server and the server provides a corresponding container type identifier. In some embodiments, there exists a plurality of containers types associated with a barcode/product identifier and a user provides an indication to indicate the specific container type among the plurality of container types associated with the sensor device.

In some embodiments, the sensor device measures a distance between the sensor device and a level of liquid remaining in a container to determine the liquid fill level. For example, a transmitter of the sensor device sends out a signal (e.g., ultrasonic signal) that gets reflected by the surface of the liquid in the container. The reflected signal is detected by a receiver of the sensor device. By measuring the amount of time it took to receive the reflected signal, the distance traveled by the signal before being reflected (e.g., distance between sensor device and liquid surface is half of the total distance traveled by the signal) may be determined by multiplying the amount of time by the speed of the signal (e.g., speed of sound).

In order to correctly determine the amount of content included in the container from the distance information, various parameters of the container must be known. For example, the height of the interior of the container and variations of the cross sectional volume/area of the container across the various depths of the container are needed to calculate the amount/percent of content left in the container. In one example, if the total distance between the bottom of the container and the sensor device is known, the fill height of the container can be determined (e.g., total distance between the bottom and the sensor device minus distance between the sensor device and liquid surface). If the shape and volume of the container are known, the volume of liquid contained in container 102 may be determined. In some embodiments, the container type identification is utilized to obtain a formula/table/database/data structure that maps a measured distance (e.g., fill height, height between liquid surface and sensor device, etc.) to a corresponding remaining content volume/percentage for the specific container type.

At 512, the identified container type is associated with the sensor device. In some embodiments, associating the container type with the sensor device includes storing a data entry (e.g., in a database) that associates the container type with the sensor device identifier. For example, a database of associations between various sensor device identifiers and corresponding associated container types is maintained at an interface device (e.g., device 406 of FIG. 4) and/or a backend server (e.g., server 410 of FIG. 4). This database may also be utilized to store determined content volume/level of containers being tracked by the various sensor devices.

At 514, a configuration corresponding to the identified container type is provided to the sensor device. In some embodiments, a sensor device configuration specific to the identified container type is obtained and provided to the sensor device for configuration. For example, the sensor device needs to be configured for a specific type of container type to enable the sensor device to more accurately measure the amount/level of content remaining in a container. In some embodiments, the configuration corresponding to the identified container type is provided via a communication established with the sensor device in 508.

In some embodiments, the sensor device includes a transmitter for transmitting a signal and a receiver for receiving the signal that has been reflected. The parameters of the signal being transmitted may need to be configured specifically for the container that holds the content to be measured. For example, in order to reduce undesired reflections within the container, the transmitted signal is generated based on the parameters specifically configured for the specific container type. In some embodiments, the configuration specifies a waveform/shape of a signal, a length/width of a signal component (e.g., pulse width), a profile of a signal component, a content of a signal component, a number of pulses in the signal component, a frequency of the signal component, an amplitude/intensity of the signal component, a modulation of the signal component (e.g., pulse-width modulation to be utilized), a duty cycle of the signal component, etc. For example, the signal includes one or more component signal pulses and the configuration specifies the shape/waveform of each signal pulse. In some embodiments, the configuration specifies a number of signal pulses to be transmitted sequentially to measure a content amount/level of a container. In some embodiments, varying the frequency and number of waves helps create a resonance with the microphone under various heights in different bottles. In some embodiments, the configuration specifies a configuration of a receiver of the sensor component. For example, a type and/or a parameter of one or more signal filters to be utilized to filter a received reflected signal is specified by the configuration. In another example, automatic gain controller settings/parameters are specified by the configuration.

In some embodiments, the configuration specifies one or more configurable threshold settings to be utilized to detect when a reflect signal has been received by a receiver. For example, a signal transmitted by the transmitter is reflected within a container and the receiver is listening for the reflected signal. However, noise and other factors may cause undesirable signals to be received by the receiver. In order to detect the desired reflected signal that is stronger than the noise, a detection threshold can be adjusted such that a received signal with an amplitude/energy over the threshold is detected as a reflection of the sent signal while a signal with an amplitude/energy below the threshold is ignored as noise. However, given the variance in bottle shape and the transmitted signal, the ideal threshold varies. These variances in the configurable threshold settings may be specified by the provided configuration such that the fill level sensor is able to dynamically adjust the threshold as specified based on the environment of the fill level detection.

In some embodiments, the provided configuration specifies a plurality of different sets of configuration parameters for different fill levels of the container. In some embodiments, one or more sets of configuration parameters are indexed according to a corresponding content level. For example, each set of configuration parameters corresponds to a different range of fill levels of the container. In some embodiments, using a default set of configuration parameters, an initial approximate fill level is determined, and based on the initially determined approximate fill level, a more specific set of configuration parameters corresponding to the initial approximate fill level is utilized to determine a more specific fill level. The default set of configuration parameters may be specific to the specific detected container (e.g., default set of configurations is provided to the sensor device based on the container type) or same across a plurality of different types of containers (e.g., default set is preconfigured into sensor device). In some embodiments, each set of configuration parameters may specify one or more parameters for a signal to be transmitted (e.g., interrogation signal) for reflection off content of the container and/or one or more parameters for receiving and processing the reflected transmitted signal.

In some embodiments, each set of configuration parameters is associated and indexed with a specific range of content fill levels corresponding to when the particular set of configuration parameters is to be utilized. For example, a first set of configuration parameters is to be utilized when a detected fill level is between 0-100 mm (e.g., for a bottom region of the container), a second set of configuration parameters is to be utilized when a detected fill level is between 101-200 mm (e.g., for a middle region of the container), and a third set of configuration parameters is to be utilized when a detected fill level is above 200 mm (e.g., for a top region of the container).

Figure 6:
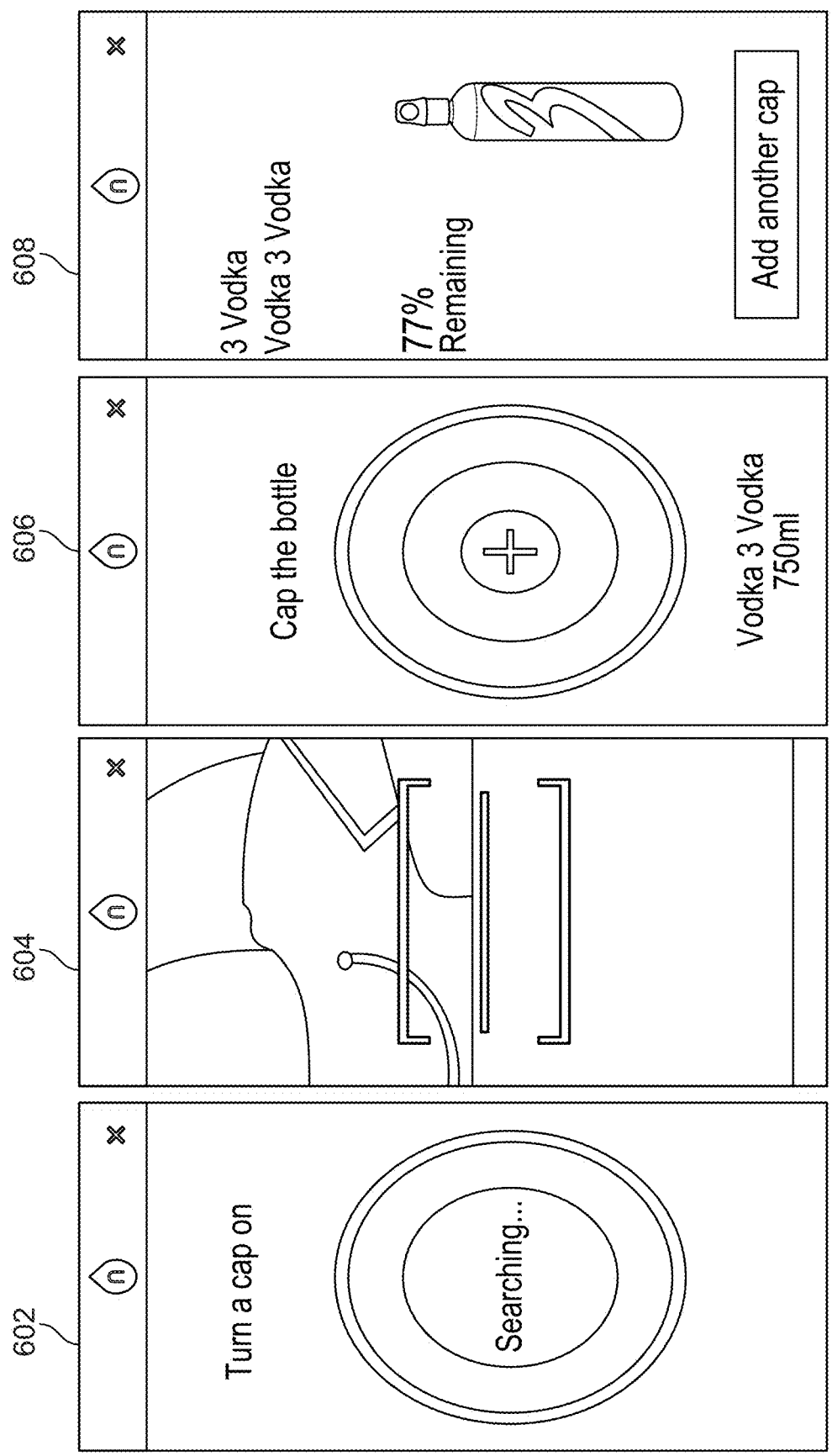
FIG. 6 is a diagram illustrating an embodiment of a user interface for specifying a container type to be associated with a sensor device.

FIG. 6 is a diagram illustrating an embodiment of a user interface for specifying a container type to be associated with a sensor device. In some embodiments, the interface of FIG. 6 is provided on user device 412 and/or interface device 406 of FIG. 4. In some embodiments, the interface of FIG. 6 is utilized to provide the container type received in 510 of FIG. 5.

Interface screen 602 instructs a user to turn on the sensor device (e.g., by pressing a button on the sensor device for at least a specified period of time, the sensor device turns on and broadcasts its identifier) and the interface device attempts to detect the sensor device (e.g., listens for a new BLUETOOTH LE signal from a sensor device). When the sensor device has been detected, a connection is established with the sensor device (e.g., communication established at 508 and configuration provided in 514 of FIG. 5). Interface screen 604 shows a viewfinder display of a live camera image. Using the displayed viewfinder, a user is to capture an image of a barcode printed on a product container. For example, when a barcode is captured within the shown bracket guidelines, the barcode is read and analyzed to determine whether it is a known barcode that corresponds to a particular container type. Once a valid barcode has been detected, the interface progresses to interface screen 606. In the example shown, interface screen 606 confirms that the barcode has been detected to correspond to container type "3 Vodka 750 ml" that holds vodka contents. A user is instructed to place a sensor device on the container holding the contents to be measured. Once the sensor device has been engaged with the container, a user is to select the "+" icon and the content amount/level of the container is detected. The interface progresses to interface screen 608 where the container type, a representative image of the product, and the latest detected remaining content amount/level (e.g., percentage remaining) are displayed.

Figure 7:
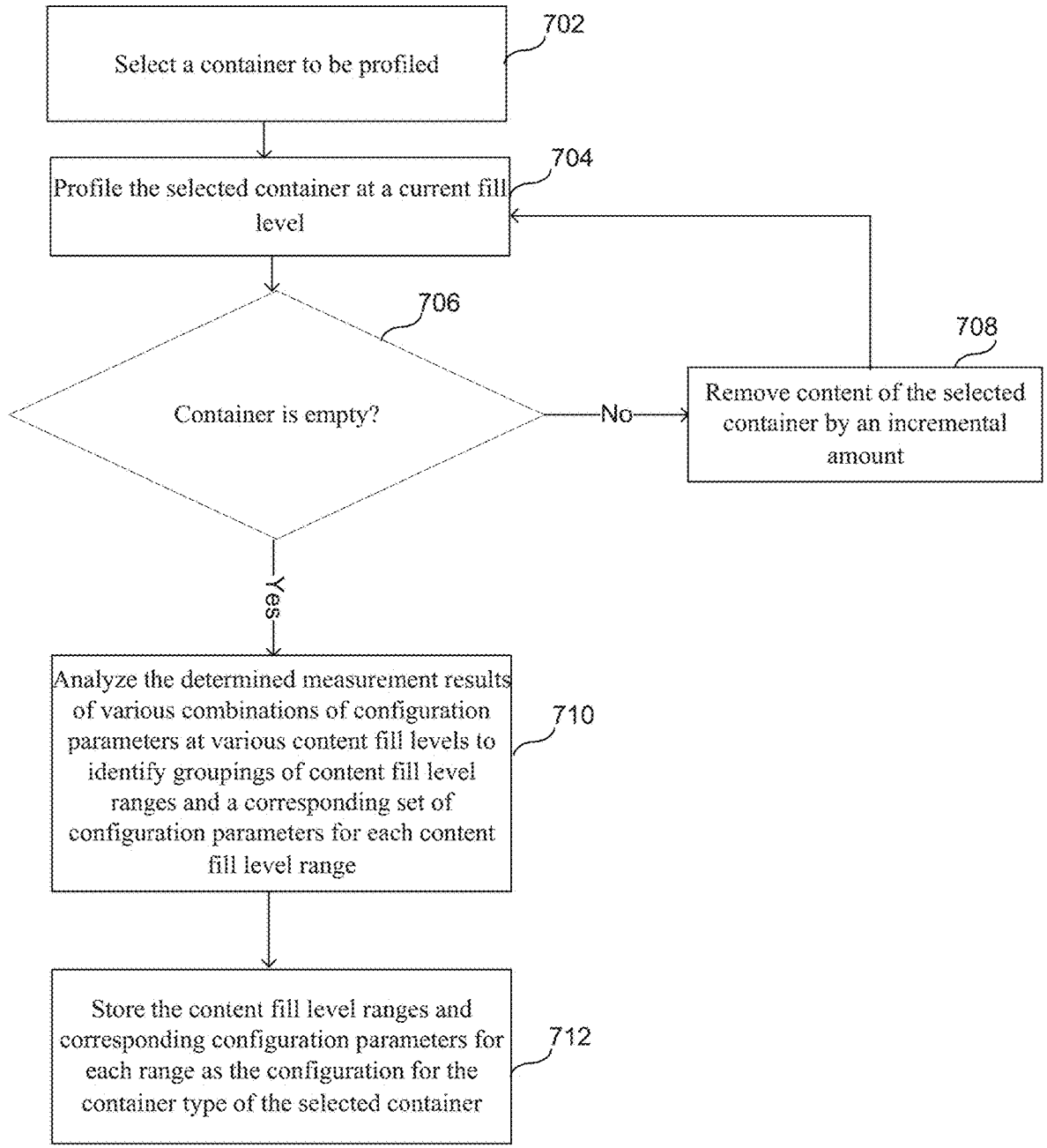
FIG. 7 is a flowchart illustrating an embodiment of a process for determining one or more sets of configuration parameters of a container.
Figure 8:
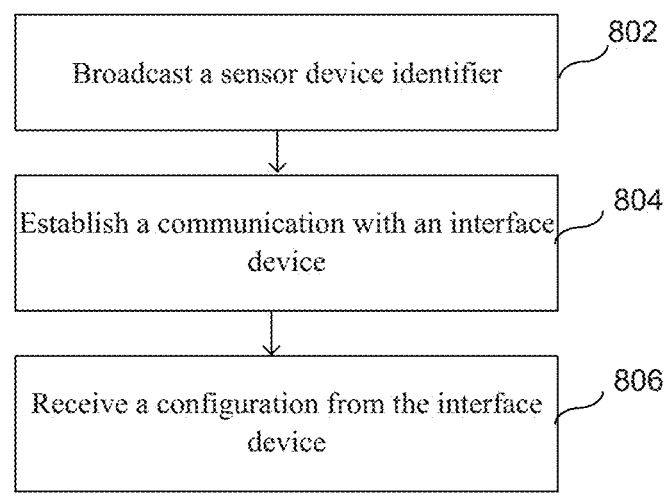
FIG. 8 is a flowchart illustrating an embodiment of a process for configuring a sensor device.

FIG. 7 is a flowchart illustrating an embodiment of a process for determining one or more sets of configuration parameters of a container. For example, the configuration provided in 514 of FIG. 5 and/or received in 806 of FIG. 8 is determined at least in part using the process of FIG. 7. The process of FIG. 7 may be repeated for each different type of container.

At 702, a container to be profiled is selected. For example, a bottle to be profiled to determine its configuration parameters is selected. Selecting the container may include scanning a barcode of the container, capturing a label of the container, selecting/providing an identifier of the container, etc.

At 704, the selected container at a current fill level is profiled. In some cases, the container is initially full and the full container is profiled. In some embodiments, profiling the container includes determining an expected current fill level of the container. For example, an authoritative measuring device is utilized to determine the expected fill level. The authoritative measuring device may be a special measuring device that provides a highly accurate measurement of a depth of the fill level of the container. In some embodiments, the expected current fill level is determined using image processing. For example, an image of the container is captured and the expected fill level of the container is determined by processing the captured image to identify the depth of the fill level captured in the image. In some embodiments, the expected current fill level is determined using a weight scale. For example, a weight of an empty container is known and/or measured and a weight of the current fill level filled container is measured. Based on the difference between these weights and the density of the contents and/or known shape profile of the container, the expected fill level is determined. Once the expected fill level is determined, a configuration of a sensor device (e.g., device 200) that will yield the closest fill level measurement to the expected fill level may be identified by iterating through various combinations of configuration parameters.

In some embodiments, a sensor device (e.g., device 200) is placed (e.g., capped) on the container and the sensor device is configured to iterate through various configuration parameters. For example, measurements are performed using various combinations of interrogation signal parameters and receiver parameters and corresponding measurement results (e.g., identified fill/distance values) of the various combinations are stored. The combinations of various configuration parameters that are varied may include various parameters for one or more of the following of an interrogation signal: a waveform/shape of a signal, a length/width of a signal component (e.g., pulse width), a profile of a signal component, a content of a signal component, a number of pulses in a signal component, a frequency of a signal component, an amplitude/intensity of a signal component, a modulation of a signal component (e.g., pulse-width modulation to be utilized), a duty cycle of a signal component, etc. The combinations of various configuration parameters that are varied may include various parameters for one or more of the following for a signal receiver: an automatic gain control, a variable gain amplifier, a detection threshold, etc. For example, for a given interrogation signal with the same energy, a content reflected signal will be higher in energy (e.g., requiring a higher detection threshold) for a greater fill level as compared to a lower fill level (e.g., requiring a lower detection threshold since a reflected interrogation signal had to travel a greater distance and experienced greater attenuation).

At 706 it is determined whether the container is empty. For example, it is determined whether the container is empty based on the weight of the container.

If at 706 it is determined that the container is not empty, at 708, content of the selected container is removed by an incremental amount. For example, a controlled amount of content is emptied from the container for a next profiling of the container at the new fill level. In some embodiments, the amount of content removed from the container is a preconfigured amount based on a volume, weight, and/or content height. For example, content is removed from the container such that the height of the content within the container drops by 1 mm. In some embodiments, the incremental amount of content is removed automatically. For example, a spout and a valve/pump has been added to the container (e.g., container has been drilled near the bottom of the container and a spout/valve/pump has been added) and the valve and/or pump is automatically controlled to empty a predetermined amount of content. Once the incremental amount of content has been emptied, the process returns to 704 where the new fill level of the container is profiled.

If at 706 it is determined that the container is empty, at 710, the determined measurement results of various combinations of configuration parameters at various content fill levels are analyzed to identify groupings of content fill level ranges and a corresponding set of configuration parameters for each content fill level range. For example, for each profiled content fill level, the various fill level measurement results of the various configuration parameter combinations are sorted and ranked based on closeness to the expected fill level. Then a set of configuration parameters that will result in fill level measurements that are within an acceptable tolerance for a greatest continuous range of fill levels is identified. Then for remaining fill level ranges, a next set of configuration parameters that will result in fill level measurements that are within the accepted tolerance for a greatest continuous range of remaining fill levels is identified. This process of identifying a next set of configuration parameters is repeated until all fill levels have been covered by fill level corresponding configuration parameter sets.

At 712, the content fill level ranges and corresponding configuration parameters for each range are stored as the configuration for the container type of the selected container. For example, at least a portion of the stored configuration is provided in 514 of FIG. 5 and/or received in 806 of FIG. 8 as the configuration for a particular type of container.

FIG. 8 is a flowchart illustrating an embodiment of a process for configuring a sensor device. The process of FIG. 8 may be implemented on sensor device 100, 200, 300, 350 and/or 360 of FIGS. 1-3D.

At 802, a sensor device identifier is broadcasted. In some embodiments, the sensor device identification is the identification received at 502 of FIG. 5. In some embodiments, the sensor device identifier is transmitted in response to entering a pairing mode of the sensor device. For example, the sensor device enters a BLUETOOTH pairing mode to advertise availability of the sensor device for paring. In some embodiments, the sensor device identifier is broadcasted in BLUETOOTH advertising/beacon mode. In some embodiments, a sensor device is first operated in paired mode (e.g., Generic Attribute Profile (GATT) client/server) then switched to advertising/beacon mode. In some embodiments, the sensor device identifier is broadcasted in response to an engagement of a button of the sensor device. For example, when a user presses a button on the sensor device for at least a threshold amount of time, the sensor device enters into a mode that broadcasts the sensor device identification.

At 804, a communication with an interface device is established. In some embodiments, establishing the communication includes establishing the communication established in 508 of FIG. 5. In some embodiments, a BLUETOOTH connection is established. For example, the sensor device is paired with an interface device and the sensor enters into a paired bidirectional communication mode.

At 806, a configuration is received from the interface device. In some embodiments, the received configuration is the configuration provided in 514 of FIG. 5. In some embodiments, the received configuration specifies one or more parameters of an interrogation signal that is to be reflected off contents within a container to measure an amount and/or fill level of content included in the container. In some embodiments, the configuration specifies one or more parameters of a receiver of the received reflected interrogation signal. In some embodiments, the configuration specifies one or more reflection detection thresholds.

In some embodiments, the configuration specifies one or more parameters of a filter to apply to the received reflected interrogation signal. In some embodiments, the configuration specifies one or more parameters of an automatic gain controller of the receiver. In some embodiments, the configuration includes an identifier of a profile that has been already stored in a data storage of a sensor device.

In some embodiments, the received configuration specifies a plurality of different sets of configuration parameters. For example, each set corresponds to a different fill level of the container (e.g., each set indexed to a range of fill levels). In some embodiments, using a default set of configuration parameters (e.g., default set of configuration parameters is included in the received configuration), an initial estimated fill level is determined and based on the initial estimate of the fill level, a more specific set of configuration parameters included in the received configuration is identified to be utilized to determine a more accurate fill level.

In some embodiments, each set of configuration parameters identified by the received configuration specifies one or more signal parameters to generate a distinct interrogation signal corresponding to the set. For example, each set of configuration parameters specifies one or more of the following parameters of a signal to be transmitted: a waveform/shape of a signal, a length/width of a signal component (e.g., pulse width), a profile of a signal component, a content of a signal component, a number of pulses in a signal component, a frequency of the signal component (e.g., changing a frequency of an input signal to a speaker changes a spectrum of frequencies outputted by the speaker), an amplitude/intensity/energy of a signal component, a modulation of a signal component (e.g., pulse-width modulation to be utilized), a duty cycle of a signal component, etc. In some embodiments, each set of configuration parameters is identified/indexed for use for a specified range of container fill levels. For example, because the shape of the empty portion of the container (e.g., contributing to different reflection patterns) and a distance an interrogation signal must travel may vary with the fill level of the container, a different interrogation signal, detection threshold and/or receiver setting is to be utilized for various different fill levels and the signal parameters of these different interrogation signals are specified as different sets of configuration parameters. In some embodiments, the same interrogation signal may be utilized for a particular container regardless of fill level.

In some embodiments, the interrogation signal is shaped to produce an interrogation signal that will result in a received signal with signal properties for more accurate and consistent threshold detection to detect reflections of the interrogation signal. In some embodiments, the interrogation signal is shaped to produce an interrogation signal that will result in a received signal with a narrow peak for more accurate and consistent peak detection of a received reflected signal. When multiple pulses are included in the interrogation signal, a received signal is a convolution of the received signal components of the pulses. This resulting signal may be shaped by varying the number, amplitude, width, etc. of the pulses to produce a narrow peak (e.g., correlation peak for detecting time/length interrogation signal travels to determine fill level). For example, pulse-width modulation to be performed is specified by a received set of configuration parameters.

In some embodiments, although a manufacturer/vendor specification of a speaker to be utilized to transmit an interrogation signal specifies a minimum energy of an input signal to the speaker, a configuration parameter specifies a signal energy that is lower than the specified rated energy of the speaker manufacturer/vendor. For example, although a manufacturer specifies that 6 volts is the rated voltage that should be provided to a speaker, a voltage between 2-2.8 volts is specified by a configuration parameter to be provided to the speaker. In another example, a voltage as low as 1 volt is supplied to the speaker.

In some embodiments, the received configuration specifies configuration parameters of a signal receiver. For example, parameters of an automatic gain control, a variable gain amplifier, a detection threshold, etc. are specified in the received configuration for receiving and processing a reflected interrogation signal. In some embodiments, the received configuration specifies a plurality of different sets of receiver configuration parameters. For example, each set of receiver configuration parameters corresponds to a different current fill level (e.g., range) of the container (e.g., different receiver configuration parameters corresponding to different sets of interrogation signal configuration parameters of the various different fill level ranges).

Figure 9:
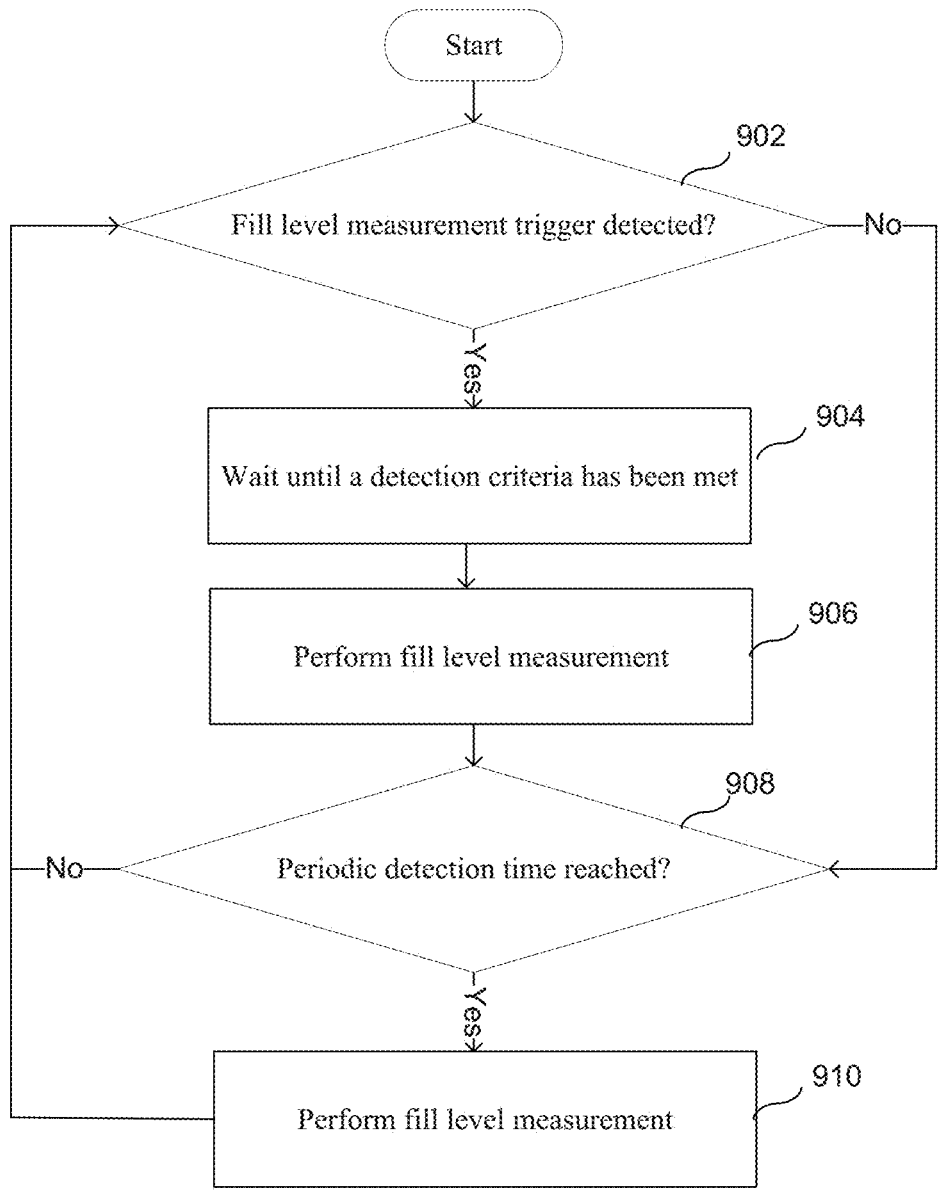
FIG. 9 is a flowchart illustrating an embodiment of a process for detecting a fill level of a container using a fill level sensor.

FIG. 9 is a flowchart illustrating an embodiment of a process for detecting a fill level of a container using a fill level sensor. The process of FIG. 9 may be implemented on sensor device 100, 200, 300, 350 and/or 360 of FIGS. 1-3D. At least a portion of the process of FIG. 9 may be continually performed to detect an updated fill level of a container.

At 902, it is determined whether a fill level measurement trigger is detected. For example, an accelerometer, a motion detector, a tilt/orientation sensor, or another detector/sensor included in a fill level sensor device that detects movement and/or an orientation of the fill level sensor device detects a triggering condition to start fill level measurement. In some embodiments, data provided by an accelerometer, a motion detector, and/or a tilt/orientation sensor is received and analyzed to detect whether a detected movement meets a specified threshold to trigger a fill level measurement. For example, it is determined whether a magnitude of a detected movement is for at least a threshold amount of distance, acceleration, force, time, and/or angle. In the example of a fill level sensor device that includes an integrated pourer spout, a fill level measurement trigger is detected when the fill level sensor is tilted beyond a threshold angle (e.g., corresponding to tipping of a bottle to pour contents out of the bottle via the pourer). In the example of a fill level sensor device that functions as a bottle stopper that needs to be removed from a bottle before pouring contents out of the bottle, a fill level measurement trigger is detected when a detected z-direction (e.g., up direction) acceleration exceeds a threshold value (e.g., corresponding to removal of the bottle stopper with sufficient force/acceleration). By using the trigger to initiate the fill level measurement, the device can be placed in a low power state to conserve power while waiting for the trigger.

If at 902 it is detected that the fill level measurement trigger is detected, at 904, the process waits until a detection criteria has been met. For example, the measurement trigger may have been caused movement associated with pouring content out of a spout of the device and in order to obtain an accurate measurement, a wait time is needed to ensure that the liquid content of the container has settled from the movement.

In some embodiments, the detection criteria specifies an orientation criteria. For example, before fill level measurement is to be performed, an accelerometer, gyroscope, and/or tilt/orientation sensor must indicate that the fill level sensor is in the proper orientation associated with performing an accurate fill level measurement. In one example, while a user is still tipping the sensor and the container upside down to pour contents out of the spout of the device, the device cannot properly measure the fill level and the detection criteria has not been met. In another example, if the user has uncapped the fill level sensor from the container and lays the fill level sensor down on its side on a table, the sensor device is detected as not being in the desired upright orientation and the detected criteria has not been met.

In some embodiments, the detection criteria specifies a movement criteria. For example, before the fill level measurement is to be performed, an accelerometer, gyroscope, and/or orientation sensor must indicate that the movement/position of the fill level sensor device is relatively stable (e.g., detected movement within specified period of time is within a specified range or below a threshold). In one example, if the device is still in the process of being moved, an accurate fill level measurement cannot be achieved due to movement of contents within the container.

These detection criteria in combination may specify that in order to meet the detection criteria, the fill level sensor must be oriented upright and movement stable for at least a set period of time. In some embodiments, if the detection criteria is not met for at least an error threshold amount of time and/or an error is detected, an error/message is provided (e.g., provided to server 410 of FIG. 4 and/or user) to allow a user to correct the error (e.g., user forgot to cap the container using the sensor device after pouring contents out of the container and a reminder is provided to the user after a preconfigured amount of time to put the sensor device back on the container).

At 906, a fill level measurement is performed. For example, an interrogation signal is sent and its reflection is detected and analyzed to determined content fill level of a container engaged to the fill level sensor device. In various embodiments, at least a portion of the process of FIG. 10 is utilized to perform the fill level measurement.

At 908, it is determined whether a periodic detection time has been reached. Rather than only relying on the fill level measurement trigger, a fill level measurement is performed periodically to ensure correct fill level detection and it is determined whether it is time to perform a periodic fill level measurement. For example, errors detecting the fill level measurement trigger and/or detecting incorrect fill levels may be corrected by periodically performing a fill level measurement. The amount of time between periodic detection may be regular intervals and/or based on dynamic factors. For example, periodic detection time is reached periodically every set amount of time (e.g., every ten minutes). In another example, periodic detection time is reached after a set amount since a previous fill level measurement (e.g., set amount of time after triggered measurement). In some embodiments, the periodic detection time is dynamically adjusted based on one or more of the following: time of day, day of week, battery power, magnitude of variances in previous measurements, sensor data, etc. In an alternative embodiment, periodic detection is optional and/or not performed. In some embodiments, once a threshold number of consecutive periodic detections have been performed and/or results in measurements that are consistent with one another, periodic detection is not performed again to conserve power until a triggering criteria is detected (e.g., detection of change in motion, acceleration, orientation, etc.). In some embodiments, periodic detection time triggering of fill level measurements is only performed during a specified time window (e.g., during business hours).

If at 908 it is determined that the periodic detection time has been reached, at 910, fill level measurement is performed. For example, an interrogation signal is sent and its reflection is detected and analyzed to determine content fill level of a container engaged to the fill level sensor device. In various embodiments, at least a portion of the process of FIG. 10 is utilized to perform the fill level measurement.

Figure 10:
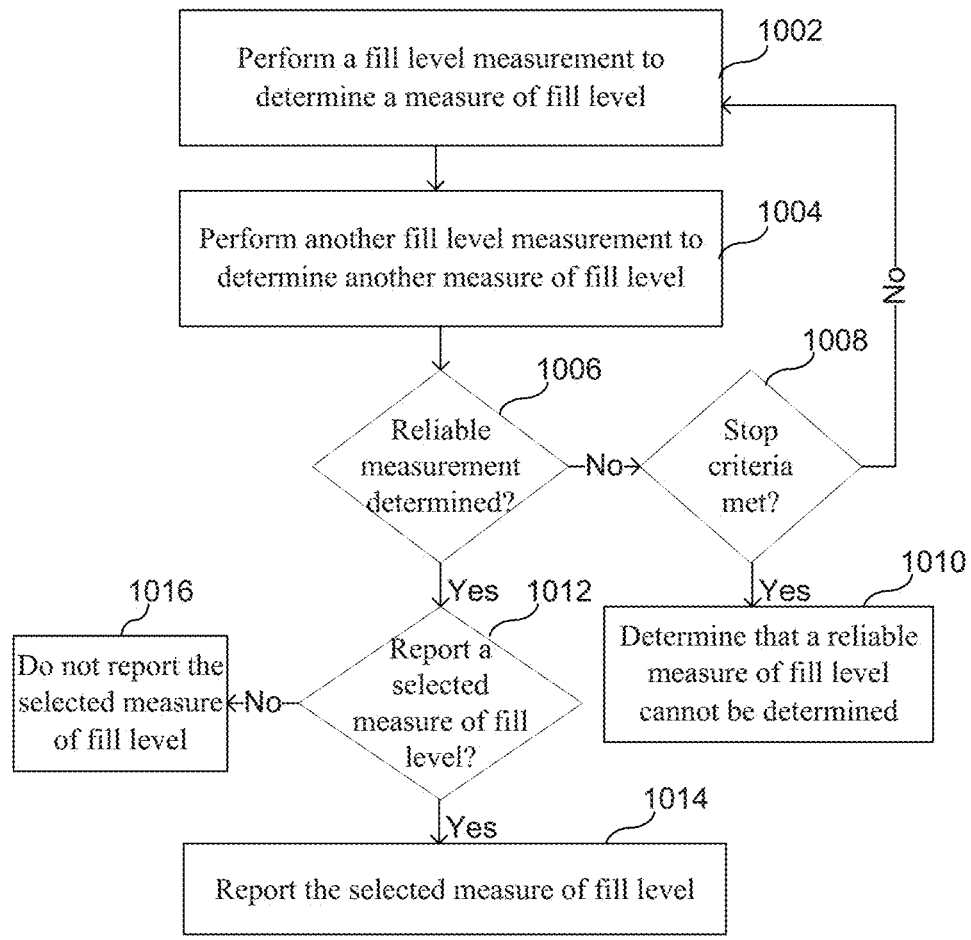
FIG. 10 is a flowchart illustrating an embodiment of a process for measuring a fill level of a container using a fill level sensor device.

FIG. 10 is a flowchart illustrating an embodiment of a process for measuring a fill level of a container using a fill level sensor device. The process of FIG. 10 may be implemented on sensor device 100, 200, 300, 350 and/or 360 of FIGS. 1-3D. In some embodiments, at least a portion of the process of FIG. 10 is included in 906 and/or 910 of FIG. 9.

At 1002, a fill level measurement is performed to determine a measure of fill level. In some embodiments, performing the fill level measurement includes sending an interrogation signal (e.g., sonic/ultrasonic signal) and detecting/receiving a reflection of the interrogation signal. By measuring the amount of time it takes for the interrogation signal to travel from a sensor device engaged at the top of the container to content (e.g., liquid) remaining within the container and reflect back to the sensor device, the distance traveled by the interrogation signal before being reflected (e.g., distance between sensor device 100 and the liquid surface is half of the total distance traveled by the signal as shown in FIG. 1) may be determined by multiplying the amount of time by the speed of the signal (e.g., speed of sound when the interrogation signal is an ultrasonic signal). If the total distance between the bottom of the container and the sensor device is known, the fill height of the container can be determined (e.g., total distance between bottom and sensor device minus distance between sensor device and content surface). If the shape and volume of the bottle are known, the volume/amount of content contained in the container may be determined.

The determined measure of fill level corresponds to an amount of content included in the container engaged by the fill level sensor device. For example, the measure of fill level indicates a measured distance between the sensor device and the content in the container. In some embodiments, the determined measure of fill level is determined by adjusting a measured distance between a receiver of the sensor device and the content in the container by a predetermined and/or dynamically determined adjustment distance value. For example, the adjustment distance value is added to the measured distance, and the adjustment distance value is determined based on a distance between the receiver of the sensor device and the top of the container engaged by the sensor device and/or a transmitter/receiver time delay (e.g., delay in initiating transmission and actual signal transmission, delay in a signal reaching a receiver and the receiver detecting the signal, etc.). In another example, the measure of fill level specifies a detected time it took for the sent signal to bounce back from content included in the container to the sensor device. In another example, the measure of fill level specifies the volume of content remaining in the container (e.g., absolute volume or a difference in volume from a previous measurement).

At 1004, another fill level measurement is performed to determine another measure of fill level. By performing another measurement of the fill level a time right after the previous measurement in response to the same fill level measurement trigger (e.g., trigger in 902 of FIG. 9), the previously determined measure of fill level in 1002 is able to be verified against the new measure of fill level (e.g., the measures of the fill level should ideally be the same when measurements are performed back-to-back without any intervening fill level measurement trigger) to ensure repeatability of the fill level measurement prior to updating the content fill level of the container using the measurement data. In various other embodiments, measurements of fill level may be performed more than two times for additional verification.

At 1006, it is determined whether a reliable measure of fill level has been determined. For example, it is determined that a reliable measure of fill level has been determined in the event the last two consecutive measures of fill levels have been successfully determined (e.g., in 1002 and 1004 or two consecutive iterations of 1004) and the last two determined measures of fill levels are the same/similar (e.g., within a threshold difference value). By verifying that the last two determined measures of fill levels are the same/similar, repeatability of the measurements is verified in determining that a reliable measure of fill level has been detected.

In some embodiments, determining whether a reliable measure of fill level has been determined includes comparing the last two measurements of fill level (e.g., compare measure of fill level determined in 1002 with the measure of fill level determined in 1004 or compare two different measures of fill level determined in two consecutive iterations of 1004). For example, if a difference (e.g., value difference or percentage difference) between the measures of fill level that have been determined is within a threshold range (e.g., less than a threshold value of 3 mm) then it is determined that a reliable measure of fill level has been determined and otherwise it is determined that a reliable measure of fill level has not been determined.

If in 1006, it is determined that a reliable measure of fill level has not been determined, at 1008, it is determined whether a fill level measurement stop criteria has been met. For example, the fill level measurement is to be repeated until a consistent measure of fill level has been detected in the last two consecutive measurements or a limit on the number of times the fill level measurement is to be repeated is reached (e.g., maximum of up to five fill level measurements can be performed prior to concluding that a reliable measure of fill level cannot be determined). Thus in some embodiments, determining whether the fill level measurement stop criteria has been met includes determining whether the total number of fill level measurements performed in an attempt to determine a reliable measure of fill level (e.g., fill level measurements performed in response to the same triggering condition instance to determine a fill level corresponding to the triggering condition instance) has reached a specified limit. If the specified limit has been reached, it is determined that the fill level measurement stop criteria has been met. In some embodiments, determining whether the fill level measurement stop criteria has been met includes determining whether a stopping error has been detected during a fill level measurement. For example, certain detected errors (e.g., low battery error, sensor malfunction, sensor misalignment, sensor device position error, etc.) indicate that a reliable measure of fill level cannot be determined without user or other intervention.

If in 1008, it is determined that the fill level measurement stop criteria has not been met, the process returns to 1002 where another fill level measurement is performed to determine another measure of fill level.

If in 1008, it is determined that the fill level measurement stop criteria has been met, at 1010, it is determined that a reliable measure of fill level cannot be determined. For example, an error indication (e.g., identifying a reason of the error) is transmitted via a wireless signal to a hub or other computer device. This indication may be provided to a user to allow the user to troubleshoot or replace the sensor device.

If in 1006, it is determined that a reliable measure of fill level has been determined, at 1012, it is determined whether to report a selected measure of fill level. For example, a selected measure of fill level is reported if the selected measure of fill level is sufficiently different from a previously reported measure of fill level (e.g., difference between selected measure of fill level and a previously reported measure of fill level determined to be reliable is greater than a threshold difference value). In this example, if it is determined that the difference between the selected measure of fill level and the previously reported measure of fill level (e.g., previously determined to be reliable) is less than or equal to the threshold difference value, it is determined that a reliable measure of fill level has been determined and if it is determined that the difference between the selected measure of fill level and the previously reported measure of fill level is greater than the threshold difference value, it is determined that a reliable measure of fill level has not been determined. This allows only meaningful differences in fill levels to be reported, allowing savings in power/energy from not transmitting a value that is not sufficiently different from a previously reported measure of fill level (e.g., not report slight variation between measures of fill levels caused by detection measurement noise that does not attribute to a meaningful difference in container fill level).

The selected fill level may be the measure of fill level determined at 1002 and/or 1004. For example, the last determined measure of fill level is selected as the selected fill level. In another example, a measure of fill level among the ones determined in 1002 or in iterations of 1004 that is closest to a previously reported measure of fill level is selected. In some embodiments, the selected fill level is determined based on the measures of fill level determined in 1002 and/or one or more iterations of 1004. For example, an average of the last two measures of fill level is calculated and selected as the selected measure of fill level. Thus, the selected fill level may be chosen (e.g., last determined value, average value, etc.) among measures of fill levels that have been identified as same/similar (e.g., within a threshold difference value) in 1006.

If at 1012, it is determined to report the selected measure of fill level, at 1014, the selected measure of fill level is reported. Reporting the selected measure of fill level may include transmitting an identifier of the sensor device, a value indicating when the associated fill level measurement was performed (e.g., timestamp, instance number, etc.), and a value of the selected measure of fill level to interface device 406 and/or server 410 of FIG. 4.

In some embodiments, a previously reported selected measure of fill level (e.g., along with associated timestamp or instance value) is also reported (e.g., reported in a previous iteration of 1012) along with the data reported for the newly determined/selected measure of fill level.

By sending the previous reported selected measure of fill level along with the newly determined/selected measure of fill level, the recipient of the report is able to determine whether any previously reported measure of fill level was not received and obtain the previously reported measure of the fill level via the new report if the recipient happened to have not received it previously. The reported selected measure of fill level is used by the recipient to track the current fill level of the container. For example, the selected measure of fill level is provided by the fill level sensor device (e.g., along with an identifier of the fill level sensor device and associated time/iteration/instance value) to interface device 406 that updates a server stored record of the fill level and/or content volume of the container measured by the fill level sensor device.

If at 1012, it is determined to not report the selected measure of fill level, at 1016, the selected measure of fill level is not reported. Despite not reporting the measure of fill level, other indications may be sent (e.g., indication sent to interface device 406 of FIG. 4 that measurement was performed but not reported). In some embodiments, a heartbeat message may still be sent despite not reporting the actual measure of fill level to indicate an operational status of the sensor device.

In some embodiments, if an error is detected by the fill level sensor device during any of the steps in the process of FIG. 10, the process ends and an indication of the error is provided. For example, detected errors such as detected movement during fill level measurement, improper fill level sensor positioning/latch to container, blocked receiver/sensor (e.g., liquid beaded on sensor or receiver and is hindering the detection), etc. are indicated and the process stops to allow a user to correct the error.

Figure 11:
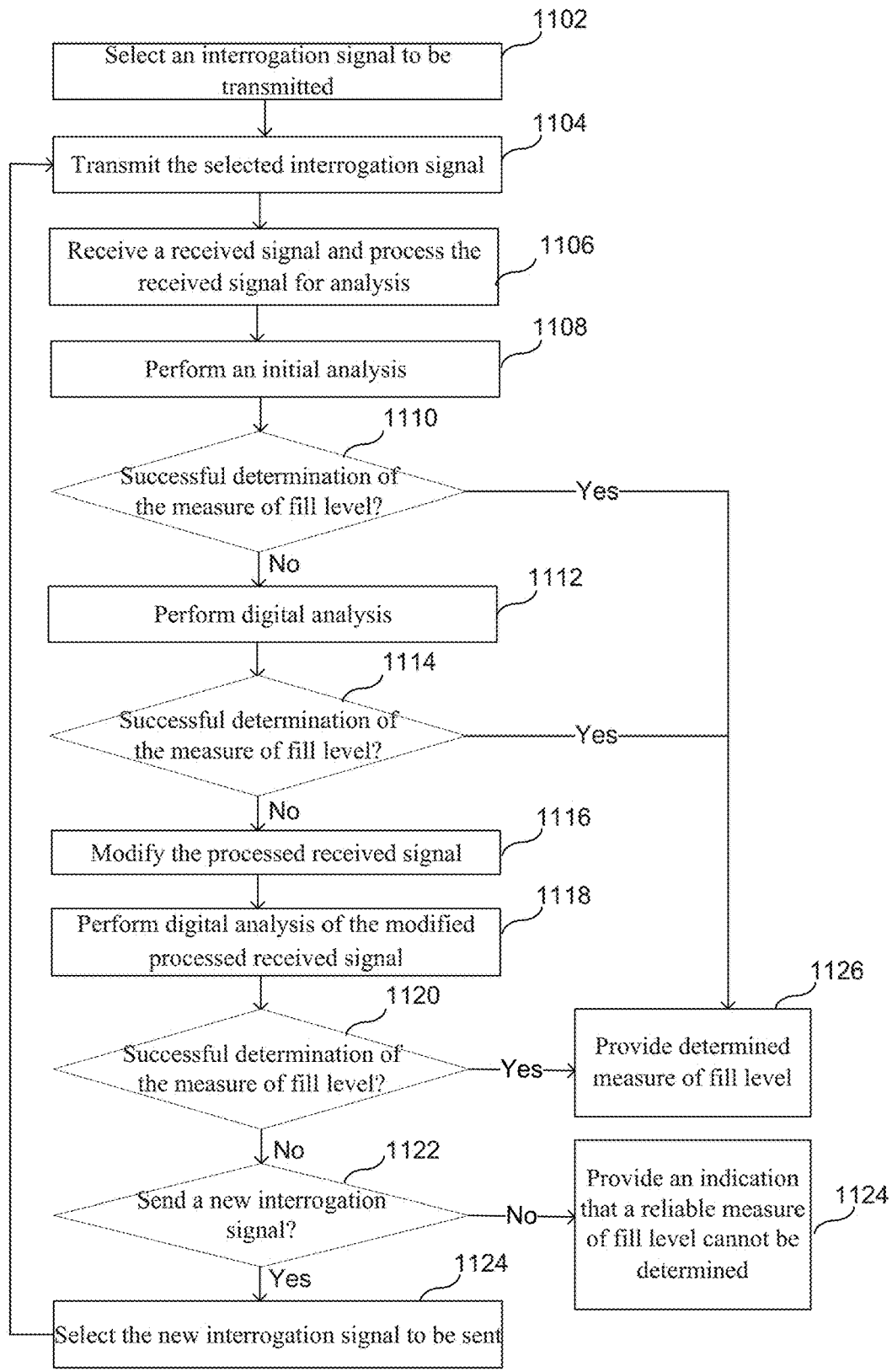
FIG. 11 is a flowchart illustrating an embodiment of a process for detecting potential reflections indicated by a received signal.

FIG. 11 is a flowchart illustrating an embodiment of a process for using a fill level sensor device to perform a fill level measurement to determine a measure of fill level of a container. The process of FIG. 11 may be implemented on sensor device 100, 200, 300, 350 and/or 360 of FIGS. 1-3D. In some embodiments, at least a portion of the process of FIG. 11 is included in 1002 and/or 1004 of FIG. 10. For example, at least a portion of the process of FIG. 11 is executed by a fill level sensor each time a fill level measurement is performed by the sensor device to determine a measure of fill level indicating an amount of content included in the container engaged by the sensor device.

At 1102, an interrogation signal to be transmitted is selected. In some embodiments, the interrogation signal to be transmitted is selected based on a received configuration. For example, the configuration received in 806 of FIG. 8 specifies a default set of configuration parameters of a default interrogation signal to be utilized to determine an initial approximate fill level. The received configuration may also specify one or more fill level range specific sets of configuration parameters that specify the specific interrogation signal to be utilized for a particular fill level. For example, for each range of fill levels, a different set of configuration parameters for a specific interrogation signal to be utilized for the particular fill level range is specified in the received configuration. In one example, once an initial approximate fill level is determined using the default set of configuration parameters, a specific set of configuration parameters corresponding to a specific fill level range that includes the initial approximate fill level is selected as the configuration parameters of the interrogation signal to be utilized to determine a more specific fill level. In some embodiments, the received configuration specifies a plurality of sets of configuration parameters and each set is utilized to generate and transmit a corresponding interrogation signal one or more times until a set that results in a consistent fill level measurement has been identified. This set of configuration parameters that resulted in the consistent fill level measurement may be utilized for subsequent measurements of different fill levels and/or this search for a consistent result producing set of configuration parameters may be performed periodically and/or each time a fill level measurement is performed. In some embodiments, the measurement fill level of the identified set is utilized to select the set of configuration parameters to be utilized to determine a more accurate fill level. For example, the set of configuration parameters for the fill level range corresponding to the measured fill level is selected.

In some embodiments, based on a previous fill level, the interrogation signal to be transmitted is identified. For example, a previously utilized interrogation signal (e.g., corresponding to a previously selected set of configuration parameters) is selected for use unless a previously determined fill level indicates that another interrogation signal (e.g., corresponding to another set of configuration parameters) should be utilized (e.g., a next fill level range interrogation signal is selected because a previously determined fill level is at the limit of or beyond the valid fill level range of the previously utilized interrogation signal).

In some embodiments, the interrogation signal is consistent across all fill levels of the container. For example, although the interrogation signal is specific to a particular type of container, the interrogation signal is consistent for all fill levels of the container. In some embodiments, the interrogation signal is an impulse. In some embodiments, the interrogation signal is an acoustic signal. In some embodiments, the interrogation signal is an ultrasonic signal. In an alternative embodiment, the selected interrogation signal is a standard default interrogation signal to be used when performing a fill level measurement.

At 1104, the selected interrogation signal is transmitted. In some embodiments, the transmitted interrogation signal is generated using a selected set of configuration parameters within the received configuration. In some embodiments, the selected interrogation signal includes one or more signal pulse components specified by the selected set of configuration parameters. For example, each signal pulse may be identical and the signal pulses are emitted sequentially with an optional period of no signal (e.g., silence) between the signal pulses.

The number of signal pulses, the length of the signal pulses, a frequency of the signal pulses, a signal content of the signal pulses, a strength/magnitude of the signal pulses, a profile of the signal pulses, a waveform of a signal pulse, a length of null signal between the signal pulses, a length/width of a signal component, a pulse width, an amplitude/intensity of the signal component, a modulation of the signal component (e.g., pulse-width modulation to be utilized), and/or a duty cycle of the signal component, etc. may be specified by the received configuration.

The variations of the interrogation signal may be due to the type of container that is holding the content to be measured and/or fill level range of the container. For example, the thickness of the container, the material of the container, a shape of the container, a length of the container, a width of the container, a size of the container, and/or an amount/type of the content included in the container may all affect how and where the interrogation signal travels and bounces within the container and the received configuration is specific to the container type and/or fill level of the container to improve the content amount/volume/level measurement of a sensor device.

In some embodiments, the interrogation signal is consistent across all fill levels of the container. In some embodiments, the interrogation signal is an impulse generated by a speaker. In some embodiments, the interrogation signal is an acoustic signal. In some embodiments, the interrogation signal is an ultrasonic signal.

In some embodiments, by measuring the amount of time it takes for the interrogation signal to travel from a sensor device engaged at the top of the container to content (e.g., liquid) remaining within the container and reflect back to the sensor device, the distance traveled by the interrogation signal before being reflected (e.g., distance between sensor device 100 and liquid surface is half of the total distance traveled by the signal as shown in FIG. 1) may be determined by multiplying the amount of time by the speed of the signal (e.g., speed of sound when the interrogation signal is an ultrasonic signal). If the total distance between the bottom of the container and the sensor device is known, the fill height of the container can be determined (e.g., total distance between bottom and sensor device minus distance between sensor device and content surface). If the shape and volume of the bottle are known, the volume/amount of content contained in the container may be determined.

At 1106, a receiver receives a received signal and the received signal is processed for analysis. For example, after the interrogation signal is transmitted, the receiver (e.g., microphone) of the sensor device starts detecting the received signal. As the interrogation signal reflects off content included in the container, the reflected signal is detected in the received signal. In some embodiments, preparing the received signal includes filtering the received signal to improve signal to noise ratio. For example, the received signal is subject to noise and the received signal is filtered to isolate the desired signal (e.g., band-pass filter the received signal), and amplified (e.g., to improve signal to noise ratio). In some embodiments, the preparing the received signal includes obtaining an envelope of the received signal. For example, using a hardware circuit (e.g., analog) and/or other (e.g., digital) signal envelope detector, an upper envelope of the received signal is obtained. Preparing the received signal includes performing an analog to digital conversion. For example, the analog signal output of an envelope detector of the received signal is converted to a digital signal for analysis by a digital signal processor. The digital signal may be stored in memory storage for subsequent analysis.

In some embodiments, a predetermined beginning portion (e.g., predetermined amount of time in the beginning of the signal) of the received signal may be modified/ignored/removed/muted due to coupling between the transmitter and receiver of the sensor device. For example, when the transmitter transmits the interrogation signal, the signal may be received by the receiver of the sensor device (e.g., conducted directly from the transmitter to the receiver via the housing of the sensor device) before the signal is reflected by the contents of the container, and this undesired signal portion received in the beginning of the received signal is not to be identified as a reflection In some embodiments, if an error is detected while performing step 1104 and/or 1106, it is determined that the measure of fill level cannot be successfully determined. For example, it is expected that the container and the fill level sensor device are not physically moved during fill level measurement (e.g., movement may disturb contents inside the container and the contents may have been moving when the measurement was performed). When an error is detected by the sensor device (e.g., using data from an accelerometer, gyroscope, orientation sensor, signal received, etc.) during the fill level measurement, it may be determined to abort the process of FIG. 11, or determine that a fill level measurement should be performed again and the process of FIG. 11 may return to 1104 to repeat interrogation signal transmission.

At 1108, an initial analysis is performed to attempt to determine a measure of fill level. For example, an initial analysis (e.g., analog analysis) is performed using an analog version of the received signal in an attempt to determine the measure of fill level using an analysis technique that takes advantage of the high signal resolution of the analog signal. Additionally, the analog analysis may utilize less resources than other more advanced digital analysis techniques that may require more resources.

In some embodiments, the initial analog analysis is utilized to identify candidate locations in the analog version of the received signal that may correspond to receipt at the receiver of a reflection of the interrogation signal. Then more advanced techniques (e.g., digital signal analysis) may be utilized to identify which of the identified candidate locations, if any, in the analog version of the received signal most likely corresponds to receipt of the reflection of the interrogation signal. If the initial analog analysis results in a single candidate location in the analog version of the received signal that corresponds to receipt of the reflection of the interrogation signal, this candidate location in the analog version of the received signal may be utilized without the need to perform the more advanced technique (e.g., digital signal analysis).

The measure of fill level corresponds to an amount of content included in the container engaged by the fill level sensor device. For example, the measure of fill level indicates a measured distance between the sensor device and the content in the container. In another example, the measure of fill level specifies a detected time it took for the sent signal to bounce back from content included in the container to the sensor device. In another example, the measure of fill level specifies the volume of content remaining in the container (e.g., absolute volume or a difference in volume from a previous measurement).

A reflection of the interrogation signal that reaches the receiver may be characterized by an increase in signal amplitude corresponding to when the reflected signal reaches the receiver. In some embodiments, using the initial analysis to determine the measure of fill level includes identifying instances (e.g., a time value of when it occurs) in the received signal (e.g., in processed received signal from 1106) when the signal strength meets a detection threshold (e.g., reflection detection threshold). For example, a reflection is identified by detecting one or more instances in the received signal where the amplitude increases to transition from being below the detection threshold to meet the threshold. The detection threshold may be dynamically set and the detection threshold may be identified in the configuration received in 806 of FIG. 8. In some embodiments, determining the measure of fill level includes analyzing an envelope of the received signal (e.g., the processed received signal in 1106) to identify when the reflected signal reaches the receiver. For example, the envelope of the analog signal is analyzed to detect when an amplitude of the envelope of the received signal reaches a detection threshold corresponding to a detected reflection. In some embodiments, an analog envelope detector (e.g., envelope detector built analog circuit components) is included in the fill level sensor device and used to obtain the envelope of the received analog signal that is analyzed to identify when the reflected signal reaches the receiver.

The detection threshold may be dynamically varied based on a type of container that includes the content to be measured and/or a fill level of the container. For example, the shape of the container and the amount of distance that an interrogation signal has to travel to detect the fill level may influence the strength of the reflected signal that is received at the receiver of the fill level sensor and the detection threshold is adjusted and set based on one or more factors. In some embodiments, specification of the detection threshold was received in 806 of FIG. 8. For example, based on a type of container to be associated with the fill level sensor, one or more detection thresholds specific to the particular container are provided to the fill level sensor device during fill level detection. In some embodiments, the detection threshold is at least based on a previously detected fill level of the container and a previously determined fill level and/or estimated fill level of the container is utilized to select the reflection detection threshold. For example, for different ranges of fill levels, a different detection threshold is to be utilized and the detection threshold corresponding to the last measured fill level is selected to be utilized. In various embodiments, the reflection detection threshold may be a fixed value, a relative value, a difference value, an offset value or a percentage value.

In some embodiments, it is determined whether a selected amplitude value of the signal meets the detection threshold including determining a difference between a baseline signal amplitude and the selected amplitude value and determining whether the difference meets the reflection detection threshold (e.g., the set reflection detection threshold is a relative value). For example, rather than directly using the raw magnitude value of the selected signal amplitude, a relative difference between the baseline signal amplitude and the selected amplitude value is utilized to compensate for amplitude increase caused by other signal sources (e.g., the difference better measures signal amplitude increase caused by a reflection). The baseline signal amplitude may be preconfigured, specified in a received configuration, and/or dynamically determined. For example, the baseline signal amplitude is determined by averaging signal amplitude (e.g., frequency low pass filter) of the received signal (e.g., envelope of the received signal) for a window of time (e.g., for set amount of latest signal envelope hysteresis). When comparing this difference with the reflection detection threshold (e.g., threshold selected/determined for comparison with difference values), it is determined that the selected amplitude value meets the reflection detection threshold if the difference is greater than or equal to the reflection detection threshold. Otherwise, it is determined that the reflection detection threshold is not met. In some embodiments, the selected amplitude value can only meet the reflection detection threshold if the selected amplitude value is greater than the previous selected amplitude value (e.g., only detect signal increases to threshold).

In some embodiments, once it has been determined that the selected amplitude value has met the reflection detection threshold, a next amplitude value in the signal is not eligible to meet the reflection detection threshold until the amplitude of the signal falls below (or meets) a detection reset threshold. This reduces the likelihood of detecting another potential reflection for a period of time after a potential reflection has been identified/detected. For example, although the detection threshold has been met, the amplitude of the received signal may continue to increase or remain high for the same reflection event. In order to prevent subsequent selected amplitude values of the same reflection event from being detected as a new potential reflection, once the selected amplitude value has been determined to meet the reflection detection threshold, subsequent values of the signal are not eligible to meet the reflection detection threshold until the amplitude of the signal has fallen below (or has met) the detection reset threshold.

The detection reset threshold is equal in value to the reflection detection threshold in some embodiments, while in other embodiments detection reset threshold is less in value than the reflection detection threshold. In some embodiments, the detection reset threshold is a value that is set (e.g., dynamically varied) along with the reflection detection threshold. For example, the detection reset threshold is relative (e.g., a fixed amount less, a percentage less, etc.) to the reflection detection threshold.

In some embodiments, the time value that corresponds to when the reflected signal reaches the detection threshold value (e.g., when amplitude of the received signal or envelope of the received signal reaches a corresponding threshold value) is included in the measure of fill level. For example, the determined measure of fill level includes a time duration between transmitting the interrogation signal and receiving the portion of the signal corresponding to a received reflection. In some embodiments, the measure of fill level is associated with a fill height (e.g., identifies a distance value). For example, if the total distance between the bottom of the container and the fill level sensor device is known, the fill height of the container can be determined (e.g., total distance between bottom and sensor device minus distance between sensor device and liquid surface determined by multiplying speed of the signal with half signal travel time—the amount of time between transmitting the interrogation signal and receiving the portion of the signal corresponding to a received reflection). In some embodiments, the measure of fill level includes a volume value. For example, a table/database/data structure that maps fill length/distance (e.g., distance between content/liquid surface and sensor device, etc.) to content/liquid volume of the container is utilized to determine content/liquid volume corresponding to the determined fill height/distance. Different tables/databases/data structures may exist for different types of containers and data specific to the container is received in 806 of FIG. 8.

At 1110 it is determined whether the initial analysis resulted in a successful determination of the measure of fill level. For example, if an amplitude of the received signal (e.g., processed received signal) does not reach the threshold value of the initial analysis, it is determined that the measure of fill level has not been successfully determined.

In some cases, not only does the transmitted interrogation signal directly reflect off contents in the container, the transmitted interrogation signal may bounce off container contents at other non-direct angles as well as off walls of the container and other components of the fill level sensor device as the interrogation signal spreads out and bounces multiple times. A detected reflection may not be actually due to a reflection off contents of the container and may instead be due to an artifact of noise or detection error. In some embodiments, if multiple reflections are detected (e.g., amplitude of the received signal or envelope of the received signal crosses a corresponding threshold value multiple times in a pattern that indicates multiple detected reflections), it is determined that the measure of fill level is unable to be successfully determined only using the initial analysis.

If at 1110 it is determined that the initial analysis did not result in a successful determination of the measure of fill level, at 1112, a digital analysis of the processed received signal is performed in an attempt to determine a measure of fill level. In some embodiments, the digital analysis in 1112 is performed regardless of whether the initial analysis resulted in a determination of the measure of fill level. In alternative embodiments, the initial analysis is not performed and a result of the digital analysis is utilized to determine the measure of fill level.

The processed received signal is analyzed to identify one or more peaks in the processed received signal. An example of the processed received signal is a digital signal that has been detected by performing an analog to digital conversion of the envelope signal of the received analog signal. The processed received signal has been stored in memory/storage of the sensor device for digital analysis. The peaks in the processed received signal likely correspond to detected reflections of the interrogation signal within the container and one of the identified one or more peaks is indicative of the fill level of the container. The total amount/length of the processed received signal analyzed and eligible for peak detection may be dynamically limited based on a physical length/configuration of an associated container. For example, because the amount of distance a signal travels directly down inside the container and back is limited by the interior size length of the container, the total length of the processed received signal analyzed for peak detection is limited to correspond to the amount of round trip signal travel of time for the length inside the container plus a buffer amount. In some embodiments, identifying the peaks in the processed received signal includes identifying instances in the processed received signal (e.g., within limited signal length based on a physical length of an associated container) when the amplitude of the processed received signal is above a peak detection threshold. In some embodiments, the peak threshold is dynamically determined based on one or more parameters (e.g., minimum amplitude value, maximum amplitude value, average amplitude value, etc.) of the processed received signal. For example, the peak detection threshold=((minimum amplitude value+average amplitude value)/2+maximum amplitude value)/2.

After the amplitude of the processed received signal rises above the peak detection threshold, the amplitude may stay above the peak detection threshold for a period of time/number of samples until it falls below the peak detection threshold. Each different period of the signal when the amplitude of the processed received signal is sustained above the peak detection threshold is identified as a different peak. For example, a next peak is eligible to be detected once the signal amplitude falls below the peak detection threshold. For each of these peaks, the length of the period (e.g., amount of time or number of samples in the period of the peak), a beginning time value associated with when the amplitude increased to cross the peak detection threshold for the corresponding peak (e.g., time value corresponding to the beginning of the peak crossing the peak detection threshold, time duration from signal transmission to when the signal portion corresponding to the beginning of the peak was received, etc.), and a rate of change of the amplitude of the processed received signal at the beginning time value of the corresponding peak are determined. If the length of the period is less than a selected threshold, the peak may be deemed ineligible to be selected as corresponding to a fill level of the container because a short peak length likely corresponds to noise rather than being due to a received signal reflection from contents of the container.

One of the one or more identified and eligible peaks is selected as corresponding to a fill level of the container. The peak that corresponds to the direct reflection of the interrogation signal off contents of the container directly back to the receiver is desired to be identified because the signal travel time of this peak corresponds to the content fill level of the container. In some embodiments, selecting the selected peak includes identifying the peak associated with the greatest determined rate of change of the amplitude (e.g., when crossing the peak detection threshold at the determined beginning time value). If there is a tie among the eligible peaks for the determined rate of change, the peak associated with the longest/largest determined length of period among the tied peaks is selected. If there is a further tie among the eligible peaks for the rate of change and the length of period, the first occurring peak (e.g., earliest beginning time value) among the tied peaks is selected. In effect in various embodiments, selecting the selected peak may include determining corresponding energies associated with each of the peaks and selecting the peak with the largest energy as the selected peak.

Then, a measure of fill level is determined based on the select peak. For example, the beginning time value associated with the selected peak is utilized in determining the measure of fill level. In some embodiments, a distance value corresponding to the selected peak is determined as the measure of fill level. For example, the selected peak corresponds to when a reflection of the interrogation signal from contents of the container reaches the signal receiver and by measuring the amount of time it took to receive the selected peak corresponding to the reflection, the distance traveled by the interrogation signal to reach contents of the container (e.g., distance between sensor device and liquid surface is half of the total distance traveled by the interrogation signal) may be determined as the measure of fill level by multiplying the amount of time by the speed of the signal (e.g., speed of sound) divided by 2 (e.g., plus an adjustment factor value to account for the distance between the receiver of the sensor device and the top of the container and/or a transmitter/receiver time delay). Ultimately, the beginning time value and/or signal travel distance associated with the selected peak can be utilized to determine a volume value of content remaining in the container.

Although identified instances in the analog signal determined in 1108 may ideally correspond with detected peaks in the digital signal because they both measure attempt to detect the same reflection instances, the difference in detection thresholds and/or methods (e.g., instance in analog signal attempts to detect beginning of a reflection while peaks in digital signal also attempt to detect highest energy point of the reflection) may yield different associated time values. Also, the time value detected in the analog signal may be more accurate than the time value detected in the digital signal due to the higher resolution of the analog signal. By using the analog signal to select candidate time values corresponding to potential reflections and using the digital signal analysis to select one of the candidate time values from the analog signal (e.g., using analysis that takes into consideration corresponding total energy associated with each associated reflection peak), a more accurate reflected signal travel time and associated measure of fill level may be determined.

In some embodiments, the beginning time value associated with the selected peak is utilized to select a corresponding one of the identified instances in the analog signal determined in 1108. For example, each identified instance specifies a time in the received analog signal when the signal strength meets the detection threshold, and one of these identified instances is identified as corresponding to the fill level of the container. Selecting one of the identified instances includes determining whether any time value of the identified instances in the analog signal is the same or within a threshold range of the beginning time value associated with the selected peak and selecting the identified instance with a time value that is within the threshold range and closest to the beginning time value of the selected peak. The time value of the selected identified instance in the analog signal is then utilized in determining the measure of fill level rather than the beginning time value associated with the selected peak. In some embodiments, a distance value corresponding to this selected identified instance in the analog signal is determined as the measure of fill level. For example, the time value of the selected identified instance in the analog signal is multiplied by the speed of the signal (e.g., speed of sound) and divided by 2 (e.g., plus an adjustment factor value to account for the distance between the receiver of the sensor device and the top of the container and/or a transmitter/receiver time delay). Ultimately, the time value and/or signal travel distance associated with the selected identified instance in the analog signal can be utilized to determine a volume value of content remaining in the container. If none of the time values of the identified instances is within the threshold range of the beginning time value associated with the selected peak, it is determined that the digital analysis has not resulted in a successful determination of the measure of fill level.

At 1114 it is determined whether the digital analysis resulted in a successful determination of the measure of fill level. For example, the digital analysis does not result in a successful determination of the measure of fill level if no peaks are identified or a selected peak cannot be identified and if a selected peak has been successfully identified, it is determined that the digital analysis has resulted in a successful determination of the measure of fill level. In another example, digital analysis does not result in a successful determination of the measure of fill level if an error is during the digital analysis. In another example, digital analysis does not result in a successful determination if any identified instance in the analog signal that corresponds to the selected peak cannot be identified, and the digital analysis does result in a successful determination if an identified instance in the analog signal that corresponds to the selected peak has been identified. For example, if none of the time value of the identified instances in the analog signal is within a threshold range of the time values associated with the selected peak, it is determined that the digital analysis did not result in a successful determination of the measure of fill level.

If in 1114 it is determined that the digital analysis did not result in a successful determination of the measure of fill level, at 1116, the processed received signal is dynamically modified based on a previously reported indication of fill level.

For example, the amount/level of content that is typically removed from the container each time content is dispensed from the container is usually within a range from the previous fill level (e.g., amount of liquid content poured from a spout of the fill level measurement device is typically constant for each pour). Based on this assumption, a dynamically selected beginning portion of the processed received signal may be modified to reduce/ignore/mute the selected beginning portion of the processed received signal that corresponds to a portion of the processed received signal unlikely to include a signal peak of the interrogation signal reflection corresponding to the fill level of the container. For example, amplitude of a selected beginning portion of the received signal processed in 1106 is reduced or set to zero. The length/duration of the selected beginning portion is dynamically determined based on the previously reported indication of fill level. For example, the time value associated with the previously reported indication of fill level (e.g., time value indicating when an interrogation signal reflection of interest was detected in the received signal of the previously reported indication of fill level) is utilized as the length/duration of the selected beginning portion. In another example, the time value associated with the previously reported indication of fill level that is reduced by a buffer percentage or value is utilized as the length/duration of the selected beginning portion to allow detection of the received signal features of the previously reported indication of fill level in case the fill level has not changed. A decrease in fill level corresponds to a longer interrogation signal reflection travel distance and time that would be detected in the received signal at a time that is after the time corresponding to a previous higher fill level. Thus in some embodiments, dynamically modifying the processed received signal includes determining the time value associated with a previously reported indication of fill level, reducing the time value by a buffer amount (e.g., reduced by a predetermined percentage or predetermined length value), and reducing an amplitude of a beginning portion of the processed received signal for the length of the reduced time value.

At 1118, a digital analysis of the modified processed received signal is performed in an attempt to determine a measure of fill level. The modified processed received signal rather than the original processed received signal is analyzed to identify one or more peaks in the modified processed received signal. The remaining peaks in the modified processed received signal likely correspond to detected reflections of the interrogation signal within the container and one of the identified peaks is indicative of the fill level of the container. By modifying the received signal to remove/reduce a portion of the signal, the number of detected peaks is likely reduced as well. In some embodiments, identifying the peaks in the modified processed received signal includes identifying instances in the modified processed received signal (e.g., also limited within limited signal length based on a physical length of an associated container) when the amplitude of the modified processed received signal is above a peak detection threshold. In some embodiments, the peak threshold is dynamically determined based on one or more parameters (e.g., minimum amplitude value, maximum amplitude value, average amplitude value, etc.) of the modified processed received signal. For example, the peak detection threshold=((minimum amplitude value+average amplitude value)/2+maximum amplitude value)/2.

After the amplitude of the modified processed received signal rises above the peak detection threshold, the amplitude may stay above the peak detection threshold for a period of time/number of samples until it falls below the peak detection threshold. Each different period of the signal when the amplitude of the modified processed received signal is sustained above the peak detection threshold is identified as a different peak. For example, a next peak is eligible to be detected once the signal amplitude falls below the peak detection threshold. For each of these peaks, the length of the period (e.g., amount of time or number of samples in the period of the peak), a beginning time value associated with when the amplitude increased to cross the peak detection threshold for the corresponding peak (e.g., time value corresponding to the beginning of the peak crossing the peak detection threshold, time duration from signal transmission to when the signal portion corresponding to the beginning of the peak was received, etc.), and a rate of change of the amplitude of the modified processed received signal at the beginning time value of the corresponding peak are determined. If the length of the period is less than a selected threshold, the peak may be deemed ineligible to be selected as corresponding to a fill level of the container.

Then one of the one or more identified and eligible peaks is selected as corresponding to a fill level of the container. In some embodiments, selecting the selected peak includes identifying the peak associated with the greatest determined rate of change of the amplitude (e.g., when crossing the peak detection threshold at the determined beginning time value). If there is a tie among the eligible peaks for the determined rate of change, the peak associated with the longest/largest determined length of period among the tied peaks is selected. If there is a further tie among the eligible peaks for the rate of change and the length of period, the first occurring peak (e.g., earliest beginning time value) among the tied peaks is selected. In effect in various embodiments, selecting the selected peak may include determining corresponding energies associated with each of the peaks and selecting the peak with the largest energy as the selected peak.

Then, a measure of fill level is determined based on the selected peak. For example, the beginning time value associated with the selected peak is utilized in determining the measure of fill level. In some embodiments, a distance value corresponding to the selected peak is determined as the measure of fill level. For example, by measuring the amount of time it took to receive the selected peak, the distance traveled by the interrogation signal to reach contents of the container (e.g., distance between sensor device and content surface is half of the total distance traveled by the interrogation signal) may be determined as the measure of fill level (e.g., by multiplying the amount of time by the speed of the signal divided by 2 plus adjustment factor, if applicable). Ultimately, the beginning time value and/or signal travel distance associated with the selected peak can be utilized to determine a volume value of content remaining in the container and/or dispensed from the container.

In some embodiments, the beginning time value associated with the selected peak is utilized to select a corresponding one of the identified instances in the analog signal determined in 1108. For example, each identified instance specifies a time in the received analog signal when the signal strength meets the detection threshold one of these identified instances is identified as corresponding to the fill level of the container. Selecting one of the identified instances includes determining whether any time value of the identified instances in the analog signal is the same or within a threshold range of the beginning time value associated with the selected peak and selecting the identified instance with a time value that is within the threshold range and closest to the beginning time value of the selected peak. The time value of the selected identified instance in the analog signal is then utilized in determining the measure of fill level rather than the beginning time value associated with the selected peak. In some embodiments, a distance value corresponding to this selected identified instance in the analog signal is determined as the measure of fill level. For example, the time value of the selected identified instance in the analog signal is multiplied by the speed of the signal (e.g., speed of sound) and divided by 2 (e.g., plus an adjustment factor value to account for the distance between the receiver of the sensor device and the top of the container and/or a transmitter/receiver time delay). Ultimately, the time value and/or signal travel distance associated with the selected identified instance in the analog signal can be utilized to determine a volume value of content remaining in the container. If none of the time values of the identified instances is within the threshold range of the beginning time value associated with the selected peak, it is determined that the digital analysis has not resulted in a successful determination of the measure of fill level.

At 1120 it is determined whether the digital analysis performed using the modified processed received signal resulted in a successful determination of the measure of fill level. For example, the digital analysis does not result in a successful determination of the measure of fill level if no peaks are identified or a selected peak cannot be identified in the modified processed received signal and if a selected peak has been successfully identified, it is determined that the digital analysis has resulted in a successful determination of the measure of fill level. In another example, digital analysis does not result in a successful determination of the measure of fill level if an error is during the digital analysis. In another example, digital analysis does not result in a successful determination if any identified instance in the analog signal that corresponds to the selected peak cannot be identified, and the digital analysis does result in a successful determination if an identified instance in the analog signal that corresponds to the selected peak has been identified. For example, if none of the time values of the identified instances in the analog signal is within a threshold range of the time value associated with the selected peak, it is determined that the digital analysis did not result in a successful determination of the measure of fill level.

If in 1120 it is determined that the digital analysis did not resulted in a successful determination of the measure of fill level, at 1122 it is determined whether to send a new interrogation signal. For example, the strength of the received signal corresponding to the reflection off contents of the container may be too weak to be reliably utilized to determine the measure of fill level. This may be due to liquid/condensation beading/bubbling/blocking the transmitter and preventing the full strength transmission of the interrogation signal. In order to penetrate, disturb, and/or dislodge the liquid/condensation blocking/beading/bubbling on the transmitter, a stronger interrogation signal may be utilized in the new interrogation signal to be emitted by the transmitter. The stronger interrogation signal may include increase(s) in signal length, number of pulses, and/or signal amplitude.

In some embodiments, determining whether to send a new interrogation signal includes determining the number of times an new interrogation signal has been sent in the attempt to determine the measure of fill level in an execution instance of the process of FIG. 11. This allows the interrogation signals to be tried a limited number of times (e.g., limit of one additional time for the new interrogation signal in addition to the initial interrogation signal) before concluding that the measure of fill level is unable to be determined. For example, if the number of times interrogation signals have been previously sent for the execution instance of the process of FIG. 11 exceeds a predetermined threshold number, it is determined to not send a new interrogation signal, and if the number of times interrogation signals have been previously sent for the execution instance of the process of FIG. 11 does not exceed the predetermined threshold number, it is determined to send a new interrogation signal.

In some embodiments, determining whether to send a new interrogation signal includes determining whether an amplitude (e.g., highest amplitude, average amplitude, amplitude of an identified peak, etc.) of the received signal (e.g., original received signal, processed received signal, modified processed received signal, etc.) is less than a threshold amplitude, and if the amplitude of the received signal is less than the threshold amplitude, it is determined to send a new interrogation signal and if the amplitude of the received signal is greater than or equal to the threshold amplitude, it is determined to not send a new interrogation signal. This may allow identification of a received signal that is too weak to be reliably utilized to determine the measure of fill level and dynamically send a new interrogation signal in an attempt to receive a better received signal.

If at 1122 it is determined to send a new interrogation signal, at 1124, the new interrogation signal to be sent is selected. Then the process proceeds to 1104 where the new interrogation signal selected as the selected interrogation signal is transmitted and a signal received in response is analyzed in subsequent steps. In some embodiments, a predetermined and/or dynamic amount of time is passed/waited prior to proceeding to 1104. This wait time may allow any movement of contents of the container to settle prior to performing another measurement attempt.

In some embodiments, the new interrogation signal includes a stronger transmission/signal component that is to be transmitted in order to disturb and dislodge the liquid/condensation blocking/beading/bubbling on the transmitter. The amplitude, length and number of multiple pulses of the clearing/dislodging transmission/signal are selected to be great enough in an attempt to dislodge the liquid/condensation from blocking future interrogation signals of the transmitter. In some embodiments, a clearing/dislodging transmission/signal component may function to dislodge the liquid from obstructing transmitted and a separate signal component of the new interrogation signal that is subsequently transmitted (e.g., transmitted after a pause/delay to allow the clearing/dislodging signal component to dissipate) is to be utilized in detecting its reflection for fill level measurement. In some embodiments, instead of or in addition to the clearing/dislodging transmission/signal, the strength/energy/amplitude of a portion of the new interrogation signal that is be reflected and detected for fill level determination is increased from an amplitude of the initial interrogation signal selected in 1102 to assist in the removal and/or transmission through the liquid/condensation affecting the transmitter.

In some embodiments, the new interrogation signal is another transmission instance with the same signal parameters as at least a portion of the selected interrogation signal in 1104. In some embodiments, at least a portion of the new interrogation signal includes one or more parameters of the interrogation signal selected in 1102. For example, a portion of the interrogation signal selected in 1102 may be included in a new interrogation signal or one or more signal parameters of the interrogation signal selected in 1102 are utilized as the starting basis in selecting the new interrogation signal. In some embodiments, the new interrogation signal has one or more different signal parameters as compared to the selected interrogation signal in 1104. For example, the number of signal pulses, the length of the signal pulses, a frequency of the signal pulses, a signal content of the signal pulses, a strength/magnitude of the signal pulses, a profile of the signal pulses, a waveform of a signal pulse, a length of null signal between the signal pulses, a length/width of a signal component, a pulse width, an amplitude/intensity of the signal component, a modulation of the signal component (e.g., pulse-width modulation to be utilized), and/or a duty cycle of the signal component, etc. may be different. Variations in the interrogation signals may allow different reflection patterns of the interrogation signals to be tested to ensure consistency of the measurements of fill level despite the variance in the interrogation signal.

If in 1122 it is determined to not send a new interrogation signal, at 1124, an indication is provided that a reliable measure of fill level cannot be determined. For example, this indication may be utilized to indicate an error to a user. In some embodiments, the indication is used in making a determination to perform another fill level measurement at a later time. In some embodiments, if an error is detected by the fill level sensor device during any of the steps in the process of FIG. 11, the process ends and an indication of the error is provided. For example, detected errors such as detected movement during fill level measurement, improper fill level sensor positioning/latch to container, blocked receiver/sensor (e.g., liquid beaded on sensor or receiver and is hindering the detection), etc. are indicated and the process stops to allow a user to correct the error.

If in 1110, 1114, or 1120, the measure of fill level has been successfully determined, at 1126, the determined measure of fill level is provided. For example, the determined measure of fill level is provided for use in 1002 or 1004 of FIG. 10.

Figure 12:
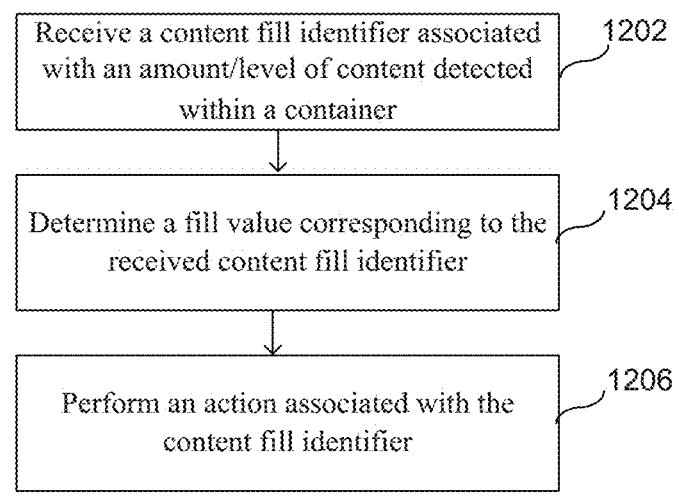
FIG. 12 is a flowchart illustrating an embodiment of a process for performing an action based on a determined content amount.

FIG. 12 is a flowchart illustrating an embodiment of a process for performing an action based on a determined content amount. The process of FIG. 12 may be at least in part implemented on interface device 406 and/or server 410 of FIG. 4.

At 1202, a content fill identifier associated with an amount/level of content detected within a container is received. In some embodiments, the received content fill identifier is the current fill level provided in 1012 of FIG. 10 and/or 1126 in FIG. 11 (e.g., determined in 1108, 1112, or 1118 of FIG. 11). In some embodiments, the content fill identifier has been received along with an associated sensor device identifier of a specific sensor device. The content fill identifier may be utilized to track change in content amount/level of a specific container measured by a sensor device.

In some embodiments, the content fill identifier has been received via a local wireless communication protocol (e.g., Wifi, BLUETOOTH Low Energy, etc.). In some embodiments, the content fill identifier is received by interface device 406 of FIG. 4. In some embodiments, the content fill identifier is received by server 410 via network 408 of FIG. 4. In various embodiments, the received content fill identifier is one of a plurality of content fill identifiers received from the same sensor device over time for the same container and/or from different sensor devices for different containers. In some embodiments, the content fill identifier includes a time value associated with the amount of time it took to receive the reflected interrogation signal and/or a distance value associated with the distance traveled by the received reflected interrogation signal. Other data received along with the content fill identifier includes one or more time values (e.g., timestamp of when the content fill measurement was performed, when the content fill measurement was sent, when the content fill measurement was received, etc.), a detected temperature value (e.g., temperature measured by the sensor device), a previous measured content fill identifier (e.g., can be used in case previous measurement was not received and to verify that previous measurement was received), an identifier of the sensor device that provided the content fill identifier (e.g., media access control identifier assigned to sensor device), a power level indicator (e.g., indicating amount of battery power left in sensor device), and/or a status flag/indicator associated with the provided content fill identifier (e.g., indicating any error, message, or status associated with the provided content fill identifier).

At 1204, a fill value corresponding to the received content fill identifier is determined. For example, a percentage value and/or a volume amount value corresponding to the received content fill identifier is determined. In some embodiments, using an identifier of a sensor device associated with the received content fill identifier, a container type associated with the received content fill identifier is identified. For example, the identification of a specific container type received in 510 of FIG. 5 has been previously associated with the sensor device identifier and this identification of the container type is retrieved using the sensor device identifier. In some embodiments, the sensor device identifier and the received content level identifier are provided to server 410 by interface device 406 and server 410 determines the corresponding fill amount/level. In some embodiments, the received content fill identifier identifies the associated container type of the sensor device that transmitted the received content fill identifier.

In some embodiments, a specific container type is associated with a specific table/database/data structure/formula that maps an identifier of the received content fill identifier to an amount/level of content included in a container of the associated container type. For example, the fill percentage and/or volume value that corresponds to the received content fill identifier is determined. In some embodiments, the received content fill identifier is modified before being utilized to obtain the amount/level value using the specific table/database/data structure/formula for the specific container type.

At 1206, an action associated with the content fill identifier is performed. For example, the determined fill value is stored. For example, server 410 of FIG. 4 tracks content remaining within each container being tracked using one or more sensor devices. In some embodiments, performing the action includes performing inventory management. For example, an inventory of a liquor beverage remaining in an opened bottle as well as new bottles stocked on hand are tracked to provide reporting of consumption amount, cost of goods sold, consumption pattern, inventory forecasting, etc. In some embodiments, the determined fill value is recorded. For example, the fill value is recorded in a data structure (e.g., database) that tracks current and historical fill levels of the container of the determined fill value. Recording the determined fill value may include tracking a history of a dispensed amount of content of the container (e.g., previous fill level minus current fill level) and recording each content dispense event with associated amount and time.

In some embodiments, performing the action includes providing an alert when it is detected that inventory of the content is low. For example, a mobile application alert on an interface device is provided when the amount/level of content reaches below a threshold value for a single container and/or an inventory across all inventory on hand of the content. In another example, the alert is provided on the sensor device (e.g., flashing light). In some embodiments, the alert is only provided if the amount/level of content reaches below a threshold value. The threshold value may be dynamically determined based on a historical depletion pattern of the content. In some embodiments, an interface device application and/or a webpage is utilized to display and manage inventory of content.

In some embodiments, a database tracks remaining content in each container measured by a sensor device, and for each tracked content stores one or more of the following: sensor device identifier, type of liquid, brand of product, UPC, bar code identifier, quantity remaining, quantity utilized over a time period (e.g., minute/day/week/month/year, etc.), new product container/bottle on hand, price, distributor, date and time of purchase, servings per use, time of servings consumed, location, expiration, chemical composition, odor, color, temperature, humidity, ingredients of the content, and various content composition information (e.g., sulfites, ethyl, etc.). This may result in tracking millions of sensor devices and provided measurement data at any given point in time. In some embodiments, once sufficient fill values are collected over time, performing the action includes determining a recommended time to reorder, a rate of consumption, an average amount consumed per pour/usage, etc. In some embodiments, a user is able to establish and specify one or more inventory thresholds based on product category, brand, type of beverage, cost, and/or recipes. For example, when the inventory of a product falls below a threshold, a notification may be provided in real-time. Consumption and/or inventory data may be tracked per each individual user/consumer, establishment, business, distributor, account, brand, and/or geographical region.

In some embodiments, performing the action includes determining whether the latest determined fill value is larger than a previously determined fill value detected using the same sensor device. For example, it is assumed that containers are not refilled with contents and when contents of a container has been entirely consumed, a user is to replace the empty container with a new full container of the same container type and transfer the sensor device from the empty container to the new full container. The use of a new product container is automatically determined and tracked by detecting whether the latest determined fill value is larger than a previously determined fill value. In some embodiments, if a user desires to utilize a different container type with a sensor device that has been already associated with an existing container type, the user is to reconfigure the sensor device for the new container type.

In some embodiments, performing the action includes obtaining Point of Sale data of items (e.g., mixed drinks, shots, glasses, etc.) sold and correlating the POS data with tracked content inventory depletion. This may offer a view into which types of beverages are in demand, how beverages are consumed, and pairing between different products (e.g., food pairing). Based on this information, a user entity profile may be developed to enable insights into past performance and future forecasting of the user entity's sales metrics. In some embodiments, by analyzing consumption patterns across user entities, geographical regional analysis may be performed to analyze product trends. This information may be utilized to provide recommendations on items to offer for sale based on seasonality, real-time consumption data, and trends for a particular geographical area as well as across a larger region.

The combination of the POS data and the types and quantities of beverages sold, a view into which types of beverages are in demand, how is it consumed, and paired with other products (e.g., food) offered can be analyzed and reported. Based on this information a "Profile" can be developed for a user which offers insights into how the user business is operating in terms of beverage consumption, ordering, and future demand. Based on the analysis of various beverage consumption patterns across the country, regional analysis of beverage consumption can be offered. Such data could then be offered to various establishments based on the geography to help them make informed choices on the beverages to be offered (e.g., which are in demand), which helps them maximize their revenue. In some embodiments, one or more the following functionalities are provided:

ability to track the beverage consumption by content, brand, and various categorization per period (e.g., minute/day/week/month).

ability to associate the sales of various types of beverages paired with the food by connecting to the POS in real-time.

ability to build a "Profile" of a bar by combining the consumption pattern with the POS data.

ability to aggregate beverage consumption patterns across various geographies.

ability to make recommendations about possible ways to maximize revenue by offering a certain type of beverage or recipe based on seasonality, consumption in real-time, and geographical trends.

In some embodiments, a recipe (e.g., mixed drink recipe) is recommended based on inventory availability of ingredients (e.g., determined amount/level of content), season, consumer profile, holidays, social recommendations, etc. For example, a recipe recommendation service detects the availability of ingredient beverages in real-time, analyzes applicable seasonal/time-based demand profiles of recipes, and suggestions from consumers to recommend the best possible drink recipes to offer. In some embodiments, based on current recipes offered by a user entity and/or new recipes to be offered by the user entity, inventory forecasting is adjusted to provide a recommendation of additional quantities of products/containers to order from one or more distributors. For example, when a new recipe is added, the missing ingredients and/or low inventory ingredients are automatically ordered from the most appropriate distributors (e.g., distributors/merchants selected based on price) in quantities that have been forecasted based on detected product content depletion patterns of the user entity as well as for other user entities (e.g., similar user entities that have already offered the new recipe).

In some embodiments, recommended drink recipes are based on various factors: availability of beverages, season, ethnicity, holidays, social recommendations etc. For example, the recipe recommendation service analyzes the availability of beverages in real-time, checks the seasons, considers suggestions from friends, and will recommend the bar the best possible drink recipes to offer. Alongside the recommendations, notifications for ordering the missing beverage/drink ingredients are also sent to the bar (e.g., so it's delivered on time for serving as specified by the user).

In some embodiments, a recipe for a prepared meal may be provided based on various factors such as: availability of food and beverages, season, age, dietary requirements, ethnicity, holidays, social recommendations etc. In some embodiments, a recipe recommendation service analyzes available quantity of food and beverages in real time, checks the seasons, considers suggestions from friends, etc. and will recommend to the user recommended recipes. Alongside the recipe recommendations, notifications for ordering missing food and beverages may be also sent to the user.

In some embodiments, performing the action includes assisting in ordering additional quantities of the content being tracked. For example, the consumption amount and pattern of the content and amount of full product containers on hand are analyzed to determine how many additional containers of the content should be ordered to replenish the stock inventory of the container. In some embodiments, the order for additional product containers may be automatically provided to a preferred or preset distributor/merchant/sales representative of the product container to automatically place an order for the content. For example, a user is provided an option to reorder a product from a distributor by allowing the user to automatically send inventory reports periodically to the distributor. In some embodiments, a notification to order additional quantities of a product/content is provided to a user and the user may provide an associated confirmation to automatically place an order for the recommended additional quantities of the product/content from a recommended/preset distributor. Order configuration such as distributor preference, payment information, preferred time of delivery, etc. may be stored and utilized when automatically placing an order. This may allow "one-tap" reorder, where once the reorder notification is tapped on a user interface, series of these services are initiated in the background and the desired product is delivered on time at the preferred location without any further reordering action from the user.

In some embodiments, a mobile application is utilized to provide queries for information related to the consumer. The application may then display the food availability, various notifications such as reordering, health improvements, recipe recommendations, and food persona (e.g., nutrient analytics) of the consumer. In various embodiments, the mobile application is utilized to provide one tap food reordering that helps users get the food delivered to their preferred location and preferred time without any further action. In some embodiments, the mobile application provides access to a delivery services marketplace that offers the user a choice to choose from a host of delivery services. When a user gets a notification to re-order a certain food item, the user may tap on the mobile device notification to confirm the re-order and the item would be automatically delivered to their preferred physical address from their preferred source without any further action or steps from the consumer. When the user downloads the mobile application or subscribes to the food analysis and tracking services, user preferences on delivery address, payments, and preferred time of delivery may be received and stored. Various delivery service options (e.g., Amazon Fresh, Google Shopping Express, Instacart, other food marketplaces, local farmers, etc.) may be aggregated. A consumer's preference for the delivery service may be stored alongside payment, delivery location, and delivery time preferences. In some embodiments, once the reorder notification is indicated, a one or more of services are initiated in the background and the food is delivered at the time and location as specified without any further action from the consumer.

In some embodiments, a product marketplace with various distributor/merchant options for products is accessible via a device (e.g., user device 412 and/or interface device 406 of FIG. 4). In some embodiments, a device/server is able to locate a distributor's delivery truck or service that is nearby and automatically order/request delivery of one or more products/containers that are preferred to be restocked immediately. For example, when it is detected that additional quantity of a product is required prior to a normal product ordering/delivery schedule, immediate delivery from a nearby source is automatically requested. A user may be provided a notification prior to ordering/delivery to obtain authorization from the user.

In some embodiments, an analysis system tracks food content stocked by a user. In some embodiments, a mobile application tracks the current location of the user using the GPS locations provided by a mobile device (e.g., smartphone, tablet, wearable computer, etc.). The information of whether a certain food item is running low or about to expire and the current location of a user device are utilized to offer recommendations to pick those food and beverages when the user location is nearby a merchant that carries the food and beverage. In some embodiments, the mobile application locates a user's presence in or near a store and detects that the user is running low on a specific food item and notifies the user to pick up the food item while at the store.

In some embodiments, performing the action includes providing a nutritional recommendation. For example, an analysis system offers nutritional facts and recommendations associated with each food item being tracked using a sensor device. This may be provided using a UPC and nutritional facts database or an existing database with similar information. Using such UPC and nutrition database, each consumer's food consumption pattern may be summarized by tracking various nutritional information over a specified time period (e.g., 500 grams of sugar per week, 300 grams of proteins per month, 20 grams of trans fat, etc.). Based on the quantitative profiling of food consumption, a "food persona" may be determined. This analysis may be provided to consumers to allow them to make informed choices around consuming certain foods and beverages. The analysis may be utilized to ascertain healthy nutrient levels and a user may be notified of over consumption or deficiency of a certain nutrient for optimal health.

Consumers may integrate and connect the aggregated data collected from wearable devices such as FitBit, Jawbone, etc. to the analysis system. Combined with the fitness data from various wearable devices, the analysis system may also suggest which nutrients/foods and beverages might be a cause for degradation or improvement of health. The analysis system may offer a mechanism for consumers to provide allergy and other ailment information. The analysis system may then check various food and beverages being ordered and consumed that could result in allergy and medical issues and warn the user of the possible harm or potential upside.

In some embodiments, a user's social graph is obtained from social networks such as Facebook (upon obtaining permission from the user) and associated with the food persona built by the analysis system. Based on food persona which offers insights into the consumer interests and consumption of various foods, the analysis system may utilize connected friends of the network to identify food consumption recommendations. Based on the food persona, the analysis system may mine for similar personas and recommend beneficial food and beverages, determine suggested inventory (e.g., shopping lists), suggest consumption patterns, and suggest recipes. By connecting users based on food persona, a graph of users based on food persona called "food graph" may be determined. Such a network of consumers based on food persona may form a community to allow discussion of various health benefits. Farmers, food brands, and chefs etc. may then recommend food and beverages that match certain food persona. Sensor devices can be used to track food consumption patterns and habits to compute nutritional intake per time period (e.g., minute/day/week/month). Using this information, a unique "food persona" can be developed for each user, identifying consumed food and their nutritional impact. The "food persona" of various users can be connected together to form a "food graph." Certain food and beverages, recipes, and nutritional education from brands, farmers, chefs, and educators can be recommended/provided based on the "food persona" of a user. Health data from various other fitness devices for a given consumer can also be aggregated and integrated (e.g., use fitness tracker data for analysis with the food intake data collected from the devices such as the fill level sensor devices and the receipt scanner to make recommendations on various types of nutrients and food intake). A user can provide information regarding allergies and special needs related to food and this information can be analyzed with the food intake data collected from the content fill sensor device and a receipt scanner and notify/warn users about possible issues with certain foods they have purchased, ordered, or may order.

Figure 13:
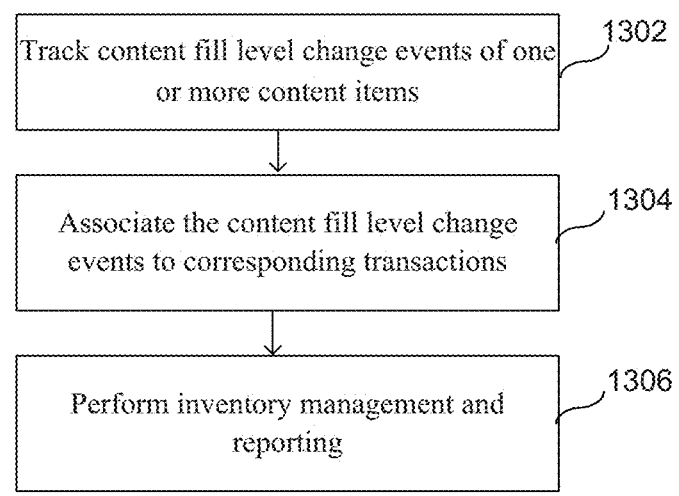
FIG. 13 is a flowchart illustrating an embodiment of a process for performing inventory management and reporting.

FIG. 13 is a flowchart illustrating an embodiment of a process for performing inventory management and reporting. The process of FIG. 13 may be at least in part implemented on interface device 406 and/or server 410 of FIG. 4.

At 1302, content fill level change events (e.g., content dispense events) of one or more content items are tracked. For example, when (e.g., time value) and amount of liquid poured for each pour event from a bottle is tracked. In some embodiments, using a content fill sensor device 100, 200, 300, 350, and/or 360 of FIGS. 1-3D, a measurement of current fill level is measured after each time content is dispensed from the container. For example, using at least portions of the processes of FIGS. 9-11, content fill levels of containers are tracked and using at least a portion of the process of FIG. 12, measurements of dispensed content for the one or more content items are recorded. By tracking the difference between the current fill levels, a history of amounts of contents dispensed from or added to containers each time content is dispensed/refilled is determined and recorded. Thus when, what, and how much content level is changed for each content item being tracked can be tracked and stored as a list of content fill level change event entries. The content fill level change event entries can be aggregated per each individual user/consumer, establishment, business, distributor, account, brand, and/or geographical region.

At 1304, the content fill level change events are associated to corresponding transactions. For example, point of sale (POS) transaction information is correlated with the content fill level change events. This may allow identification of any of the content fill level change events that are unable to be matched to a correlating POS transaction, allowing identification of any unauthorized content fill level change event. The correlation may be performed by identifying an item sold in a transaction, determining type and amount of component ingredient(s) of the sold item, and matching the component ingredient(s) to one or more corresponding entries in the content fill level change events based at least in part on matching associated time values.

At 1306, inventory management and reporting is performed. For example, bars and restaurants sell wine, beer, and craft cocktails. All drinks have recipes and especially craft cocktails have recipes where several brands of spirits and ingredients are used to make a specific drink. At the end of the business day one can use the data of all sales and compute the total quantity of what was poured out by the bottle, brand and aggregate. Typically there is no way to confirm if the aggregate amount of liquor dispensed matches the total amount sold. The total actual amount of product utilized/poured to make sold drink products could be different from theoretical amounts that were supposed to be utilized to make sold drink products due to various reasons. There could have been over pours or under pours compared to the recipe, actual drinks made might not have been recorded as a sale, and another brand of similar type of liquor could have been substituted for what was required by the recipe, etc.

Results of the correlation between the content fill level change events and the corresponding transactions, information, reports, and/or alerts on amounts of content dispensed and/or amounts of content over/under dispensed from the theoretical amount of content that should have been dispensed (e.g., over pour, under pour, etc.) aggregated per specific content item, transaction, product (e.g., drink product including many component ingredients), fill level change event, container, brand, type, category, entity location, geographical region, time period, employee (e.g., bartender), and/or content consumer are provided along with calculated performance scores or metric values. Thus not only does the inventory management system automatically track fill level of containers and amount of inventory of remaining full containers, each content fill level change event (e.g., indicating content, time of fill level change event and amount) is tracked along with statistics on fill change as compared to the amount of sold content. This may also allow a user to not only track sales popularity and patterns across various metrics (e.g., by item, transaction, fill level change event, product, container, brand, type, category, entity location, geographical region, time period, employee, content consumer, etc.) but also identify and investigate unexpected content losses (e.g., review a report of content fill level change events not attributed to a corresponding sale).

Figure 14A:
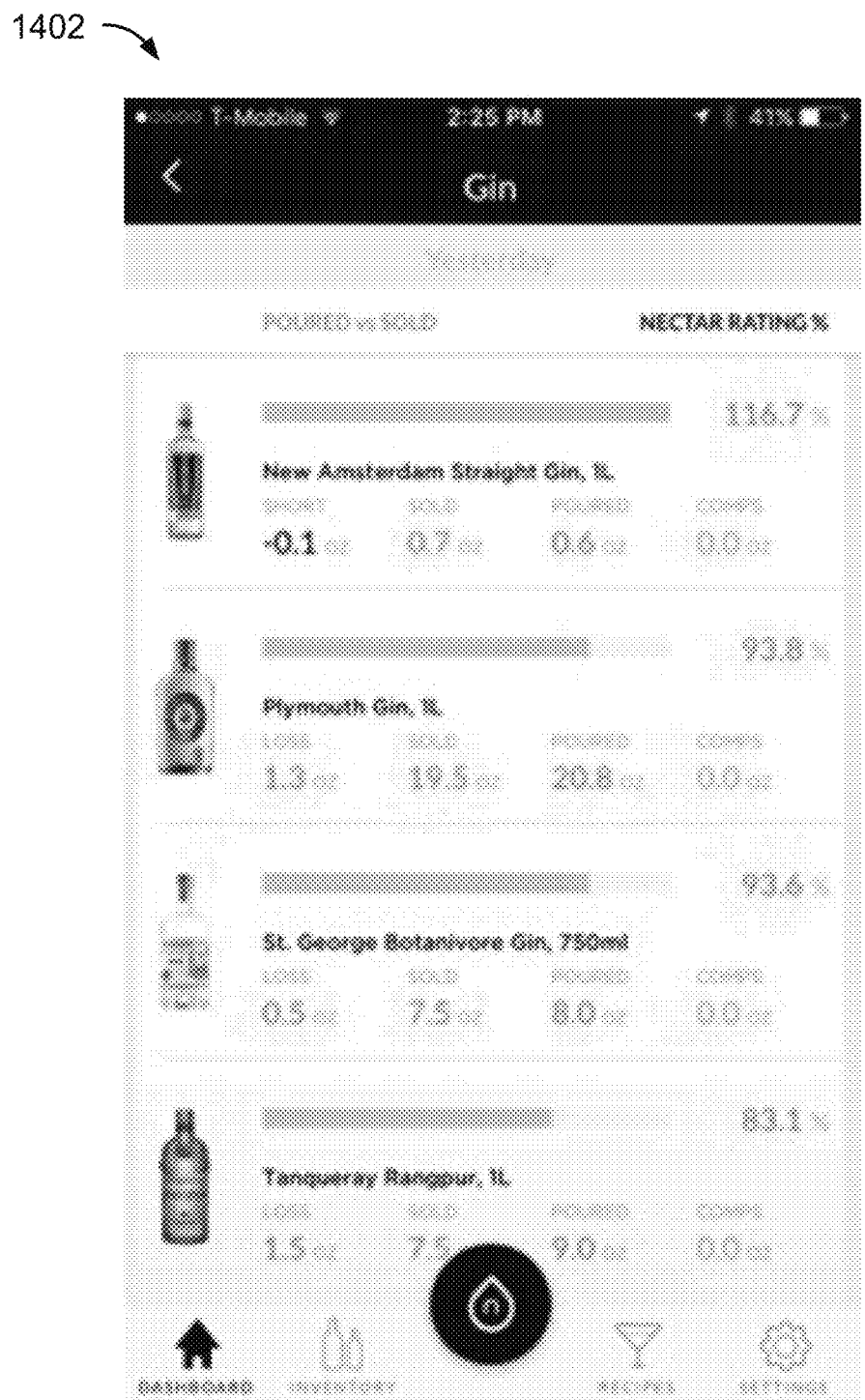
FIGS. 14A-14C are example user interfaces illustrating dispensed content reports.
Figure 14B:
Figure 14C:
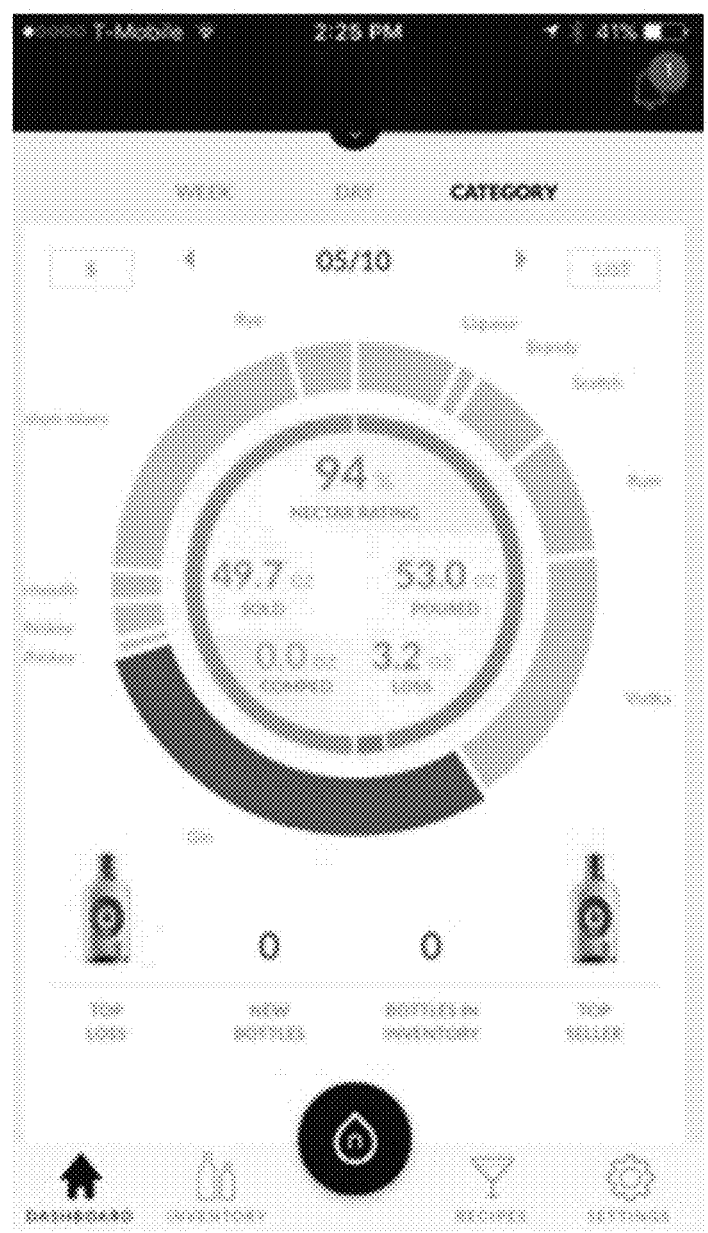

FIGS. 14A-14C are example user interfaces illustrating dispensed content reports. In some embodiments, the example user interfaces are provided in 1306 of FIG. 13. In some embodiments, the example user interfaces are provided using inventory, sales, and content dispense event data tracked by server 410 of FIG. 4.

Interface 1402 of FIG. 14A lists items of a specific category (e.g., gin). Each item lists for a specific time period (e.g., a day) an associated aggregated amount of content sold, an aggregated amount of content dispensed, a difference between the sold content vs. the dispensed content, and an associated aggregated amount of complimentary content provided for the specific item. Additionally, a performance metric (shown as Nectar Rating % calculated by dividing amount sold by amount dispensed) on dispensed vs. sold is also provided for each listed item.

Interface 1404 of FIG. 14B shows a circular graphic that displays and graphs an aggregated amount of content sold, an amount of content fill change, a difference between the sold content vs. the dispensed content, and an aggregated amount of complimentary content provided across all items on a specified day. A performance metric (shown as Nectar Rating % calculated by dividing amount sold by amount dispensed) on dispensed vs. sold is also provided for the specified day. Additionally, the item that exhibited top loss (e.g., lowest sold vs. dispensed ratio), the top selling item, the number of new bottles opened, and the number of remaining full bottles across all items are indicated.

Interface 1406 of FIG. 14C shows a circular graphic that displays and graphs an aggregated amount of content sold, an amount of content dispensed, a difference between the sold content vs. the dispensed content, and an aggregated amount of complimentary content provided for a specified item type (Gin) on a specified day. A performance metric (shown as Nectar Rating % calculated by dividing amount sold by amount dispensed) on dispensed vs. sold is also provided for the specified item type on the specified day. Additionally, the item that exhibited top loss (e.g., lowest sold vs. dispensed ratio), the top selling item, the number of new bottled opened, and the number of remaining full bottles for the specified item type are indicated.

Figure 15:
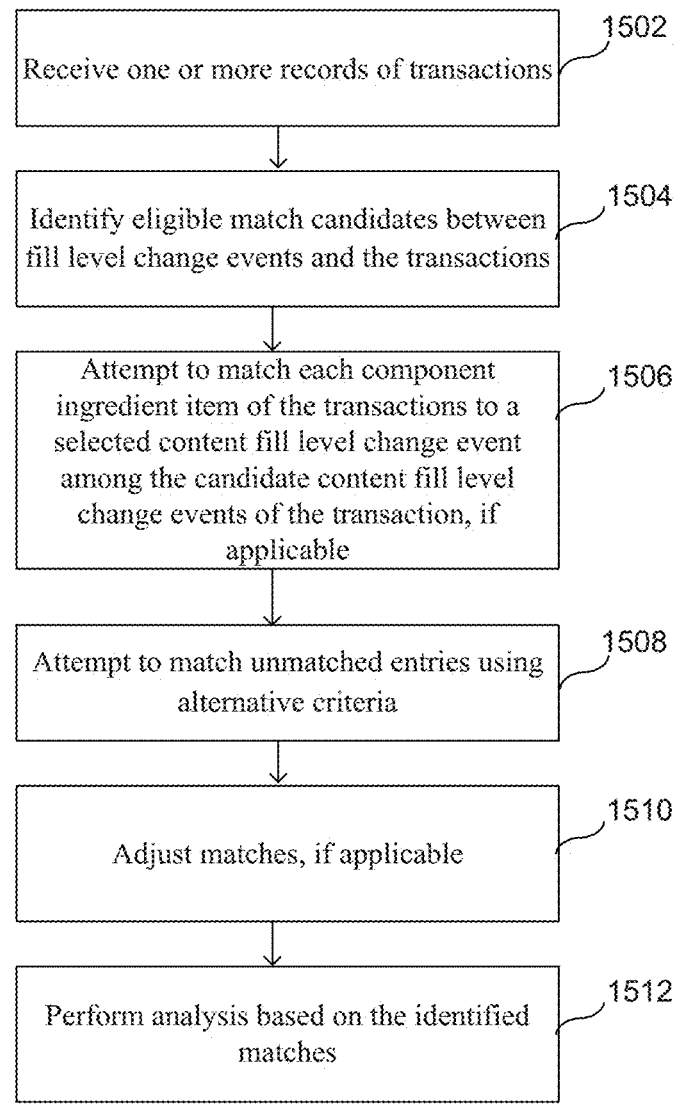
FIG. 15 is a flowchart illustrating an embodiment of a process for associating content fill level change events with corresponding transactions.

FIG. 15 is a flowchart illustrating an embodiment of a process for associating content fill level change events with corresponding transactions. The process of FIG. 15 may be at least in part implemented on interface device 406 and/or server 410 of FIG. 4. In some embodiments, at least a portion of the process of FIG. 15 is performed in 1304 of FIG. 13.

At 1502, one or more records of transactions are received. Examples of the transactions include a product sale or a food/drink/product consumption or preparation. In some embodiments, the record of sales transactions of a bar or restaurant is received from a POS system or other sales data system. In some embodiments, the record of transactions is received from a user. For example, using an application of a mobile device, a user inputs a prepared food consumed by the user. Each record of transaction may identify one or more of the following: a product (e.g., identifier of a drink sold), a product type (e.g., mixed drink), a quantity of the product (e.g., drink size and number of drinks), a time of the transaction (e.g., date and time of sale), a location (e.g., location of sale), a price (e.g., price charged, tip amount, etc.), a seller (e.g., identifier of bartender, cashier, etc.), and other information associated with the transaction. In some embodiments, records of transactions are accumulated over a period of time and periodically received together for analysis (e.g., records for an entire day are received together after close of business each day). In some embodiments, one or more records of transactions are received dynamically as each transaction or a group of transactions is completed.

At 1504, eligible match candidates between fill level change events and the transactions are identified. For example, for each of the transactions, one or more candidate content fill level change events, if any, corresponding to the transaction are identified. The candidate content fill level change events are identified based on content fill measurements determined using the content fill sensor devices (e.g., content fill sensor device 100, 200, 300, 350 and/or 360 of FIGS. 1-3D). For example, a content fill sensor device provides a content fill identifier indicating a current amount/level of content detected within a container (e.g., provided periodically and/or dynamically when triggered by an accelerometer or other sensor) and a history of the content fill identifiers are stored and tracked. Each fill identifier is associated with a time value associated with the fill level measurement of the fill identifier (e.g., time stamp of when the associated measurement was performed/determined/triggered, time stamp of when the content fill indicator was received, etc.). Given a history of content fill levels, content fill level change events may be determined by calculating for each content fill level a difference from a previous content fill level. If the difference between a new fill level measurement and a previous fill level measurement is greater than a threshold value, the difference is identified as the amount of content fill change of a new content fill level change event and associated with the time value of the new fill level measurement. In another example, for each of the content fill level change events, one or more candidate transactions, if any, corresponding to the content fill level change event are identified.

Because each transaction is associated with a transaction time value (e.g., indicating time of sale), an assumption is made that any associated content fill change (e.g., dispensing of content to make the product of the transaction) occurs around the time of the transaction. Thus for each transaction, one or more candidate content fill level change events, if any, corresponding to the transaction can be identified by identifying any content fill level change event with an associated time value that is within a threshold time range of the transaction time value. An example of the threshold time range is 25 minutes, but other threshold time range values may be utilized in other embodiments. In another example, for each candidate content fill level change event, one or more candidate transactions, if any, corresponding to the candidate content fill level change event can be identified by identifying any transaction with an associated time value that is within a threshold time range of the candidate content fill level change event time value.

At 1506, each component ingredient item of the transactions is attempted to be matched to a selected content fill level change event among the candidate content fill level change events of the transaction, if applicable.

Each product/item of the transaction is made using one or more component ingredient items and these component items are identified using stored information about the product/item. For example, a drink product is made using specified component ingredient items that are individually tracked using separate content fill sensor devices. When a transaction identifies the drink product, any tracked component ingredient items specified to make the drink product are identified along with the associated quantities using a database that tracks component ingredient items of products. By identifying the component ingredients and their respective specified quantities, fill level change events can be matched to each of the specified quantities.

In some embodiments, among the candidate content fill level change events identified for a transaction in 1504, the content fill level change events are sorted/ranked first according to amount of the content fill change (e.g., from largest pour size to smallest pour size), then by time difference from the transaction time (e.g., for content fill changes of equal size, sort according to closest time to furthest time away from the transaction time).

When performing the matching, the specified component ingredient item of a product of a transaction is attempted to be matched to a candidate content fill level change event that is for the same item. For example, the candidate content fill level change events for a transaction are filtered to identify only the candidate content fill level change events that are for the same corresponding item as the component ingredient item of the product of the transaction to be matched. Thus, in some embodiments, for each specified/required component ingredient item of the transactions, corresponding eligible candidate content fill level change event(s), if any, that match the component ingredient item and are within the threshold time range are identified, and one of the corresponding eligible candidate content fill level change events is matched to the specified component ingredient item based on a comparison of the associated quantities, time difference, and/or item match/type. In another embodiment, for each content change event, corresponding eligible required/specified component ingredient item(s) of the transactions, if any, that match the content item of the change event and are within the threshold time range are identified, and one of the corresponding specified/required component ingredient items of a transaction is matched to the content change event based on a comparison of the associated quantities, time difference, and/or item match/type.

When a match is made between a specified/required component ingredient item of a transaction and a fill level change event, the component ingredient item of the transaction and the fill level change event are marked to prevent the fill level change event or the specified/required component ingredient item of the transaction from being matched again to a different match. Then the match process is repeated for each content change event or specified/required component ingredient item of the transactions until no more matches can be made. The order in which the content change events or specified/required component ingredient items of the transactions are traversed to make the match may be based on a number or eligible matches for the content change event or the specified/required component ingredient of a transaction. For example, matches are made in order of smallest number of eligible matches to largest eligible matches (e.g., the content change event or specified/required component ingredient item of a transaction with the smallest number of eligible matches is matched first). Among equal number of matches, the content change event or specified/ required component ingredient item associated with the larger quantity is matched prior to matching ones associated with a smaller quantity.

At 1508, unmatched entries are attempted to be matched using alternative criteria. In some embodiments, matching using the alternative criteria includes attempting to match not only by a specific item, but by a category of the item. For example, a bartender may have substituted an originally specified component ingredient item with a substitute ingredient item that belongs to the same item category as the originally specified ingredient item (e.g., substitute one brand of gin with another brand of gin). In some situations, the originally specified ingredient item of a transaction may have been identified by an item category rather by a specific item (e.g., recipe for a drink requires any brand belonging to the gin category). To detect such substitutions, for any fill level change event or specified/required component ingredient item of a transaction that has not yet been matched, its corresponding eligible match is expanded to include any corresponding specified/required component ingredient item of a transaction or fill level change event for not only the specific matching item but all items belonging to the same item category (but also still within a threshold time range of each other). In some embodiments, matching using the alternative criteria includes increasing the threshold time range to increase the number of eligible matches. Once the number of eligible matches is increased, matches can be assigned in a specified order (e.g., as previously described in 1506) until no other matches can be assigned.

At 1510, match(es) are adjusted, if applicable. In some embodiments, a single fill level change event may be associated with multiple specified/required component ingredient item instances of one or more transactions (e.g., single pour across multiple glasses, missed fill level measurement, measurement error, etc.) and the single fill level change event is split among multiple specified/required component ingredient item instances of one or more transactions. For example, when the quantity of a fill level change event is detected to be larger than the amount of the matched specified/required component ingredient item of a transaction by a threshold percentage amount, any other unmatched specified/required component ingredient item instance (of the same specific item or item type) of transactions within the threshold time of the time of the fill level change event are matched to the same fill level change event. However, amount quantity of the fill level change event attributable to each of the different matched component ingredient item instances is based on a relative ratio of the specified/required quantities to each other (e.g., total amount of the fill level change event split based on relative sizes of the specified/ required quantities of the matched instances). In another example, when a fill level event is identified as being "weak" due to an associated sensor measurement that received a "weak" reflected signal or a missed signal is detected, the quantity of a following fill level event is split among matches of one or more previous fill level events based on relative ratios of specified/required quantities of matched component ingredient item instances.

In some embodiments, multiple fill level change events may be associated with the same specified/required component ingredient item instances of a transaction (e.g., bottle ran out before completing pour, sensor error, etc.) and the multiple fill level change events are combined and assigned to a same specified/required component ingredient item instance. For example, when a bottle switch is detected and/or an unmatched fill level change event for the same item occurs around a time value associated with a match identified as being associated with a quantity difference greater than a threshold value, the unmatched fill level change event is also matched and assigned to the same specified/required component ingredient item instance. In another example, a quantity of content item remaining in a container is added to the quantity associated with a fill content level change event occurring before or after the bottle change (e.g., depending which event occurred closer to the bottle switch).

In some embodiments, a fill level change event may indicate an increase in fill level of a content item of a container (e.g., recalibration measurement performed without accelerometer trigger). This may be due to a previous fill level measurement that made an "overshot" error in measurement but later the sensor recovered from the error and indicated an increase in fill level due to the correction. The amount of this correction is to be distributed across one or more previous fill level change events. For example, rather than matching the increasing fill level change event to a transaction, the amount of the fill level change is distributed among previous fill level change event(s) to decrease their associated quantities. These previous fill level change event(s) may be identified by identifying any previous fill level change event (e.g., within a threshold time range) that has been matched to a component ingredient item instance of a lower specified/required amount than the amount of the level change event. The total amount of decrease of the increased fill level change event is distributed among these identified previous fill level change event(s) based on the relative ratios of specified/required quantities of corresponding matched component ingredient item instances.

At 1512, analysis is performed based on the identified matches. For example, one or more reports, indications, and/or other analyses may be provided using the result of the matches (e.g., used to provide information shown in FIGS. 14A-14C). In some embodiments, any unmatched fill level change event and/or unmatched specified/required component ingredient item instances are indicated. This may allow a user to investigate the cause of the unmatched fill level change event. The identified matches are utilized in performing the inventory management and reporting of 1306 of FIG. 13. For example, ratios between theoretical required content quantity vs actual content dispensed are determined for various metrics. In various embodiments, events such as a no pour event (e.g., transaction is not matched to fill level change event), an over pour event (e.g., amount dispensed is greater than ideal amount from recipe), an under pour event (e.g., amount dispensed is less than ideal amount from recipe), an off-hour pour event (e.g., content dispensed outside business hours), an unmatched pour event (e.g., content dispensed without corresponding recorded transaction), etc. are detected. In some embodiments, an average ring time (e.g., average time between transaction inputs and start or end of corresponding matched fill level change event(s)) is calculated for one or more users and/or establishments (e.g., average ring time value calculated for each bar tender and/or store). For example, an average of times between transaction timestamps and content dispense timestamps of a plurality of correlated transactions matched to corresponding content dispense events is calculated. An establishment may want to encourage users (e.g., bar tenders) to input transactions to a POS system as soon as possible before or after making corresponding drink products, and for all identified matches, amounts of time between transaction times and corresponding matched fill level change event times are averaged for transactions of each user (e.g., average ring time value for each bar tender) and/or across all users of an establishment (e.g., average ring time value across all users of an establishment location and/or business entity).

Figure 16A:
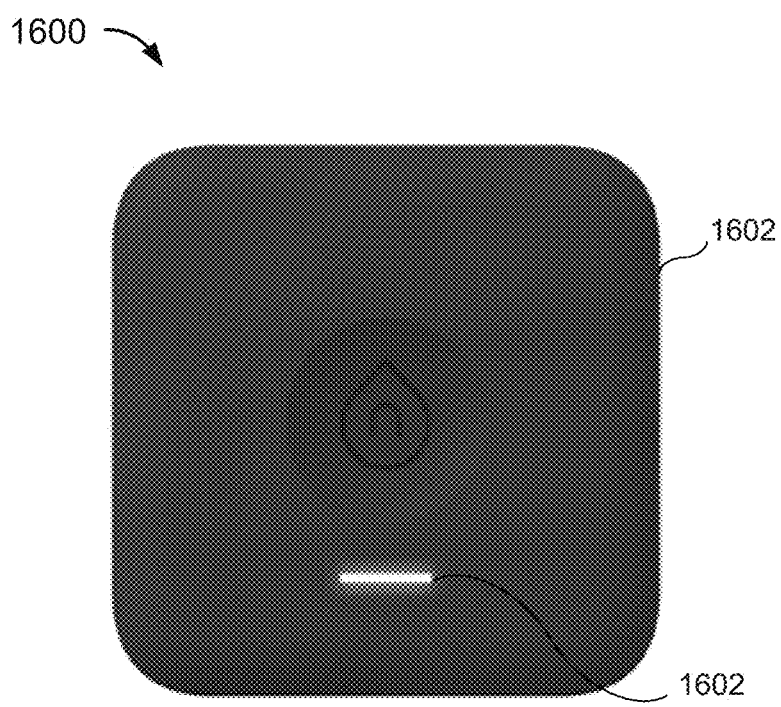
FIG. 16A is a diagram illustrating an embodiment of a front view of a base station.
Figure 16B:
FIG. 16B is a diagram illustrating an embodiment of a side view of a base station.
Figure 16C:
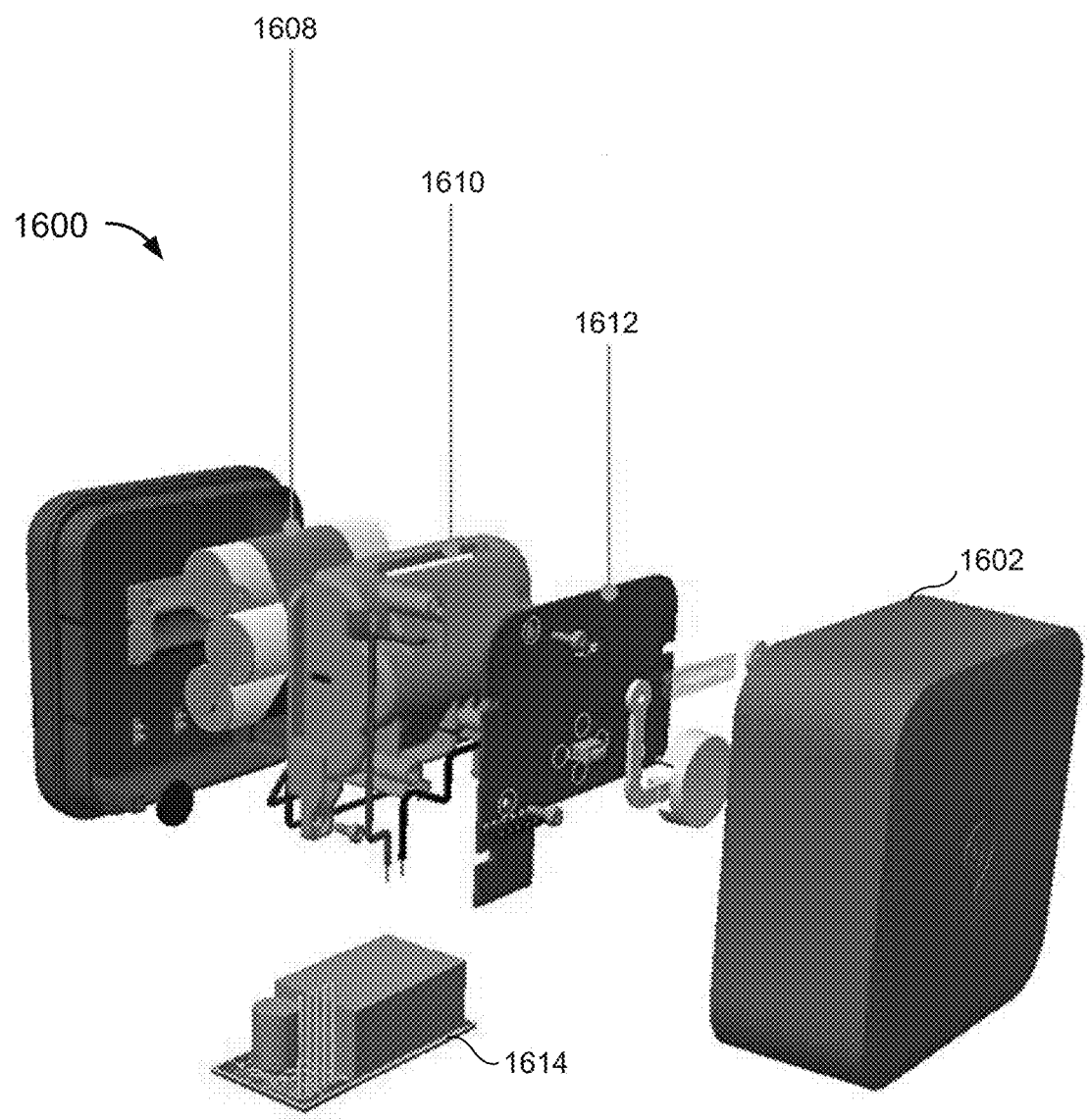
FIG. 16C is a diagram illustrating an embodiment of internal components of a base station.

FIG. 16A is a diagram illustrating an embodiment of a front view of base station 1600. FIG. 16B is a diagram illustrating an embodiment of a side view of base station 1600. FIG. 16C is a diagram illustrating an embodiment of internal components of base station 1600. In some embodiments, base station 1600 is included in interface device 406 of FIG. 4. For example, base station 1600 wirelessly receives content level measurement data from sensor devices (e.g., sensor device 100, 200, 300, 350, 360, 402 and/or 404 of FIGS. 1-4) and sends the measurement data to a backend server (e.g., server 410 of FIG. 4). For example, base station 1600 wirelessly receives content level measurement data from the sensor devices via a BLUETOOTH Low Energy wireless transmission and send the measurement data to a server via a wireless WiFi connection to the Internet.

As shown in FIGS. 16A-16C, base station 1600 includes housing 1602 with status indicator light 1604. Socket prongs 1606 plug directly into an electrical wall socket to obtain power as well as physically support the device on a wall. Housing 1602 houses batteries 1608, battery housing 1610, circuit board 1612 and power module 1614. Batteries 1608 provides backup power in the event power from the wall socket becomes unavailable. In some embodiments, while operating on backup power from batteries 1608, received data from sensor devices is stored in a storage of base station 1600 for transmission to a server later when power from a wall socket is restored. While plugged into the wall socket, batteries 1608 are charged. Power module 1614 conditions and transforms power received from the wall socket for use by base station 1600. Circuit board 1612 includes wireless communication (e.g., BLUETOOTH and Wi-Fi communication), processing (e.g., processor) and storage (e.g., solid state memory) components as well as other electrical components.

An example deployment environment (e.g., restaurant, bar, home, etc.) may contain anywhere from few bottles to hundreds of bottles to tracked for content level. Some might have up to 500 bottles in one environment. Sensor devices (e.g., sensor device 100, 200, 300, 350, 360, 402 and/or 404 of FIGS. 1-4) may measure the remaining volume of liquid in the bottle and transmit them to a server in the network cloud. In some embodiments, the sensor devices transmit the data using BLUETOOTH Low Energy (i.e., BLE) protocol that minimizes energy use of the sensor devices operating on battery power. In order to send data included in the BLE packets to the cloud, base station 1600 obtains the BLE packets, extracts the measurement data included in the packets and sends the measurement data to the server.

However, there are limitations of using BLE. When communicating using two-way communication mode of BLE called the GATT mode, the protocol limits number of concurrent connections a device can manage. It is usually no more than 20 concurrent connections at a time. In some embodiments, the sensor devices could be made to communicate one way using another BLE communication mode called the Advertising mode. However, the receiving device with BLE listening capabilities typically cannot handle more than a dozen of broadcasting devices sending packets concurrently, as typically the operating system of the receiving device suspends BLE transmission listening in order to handle other jobs. This could result in loosing several BLE transmissions from the broadcasting devices. Even if the operating system would be modified to listen solely to the BLE transmissions, the packets would be lost due to collision of packets or lost without an ability to store and process them.

In some embodiments, the base station (e.g., interface device 406 of FIG. 4) may listen to over 300 sensor devices (e.g., sensor device 100, 200, 300, 350, 360, 402 and/or 404 of FIGS. 1-4) communicating simultaneously with a 99.99% success rate. The base station includes ability to communicate in both Wi-Fi 802.11 and BLE communication protocols simultaneously.

In some embodiments, potential consumers in a deployment environment (e.g., customers who come in to order at the bar) are offered coupons or promotional offers by a certain product brand via a mobile application or by recognizing the profile of the user though their social network, phone number, unique MAC address of the phone or other personal devices. For example, presence of the potential consumers may be detected by detection of user mobile devices of the consumers by the base station (e.g., detect Wi-Fi and/or BLUETOOTH communication identifiers of the user devices). Based on consumers preferences collected over the Web/Internet, previous purchasing habits, social recommendations, etc., the potential consumers can be offered targeted promotions. Near Field Communication or BLE could be used to recognize each potential consumer though the detection of devices of potential consumer via the base station located at the deployment environment.

In an example, purchasing of a drink associated with a promotion may be detected via data from a Point of Sales System. In some embodiments, specific ingredient products and their quantity utilized to make the purchased drink may be detected via the sensor devices described herein. For example, besides knowing that a certain drink was purchased, using the sensor device, ingredient measurements of the purchased drink can be associated with the specific brand of the bottle was used to make the drink. This can be used to measure the effectiveness of a promotion by measuring if the drink was really made with the brand for which the promotion was offered. This information is carried through the base station in real-time to the service/server. The base station may also serve as a way to communicate back with the personal device of the user to directly offer further promotions on detection of consumption/usage via the sensor devices. For example, the user device directly connects to the base station via a Wi-Fi or BLUETOOTH connection.

In some embodiments, the base station includes a display that indicates which drink was served last, or which sensor device cap should be put on which bottle/container, or even act as the front end system providing the same details of the bar as smart phone app or web app. For example, the base station is utilized to pair a sensor device with a specific container/bottle. In some embodiments, the base station provides wireless Internet connectivity (e.g., acting as wireless router) to clients desiring wireless online services. In a deployment environment where other sensor devices are used to track pantry items and other household consumables, the base station may act as a hub for various other activities. The base station in these cases could include a display and have other functions such as a receipt scanning, UPC scanning, recognizing voice commands, etc.

Figure 17:
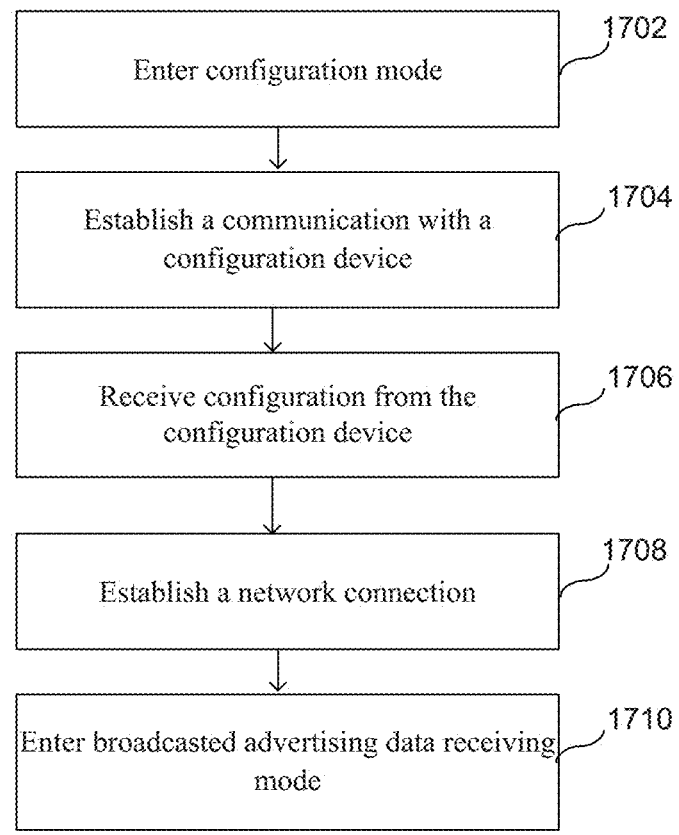
FIG. 17 is a flowchart illustrating an embodiment of a process for configuring a base station.

FIG. 17 is a flowchart illustrating an embodiment of a process for configuring a base station. The process of FIG. 17 may be at least in part implement on interface device 406 of FIG. 4 and/or base station 1600 of FIGS. 16A-16C.

At 1702, configuration mode is entered. For example, when the base station device (e.g., base station 1600 of FIG. 16A-16C) is plugged into a power socket by a user, the base station automatically enters the configuration mode to initiate configuration of the device.

At 1704, a communication is established with a configuration device. For example, the base station enters a BLUETOOTH two-way communication Generic Attributes (i.e., GATT) mode with a configuration device (e.g., user device 412 of FIG. 4). This communication may have been initiated by the configuration device when the configuration device initiated a BLUETOOTH personal area network connection with the base station device.

At 1706, configuration is received from the configuration device. For example, the configuration data specifies network settings (e.g., Wi-Fi router SSID and password, Cellular network configuration, etc.) and user account identifier (e.g., user account of inventory management service provided using a cloud network server). A user may have specified the settings of the configuration using a mobile application running on the configuration device.

At 1708, a network connection is established. For example, a Wi-Fi connection is established with a wireless network router using credentials provided via the received configuration to connect the base station to the Internet. Using the established network connection, the base station is associated with a user account. For example, the base station device communicates with a backend server via the network connection and provides user account information received in the configuration and an identifier of the base station. This pairs the base station with the user account. The server may also provide additional configuration data to the base station. For example, current time information (e.g., UTC time) is received. Configuration data associated with sensor devices associated with the user account may also be received from the server. For example, at least a portion of sensor device configurations utilized in 514 of FIG. 5 and/or 806 of FIG. 8 are received from the server. In some embodiments, the base station receives a token to be used to securely communication establish communication with a sensor device. In some embodiments, the base station receives test data from sensor devices (e.g., used during manufacturing process to verify that sensor devices passes self-performed validation tests).

At 1710, broadcasted advertising data receiving mode is entered. For example, the two-way communication GATT mode is exited and the base station enters advertising packet listening mode. Sensor devices are to send fill level measurement data in a one-way communication mode using BLE advertising packets. The base station in the broadcasted advertising data receiving mode listens for these advertising packets from the sensor devices. Once an advertising packet is detected and received, the payload data (e.g., including fill level measurement data) in the advertising packet is extracted and at least in part sent to a server via the established network connection. In some embodiments, the advertising packet is based at least in part on the iBeacon protocol of Apple Inc. For example, the advertising packet of the iBeacon protocol has been modified to include payload data (e.g., including fill level measurement).

In some embodiments, sensor devices send the measurement data in advertising mode, a one-way broadcast communication mode that does not guarantee sent data receipt by a recipient. As several hundred sensor device could potentially transmit at the same time, several advertising packets could collide. In some embodiments in order to overcome the collisions, each sensor device broadcasts the same measurement data multiple times. The number of times the broadcast is repeated varies based at least in part a chance of collision with another broadcast of another sensor device in the same deployment environment. For example, Chance of Collision=$e^{-2G}$, where G is the mean transmission attempt per time frame. In some embodiments, the same packet data is repeatedly broadcasted for a certain predetermined duration of time based at least in part the Chance of Collision=$e^{-2G}$, where G is the mean transmission attempt per time frame.

In some embodiments, the advertising interval for theoretical max chance/second may be determined based at least in part on the following relationship: Advertising Interval=2*N*advertising time, where N is number of sensor devices and advertising time is amount of time required to send an advertising packet. For example, the number of times the broadcast of the same current fill level measurement is based at least in part on the total number of sensor devices deployed in a deployment environment of the base station (e.g., total number of sensor devices associated with a user account and identified to operate simultaneously in the same environment). This allows the number of repeated broadcasts to dynamically adjust, as increase in the number of sensor devices increases the number of repeated transmissions, while a decrease in the number of sensor devices decreases the number of repeated transmissions. In some embodiments, in order for a sensor device to determine/calculate the repetition number and/or advertising interval, the total number of sensor devices is specified to the sensor device via a wireless communication (e.g., via a two-way GATT Bluetooth connection with the base station and/or user device). In some embodiments, rather than using a dynamically specified total number of sensor devices, a theoretical maximum or a constant value is utilized.

Figure 18:
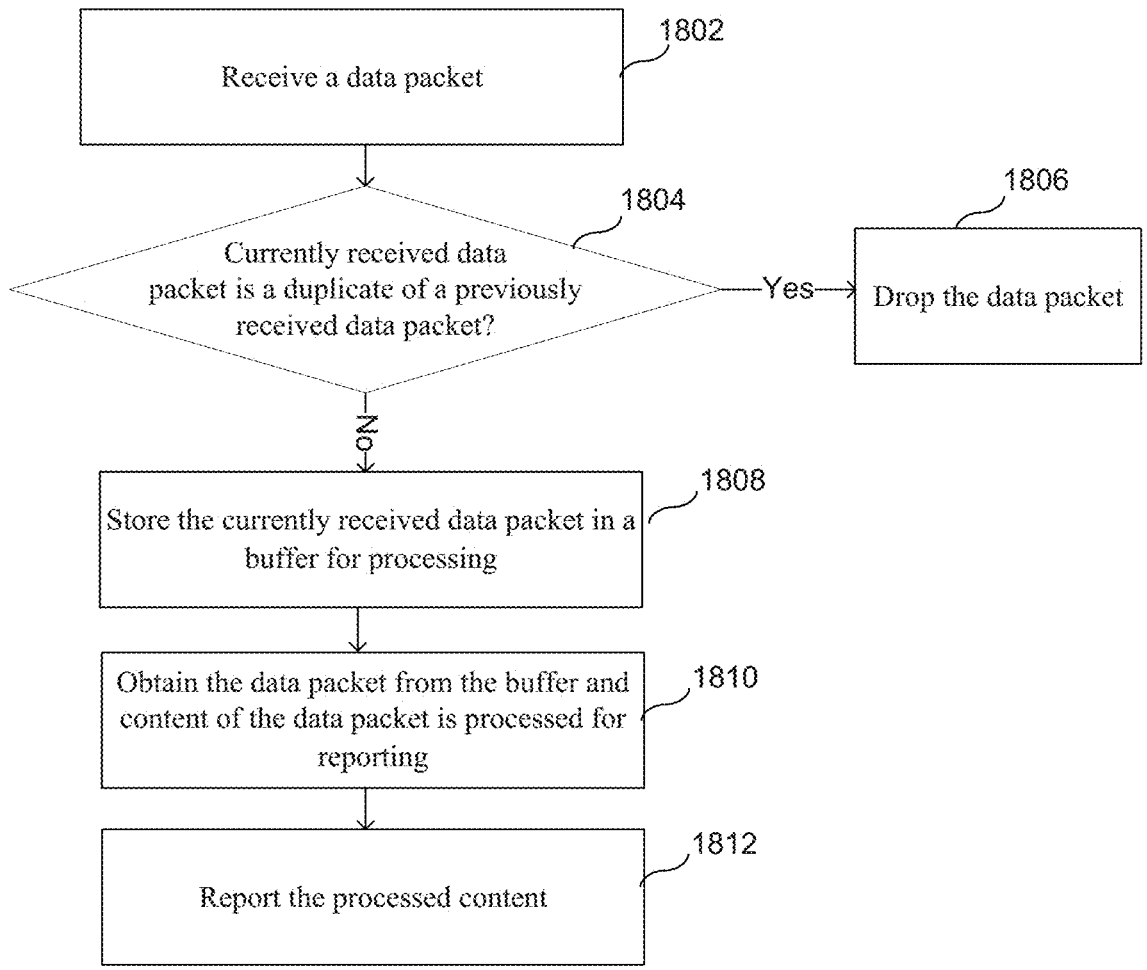
FIG. 18 is a flowchart illustrating an embodiment of a process for processing data packets at a base station.

FIG. 18 is a flowchart illustrating an embodiment of a process for processing data packets at a base station. The process of FIG. 18 may be at least in part implemented on interface device 406 of FIG. 4 and/or base station 1600 of FIGS. 16A-16C. In some embodiments, at least a portion of the process of FIG. 18 is performed in 1710 of FIG. 17. The process of FIG. 18 may be repeated for each received data packet.

At 1802, a data packet is received. In some embodiments, the data packet is an advertising packet of a personal area network protocol that includes an identifier of a sensor device and a sensor measurement data. For example, a sensor device (e.g., sensor device 100, 200, 300, 350, 360, 402 and/or 404 of FIGS. 1-4) broadcasts a one-way BLE communication advertising packet that has been configured to encode sensor measurement data in a payload portion of the packet. In some embodiments, the received data packet is one of a plurality of repeated broadcasts of the same payload data content by a sensor device. The number of times the broadcast is repeated may vary based at least in part a chance of collision with another broadcast from another sensor device in the same environment. For example, the number of times the broadcast of the same sensor data and/or same data packet of a particular sensor device is repeated is based at least in part on the total number of sensor devices deployed in a deployment environment of the base station (e.g., total number of sensor devices associated with a user account and/or identified to operate simultaneously in the same environment).

In some embodiments, the received data packet includes one or more of the following data components: a device identifier, a current measurement, a previous measurement (e.g., can be used in case previous packet was never received), a measurement status, a battery status, a temperature, a time value associated with the current measurement, a time value associated with the previous measurement, a measurement counter/iteration value(s), a packet number, etc. An example of the device identifier is a universally unique identifier (UUID) that uniquely identifies a particular sensor device (e.g., 6 byte value). An example of the current measurement is a current measure of fill level in 1014 of FIG. 10 and/or 1126 of FIG. 11 (e.g., 12 bit depth value). An example of the previous measurement is an immediately previous measure of fill level in a previous iteration of 1014 of FIG. 10 and/or 1126 of FIG. 11 (e.g., 12 bit depth value). An example of the battery status is a battery voltage value (e.g., 2 byte value). An example of the time value associated with the current measurement is a value associated with when the current measurement was performed. An example of the time value associated with the previous measurement is a value associated with when the previous measurement was performed. An example of the time value associated with the previous measurement is a value associated with when the previous measurement was performed. An example of the included measurement counter/iteration value is an ordering identifier that identifies a relative ordering in the current measurement in a series of measurements (e.g., can be used instead of the time value to identify ordering). An example of the packet number is a counter number and/or time value that identifies a relative ordering in of the packet in a series of packets sent by the sensor device (e.g., packet number is same for repeated broadcasts of the same packet/measurement data and the packet number is incremented when a new measurement data in a new packet is broadcasted).

The measurement status that may be included in the packet identifies a status associated with the current measurement. For example, the measurement status is an 8 bit value, where:

Bit 0:1—Measurement Type

| Bit 1 | Bit 0 | Measurement Type | Details |
|---|---|---|---|
| 0 | 0 | First | Identifies that the current measurement occurs immediately after the sensor device has been paired with an user application. |
| 0 | 1 | Accelerometer | Identifies that the current measurement was triggered by the accelerometer interrupt |
| 1 | 0 | Periodic | Identifies that the current measurement was triggered by a timer which interrupts every 1 hour, 45 minutes |
| 1 | 1 | Diagnostic | Utilized for debug purpose. |

Bit 2—Retry Limit Reached
If set, current measurement has been repeated the maximum number of times to detect a valid depth.
Bit 3—Not Latched
If set, a valid depth measurement was not detected. The previous depth is broadcasted.
Bit 4—Not Settled
If set, the back-to-back measurements were not within threshold (e.g., +/−3 mm) of each other.
Bit 5—All Zeros
If set, the microphone did not detect any reflections from the interrogation signal. This is also set when the sensor device is placed on the table at an angle but is stable, in this case it is used to report the cap-off condition.
Bit 6—Reset
If set, the current measurement has been performed immediately after a sensor device reset.

Bit 7—New Bottle

If set, latching algorithm detected the previous depth was within a threshold (e.g., +/−25 mm) of the container height, and the current measurement is within a threshold (e.g., 125 mm) from the top of the bottle.

At 1804, it is determined whether the currently received data packet is a duplicate of a previously received data packet. Because a sensor device broadcasts the same measurement data multiple times, the base station might receive multiple same packets for the same measurement from the same sensor device. In some embodiments, it is determined whether the currently received data packet is a duplicate of a previously received data packet by comparing a device identifier and a time value or a counter/iteration value included in the currently received data packet with corresponding identifiers of a previously received data packet. For example, if a set of values uniquely identifying the instance of measurement data in the currently received data packet matches a corresponding set of values in a previously received data packet, it is determined that the currently received data packet is a duplicate of the previously received data packet.

If at 1804, it is determined that the currently received data packet is a duplicate of a previously received data packet, at 1806 the data packet is dropped.

If at 1804, it is determined that the currently received data packet is not a duplicate of a previously received data packet, at 1808 the currently received data packet is stored in a buffer for processing. For example, the data packet is stored in a first-in-first-out buffer queue. In alternative embodiment, all received data packets are stored in the buffer and duplicate packets are detected and dropped as each packet is obtained from the buffer storage for further processing.

At 1810, the data packet is obtained from the buffer and at least a portion of content of the data packet is processed for reporting. In some embodiments, when there are packets stored in the buffer, a micro controller that's handling packets wakes up another micro controller that handles wireless communication. This allows packets in the buffer to be processed one at a time dynamically from the buffer as received packets are placed in the buffer and removed one by one from the buffer for processing. By being dormant unless there is a packet to process, the wireless micro controller is able to conserve power. Processing the content of the data packet for reporting may include extracting measurement data in the payload of the data packet and associated identifiers and other data and formatting/processing/packaging the extracted data for network transmission to a server.

At 1812, the processed content of the data packet is reported. For example, measurement data is reported to server 410 of FIG. 4. In some embodiments, content of the data packet is posted to a service API through a RESTful protocol. Before reporting the content, it is determined whether a network connection is active. For example, the wireless micro controller, when woken up, checks to ensure that there is an active Wi-Fi connection to a desired server. If there is no connection, it tries to establish the connection using cached credentials. If it fails to connect it continually attempts to connect until a connection is established. In case a wireless connection could not be established while being woken up to process packets, the wireless controller, besides trying to connect, may continue to process the data packets. Due to the lack of connection, instead of transmitting the packets, wireless controller stores the processed data of the packets in a data storage such as EEPROM. In some embodiments, the data storage is designed to hold packets up to a week during regular operation of an establishment (e.g., assuming the deployment environment has up to 500 sensor devices).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface configured to establish a network connection with a server and a plurality of remote devices; and
a processor coupled with the communication interface, wherein the processor causes the system to:
receive a broadcasted advertising packet from each of the plurality of remote devices that each monitor content volume of a container, wherein the received advertising packet comprises:
a unique identifier of each remote device of the plurality of remote devices;
a time value or an iteration number; and
measurement data related to volume of content in the container associated with each remote device, wherein each remote device of the plurality of remote devices repeatedly broadcasts the advertising packet to the system;
determine if the received advertising packet is a duplicate of a previously received data packet by comparing the unique identifier of the remote device and the time value or the iteration number of the broadcasted advertising packet with the unique identifier of the remote device and a previous time value or a previous iteration number of the previously received advertising packet;
determine if the received advertising packet is not a duplicate of the previously received data packet in response to a determination that the unique identifier of the remote device and the time value or the iteration number of the received advertising packet does not match the unique identifier of the remote device and the previous time value or the previous iteration number of the previously received advertising packet,
extract the measurement data from the advertising packet; and
send at least a portion of the extracted measurement data via the network connection to the server.

2. The system of claim 1, wherein an advertising interval for the repeated broadcast of the content of the advertising packet is two times the total number of remote devices times an advertising time.

3. The system of claim 1, wherein the system is a base station configured to relay data from the remote device to the server.

4. The system of claim 1, wherein establishing the network connection with the server includes establishing a Wi-Fi connection.

5. The system of claim 1, wherein the wireless communication protocol of the broadcasted advertising packet is Bluetooth Low Energy.

6. The system of claim 1, wherein the advertising packet includes a current content fill level measurement.

7. The system of claim 1, wherein the advertising packet includes a previous content fill level measurement.

8. The system of claim 1, wherein the advertising packet includes the time value.

9. The system of claim 1, wherein the advertising packet includes the iteration number.

10. The system of claim 1, wherein the remote device is a sensor device configured as a cap to the container and the sensor device is configured to measure content fill level of the container.

11. The system of claim 1, wherein extracting the measurement data from the advertising packet includes obtaining data from the advertising packet and reformatting the obtained data.

12. The system of claim 1, wherein the total number of remote devices is specified via a wireless communication.

13. The system of claim 1, wherein the server utilizes the provided at least portion of the extracted measurement data to update a data structure tracking current content fill level of containers.

14. The system of claim 1, further comprising a battery.

15. The system of claim 1, wherein the processor is further configured to store the received data packet in a first-in-first-out buffer queue.

16. The system of claim 1, wherein the processor is further configured to detect a presence of user mobile devices in a vicinity of the system.

17. The system of claim 1, wherein the advertising packet further comprises a measurement status, wherein the measurement status includes one or more of the following: a measurement type status, a retry limit reached status, a not latched status, a not settled status, a no interrogation signal detected status, a remote device reset status, and/or a new bottle status.

18. The system of claim 1, wherein the advertising packet further comprises a measurement status, wherein the measurement status includes three or more of the following: a measurement type status, a retry limit reached status, a not latched status, a not settled status, a no interrogation signal detected status, a remote device reset status, and/or a new bottle status.

* * * * *